United States Patent
Kitanaka

(10) Patent No.: US 7,723,865 B2
(45) Date of Patent: May 25, 2010

(54) BIDIRECTIONAL BUCK BOOST DC-DC CONVERTER, RAILWAY COACH DRIVE CONTROL SYSTEM, AND RAILWAY FEEDER SYSTEM

(75) Inventor: Hidetoshi Kitanaka, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 50 days.

(21) Appl. No.: 12/293,828

(22) PCT Filed: Mar. 22, 2006

(86) PCT No.: PCT/JP2006/305734

§ 371 (c)(1),
(2), (4) Date: Sep. 22, 2008

(87) PCT Pub. No.: WO2007/108115

PCT Pub. Date: Sep. 27, 2007

(65) Prior Publication Data

US 2010/0045102 A1 Feb. 25, 2010

(51) Int. Cl.
*B60L 1/00* (2006.01)
*H02J 1/12* (2006.01)
*H02J 7/34* (2006.01)
*H02J 1/10* (2006.01)

(52) U.S. Cl. .................... 307/45; 307/9.1; 307/48; 307/51

(58) Field of Classification Search .................. 307/9.1, 307/45, 48, 51
See application file for complete search history.

(56) References Cited

U.S. PATENT DOCUMENTS 6,636,431 B2 10/2003 Seki et al.

2009/0015199 A1* 1/2009 Kitanaka .................... 320/118

FOREIGN PATENT DOCUMENTS

| JP | 2001-268900 A | 9/2001 |
|---|---|---|
| JP | 2002-238250 A | 8/2002 |
| JP | 2002-305803 A | 10/2002 |
| JP | 2003-079069 A | 3/2003 |
| JP | 2003-299396 A | 10/2003 |
| JP | 2005-206111 A | 8/2005 |
| RU | 2091972 C1 | 9/1997 |
| RU | 2182397 C2 | 5/2002 |

OTHER PUBLICATIONS

* Form PCT/ISA/210 (International Search Report) dated Jun. 27, 2006.
* Form PCT/ISA/237 (Written Opinion of the International Searching Authority, non-English language version) dated Jun. 27, 2006.
* Japanese Office Action dated May 8, 2007.
* Japanese Office Action (with English language translation) dated Oct. 16, 2007.

* cited by examiner

*Primary Examiner*—Jared J Fureman
*Assistant Examiner*—Dru M Parries
(74) *Attorney, Agent, or Firm*—Buchanan Ingersoll & Rooney PC

(57) ABSTRACT

According to the present invention, a bidirectional buck boost DC-DC converter can be obtained, in which power can flow bidirectionally from a primary side to a secondary side and from the secondary side to the primary side, regardless of a magnitude relation between a secondary-side voltage and a primary-side voltage in a state where different DC voltage sources are connected to the primary side and the secondary side in the DC-DC converter. A direction and a magnitude of the power can be automatically controlled to a desired value continuously on instantaneous value basis.

24 Claims, 55 Drawing Sheets

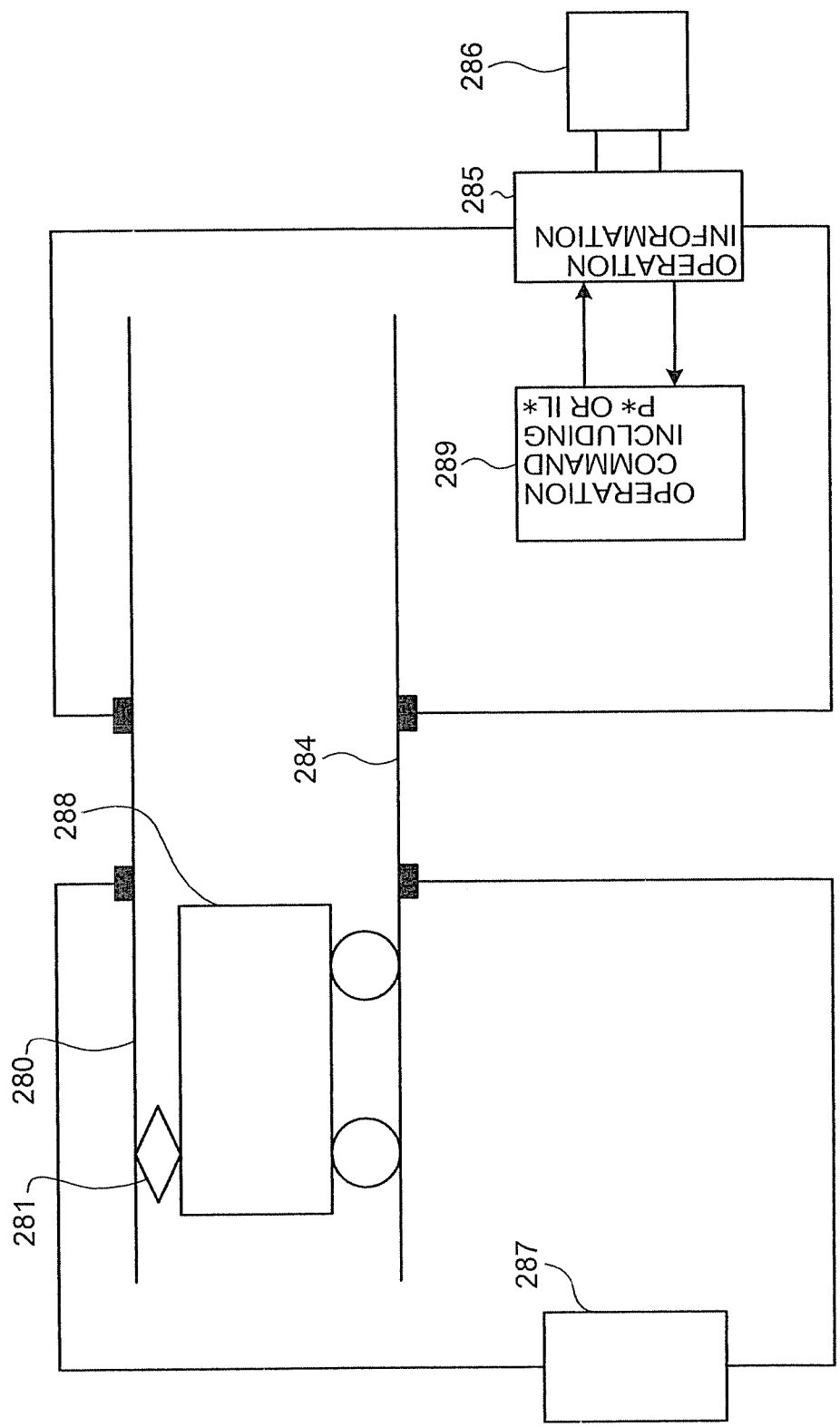

BIDIRECTIONAL BUCK BOOST DC-DC CONVERTER, RAILWAY COACH DRIVE CONTROL SYSTEM, AND RAILWAY FEEDER SYSTEM

TECHNICAL FIELD

The present invention relates to a DC-DC converter that is used when direct-current voltage sources are connected to each other, and is applicable to, for example, an electric vehicle or the like on which a power storage device is mounted.

BACKGROUND ART

Conventionally, a technology has been known, in which a power storage device such as a secondary battery or an electric double-layer capacitor is applied to a railway system, and kinetic energy of a vehicle is effectively used by storing surplus regenerative power generated when braking the vehicle and using the stored power when the vehicle is accelerated. In this case, a buck boost converter (hereinafter, a bidirectional buck boost DC-DC converter) capable of controlling power in bidirectional directions is used for connecting a direct-current wire and the power storage device (for example, Patent Document 1).

Patent Document 1: Japanese Patent Application Laid-open No. 2005-206111

However, the bidirectional buck boost DC-DC converter as described above cannot control current when a primary-side voltage is lower than a secondary-side voltage in the converter because of the circuit configuration. Therefore, the bidirectional buck boost DC-DC converter needs to be used under the condition that the primary-side voltage is always higher than the secondary-side voltage.

For avoiding such a problem, a DC-DC converter (hereinafter, a bidirectional buck boost DC-DC converter) is useful, which is capable of causing power to flow bidirectionally from the primary side to the secondary side and from the secondary side to the primary side regardless of a magnitude relation between the primary-side voltage and the secondary-side voltage of the bidirectional buck boost DC-DC converter. The circuit configuration thereof is disclosed, for example, in Patent Document 2.

Patent Document 2: Japanese Patent Application Laid-open No. 2001-268900

DISCLOSURE OF INVENTION

Problem to be Solved by the Invention

However, in the bidirectional buck boost DC-DC converter disclosed in Patent Document 2, an operation pattern of switching elements is determined for each of four operation modes, i.e., a case of setting the primary-side voltage higher than the secondary-side voltage and a case of setting the primary-side voltage lower than the secondary-side voltage when power flows from the primary side to the secondary side, and a case of setting the primary-side voltage higher than the secondary-side voltage and a case of setting the primary-side voltage lower than the secondary-side voltage when power flows from the secondary side to the primary side. Therefore, for example, this technology does not consider a case where the primary-side voltage and the secondary-side voltage are the same and a case where the power flow is zero, so that it is impossible to continuously transmit between the operation modes.

Moreover, the conduction rate of each switching element is described to be controlled by volume, so that it is not considered to automatically control the power flow on instantaneous value basis.

Thus, it is impossible to automatically control a direction and a magnitude of power from the primary side to the secondary side and from the secondary side to the primary side in the DC-DC converter to a desired value continuously on instantaneous value basis.

The present invention is accomplished to solve such problems, and an object of the present invention is to provided a bidirectional buck boost DC-DC converter, railway coach drive system, and railway feeder system capable of causing power to flow bidirectionally from a primary side to a secondary side and from the secondary side to the primary side regardless of a magnitude relation between a secondary-side voltage and a primary-side voltage in a state where different direct-current voltage sources are connected to the primary side and the secondary side in the DC-DC converter and automatically controlling a direction and a magnitude of the power to a desired value continuously on instantaneous value basis.

Means for Solving Problem

According to an aspect of the present invention, there is provided a bidirectional buck boost DC-DC converter in which a direct-current power is supplied bidirectionally between two direct-current voltage sources of a primary-side power supply and a secondary-side power supply. The bidirectional buck boost DC-DC converter includes a primary-side converting unit that is connected to an input/output terminal of the primary-side power supply and performs a power conversion operation on the primary-side power supply; a secondary-side converting unit that is connected to an input/output terminal of the secondary-side power supply and performs a power conversion operation on the secondary-side power supply; a coupling unit that connects the primary-side converting unit and the secondary-side converting unit to each other and that mediates supply and reception of a power between the primary-side converting unit and the secondary-side converting unit; and a control unit that detects at least a voltage of the primary-side converting unit on a power supply side and a voltage of the secondary-side converting unit on a power supply side from among the voltage of the primary-side converting unit on a power supply side, the voltage of the secondary-side converting unit on a power supply side, and a voltage at an arbitrary point between a positive-electrode-side connecting terminal and a negative-electrode-side connecting terminal of the coupling unit each connecting the primary-side converting unit and the secondary-side converting unit, detects at least one of a current flowing into/out of the primary-side converting unit, a current flowing into/out of the secondary-side converting unit, and a current flowing into/out of the coupling unit, controls so that a selected one of detected currents is consistent with a command value corresponding to the selected one of the detected currents, and that controls a power conversion operation on the primary-side converting unit and the secondary-side converting unit based on detected voltage of the primary-side converting unit on a power supply side, detected voltage of the secondary-side converting unit on a power supply side, the selected one of the currents, and a signal based on the command value corresponding to the selected one of the currents such that a direction and a magnitude of a power flowing bidirectionally between the primary-side power supply and the secondary-side power supply are controlled to be continuously variable on instantaneous value basis regardless of a magnitude relation between a voltage of the primary-side power supply and a voltage of the secondary-side power supply in a state where the two direct-current voltage sources are connected to each other.

According to another aspect of the present invention, there is provided a railway coach drive control system including an inverter for drive control that feeds a power supplied from a wire to an electric motor as a drive power; a power storage device that stores a power supplied from the wire; and a bidirectional buck boost DC-DC converter that is provided between the wire and the power storage device and controls a power of the wire and the power storage device bidirectionally. The bidirectional buck boost DC-DC converter including a primary-side converting unit that is connected to an input/output terminal of the primary-side power supply and performs a power conversion operation on the primary-side power supply; a secondary-side converting unit that is connected to an input/output terminal of the secondary-side power supply and performs a power conversion operation on the secondary-side power supply; a coupling unit that connects the primary-side converting unit and the secondary-side converting unit to each other and that mediates supply and reception of a power between the primary-side converting unit and the secondary-side converting unit; and a control unit that detects at least a voltage of the primary-side converting unit on a power supply side and a voltage of the secondary-side converting unit on a power supply side from among the voltage of the primary-side converting unit on a power supply side, the voltage of the secondary-side converting unit on a power supply side, and a voltage at an arbitrary point between a positive-electrode-side connecting terminal and a negative-electrode-side connecting terminal of the coupling unit each connecting the primary-side converting unit and the secondary-side converting unit, detects at least one of a current flowing into/out of the primary-side converting unit, a current flowing into/out of the secondary-side converting unit, and a current flowing into/out of the coupling unit, controls so that a selected one of detected currents is consistent with a command value corresponding to the selected one of the detected currents, and that controls a power conversion operation on the primary-side converting unit and the secondary-side converting unit based on detected voltage of the primary-side converting unit on a power supply side, detected voltage of the secondary-side converting unit on a power supply side, the selected one of the currents, and a signal based on the command value corresponding to the selected one of the currents such that a direction and a magnitude of a power flowing bidirectionally between the primary-side power supply and the secondary-side power supply are controlled to be continuously variable on instantaneous value basis regardless of a magnitude relation between a voltage of the primary-side power supply and a voltage of the secondary-side power supply in a state where the two direct-current voltage sources are connected to each other.

According to still another aspect of the present invention, there is provided a railway feeder system that supplies a power to a vehicle by a direct-current power source connected to a wire and a rail. The railway feeder system including an inverter for drive control that feeds a power supplied from the wire to an electric motor as a drive power; a power storage device that stores a power supplied from the wire; and a bidirectional buck boost DC-DC converter that is provided between the wire and the power storage device and controls a power of the wire and the power storage device bidirectionally. The bidirectional buck boost DC-DC converter including a primary-side converting unit that is connected to an input/output terminal of the primary-side power supply and performs a power conversion operation on the primary-side power supply; a secondary-side converting unit that is connected to an input/output terminal of the secondary-side power supply and performs a power conversion operation on the secondary-side power supply; a coupling unit that connects the primary-side converting unit and the secondary-side converting unit to each other and that mediates supply and reception of a power between the primary-side converting unit and the secondary-side converting unit; and a control unit that detects at least a voltage of the primary-side converting unit on a power supply side and a voltage of the secondary-side converting unit on a power supply side from among the voltage of the primary-side converting unit on a power supply side, the voltage of the secondary-side converting unit on a power supply side, and a voltage at an arbitrary point between a positive-electrode-side connecting terminal and a negative-electrode-side connecting terminal of the coupling unit each connecting the primary-side converting unit and the secondary-side converting unit, detects at least one of a current flowing into/out of the primary-side converting unit, a current flowing into/out of the secondary-side converting unit, and a current flowing into/out of the coupling unit, controls so that a selected one of detected currents is consistent with a command value corresponding to the selected one of the detected currents, and that controls a power conversion operation on the primary-side converting unit and the secondary-side converting unit based on detected voltage of the primary-side converting unit on a power supply side, detected voltage of the secondary-side converting unit on a power supply side, the selected one of the currents, and a signal based on the command value corresponding to the selected one of the currents such that a direction and a magnitude of a power flowing bidirectionally between the primary-side power supply and the secondary-side power supply are controlled to be continuously variable on instantaneous value basis regardless of a magnitude relation between a voltage of the primary-side power supply and a voltage of the secondary-side power supply in a state where the two direct-current voltage sources are connected to each other.

EFFECT OF THE INVENTION

According to an aspect of the present invention, there is provided a bidirectional buck boost DC-DC converter in which a direct-current power is supplied bidirectionally between two direct-current voltage sources of a primary-side power supply and a secondary-side power supply. The bidirectional buck boost DC-DC converter includes a primary-side converting unit that is connected to an input/output terminal of the primary-side power supply and performs a power conversion operation on the primary-side power supply; a secondary-side converting unit that is connected to an input/output terminal of the secondary-side power supply and performs a power conversion operation on the secondary-side power supply; a coupling unit that connects the primary-side converting unit and the secondary-side converting unit to each other and that mediates supply and reception of a power between the primary-side converting unit and the secondary-side converting unit; and a control unit that detects at least a voltage of the primary-side converting unit on a power supply side and a voltage of the secondary-side converting unit on a power supply side from among the voltage of the primary-side converting unit on a power supply side, the voltage of the secondary-side converting unit on a power supply side, and a voltage at an arbitrary point between a positive-electrode-side connecting terminal and a negative-electrode-side connecting terminal of the coupling unit each connecting the primary-side converting unit and the secondary-side converting unit, detects at least one of a current flowing into/out of the primary-side converting unit, a current flowing into/out of the secondary-side converting unit, and a current flowing into/out of the coupling unit, controls so that a selected one of detected currents is consistent with a command value corresponding to the selected one of the detected currents, and that controls a power conversion operation on the primary-side converting unit and the secondary-side converting unit based on detected voltage of the primary-side converting unit on a power supply side, detected voltage of the secondary-side converting unit on a power supply side, the selected one of the currents, and a signal based on the command value corresponding to the selected one of the currents, so that a direction and a magnitude of a power flowing bidirectionally between the primary-side power supply and the secondary-side power supply can be controlled to be continuously variable on instantaneous value basis regardless of a magnitude relation between a voltage of the primary-side power supply and a voltage of the secondary-side power supply in a state where the two direct-current voltage sources are connected to each other.

BRIEF DESCRIPTION OF DRAWINGS

FIG. 69 is a diagram illustrating an application example of a bidirectional buck boost DC-DC converter according to a fifteenth embodiment.

EXPLANATIONS OF LETTERS OR NUMERALS

Figure 1:
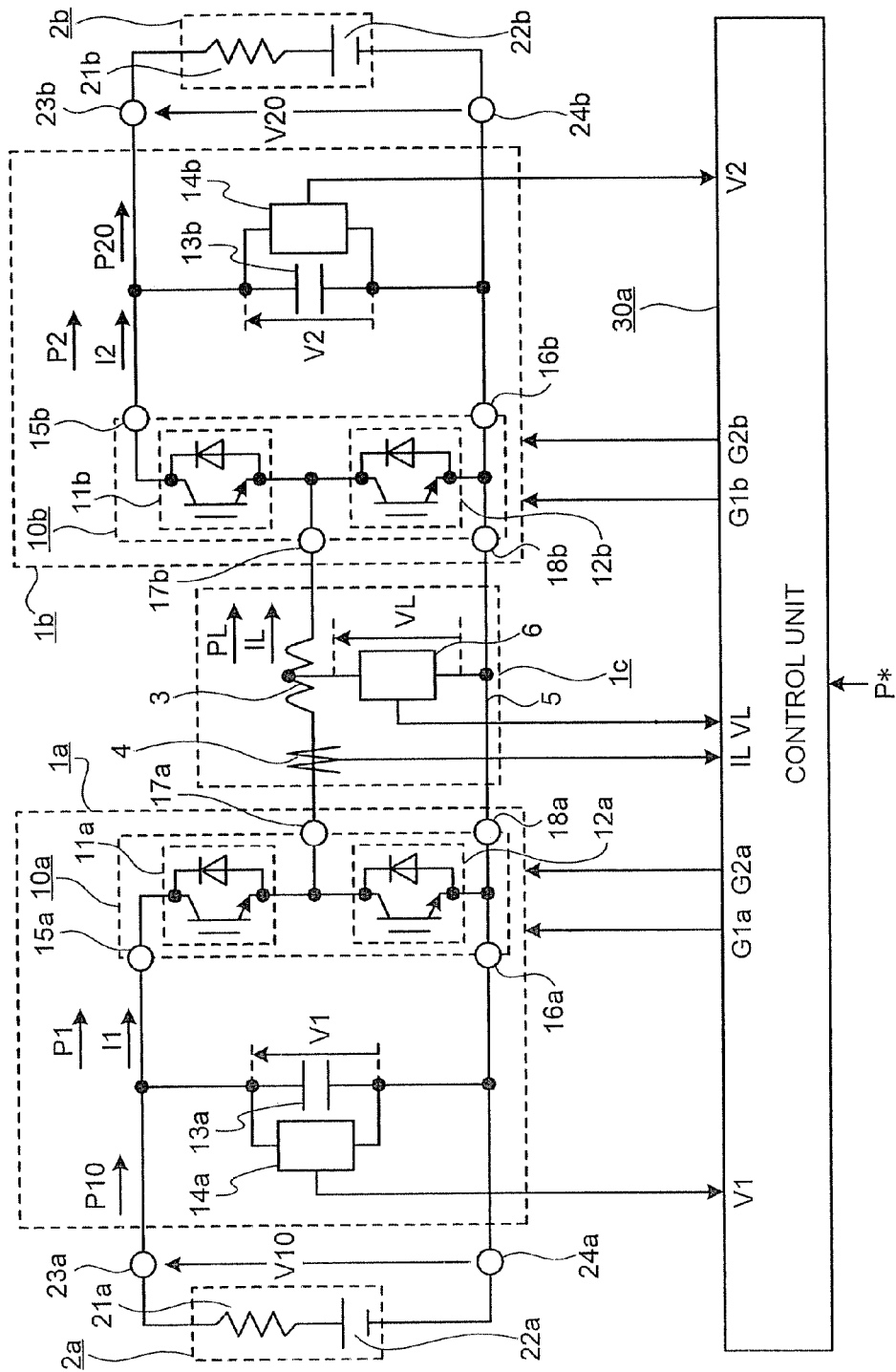
FIG. 1 is a configuration diagram of a bidirectional buck boost DC-DC converter according to a first embodiment.

1a: primary-side converting unit
1b: secondary-side converting unit
1c: coupling unit
2a: primary-side power supply
2b: secondary-side power supply
3: coupling reactor
4: current detector
5: connecting line
6: voltage detector
7: current detector
10: switching circuit
11, 12: switching element
13: capacitor
14: voltage detector
30: control unit
31: current-command converting unit
32: current-command adjusting unit
33: current control unit
34: modulation ratio command generating unit
35: gate-signal generating unit
280: wire
281: pantograph
282: inverter for drive control
283: electric motor
284: rail
285: bidirectional buck boost DC-DC converter
286: power storage device
287: direct-current power source
288: vehicle
289: system control device

BEST MODE(S) FOR CARRYING OUT THE INVENTION

First Embodiment

FIG. 1 is a configuration diagram of a bidirectional buck boost DC-DC converter according to the first embodiment. As shown in FIG. 1, a primary-side converting unit 1a is connected to input/output terminals 23a and 24a of a primary-side power supply 2a including a primary-side power supply impedance 21a and a primary-side power supply voltage source 22a, and is connected to a secondary-side converting unit 1b that is connected to input/output terminals 23b and 24b of a secondary-side power supply 2b including a secondary-side power supply impedance 21b and a secondary-side power supply voltage source 22b through a coupling unit 1c including a coupling reactor 3 and a connecting line 5.

The primary-side converting unit 1a includes a primary-side switching circuit 10a in which switching elements 11a and 12a are connected in series, a primary-side capacitor 13a that is connected in parallel with the primary-side switching circuit 10a, and a voltage detector 14a that detects voltage of the primary-side capacitor 13a.

A secondary-side converting unit 1b is configured in the same manner, so that the primary-side converting unit 1a is explained below.

A positive terminal of the switching element 11a on an upper-arm side of the primary-side switching circuit 10a is a first terminal 15a, negative terminals of the switching element 12a on a lower-arm side of the primary-side switching circuit 10a are a second terminal 16a and a fourth terminal 18a, the first terminal 15a is connected to the positive electrode side of the primary-side capacitor 13a, and the second terminal 16a is connected to the negative electrode side of the primary-side capacitor 13a. The fourth terminal 18a is connected to a fourth terminal 18b of a secondary-side switching circuit 10b that is configured in the same manner via the connecting line 5, a third terminal 17a that is a connecting point between a negative electrode side of the switching element 11a on the upper-arm side and a positive electrode side of the switching element 12a on the lower-arm side and a third terminal 17b of the secondary-side switching circuit 10b configured in the same manner are connected by the coupling reactor 3, and a first current detector 4 that detects a current IL of the coupling reactor 3 is provided.

Voltage between an arbitrary point between the third terminal 17a of the primary-side switching circuit 10a and the third terminal 17b of the secondary-side switching circuit 10b and the connecting line 5 is a coupling unit voltage VL, and a voltage detector 6 is provided for detecting the coupling unit voltage VL.

In FIG. 1, the configuration is such that a value that is the voltage between the coupling reactor 3 and the connecting line 5 detected by the voltage detector 6 is utilized as the coupling unit voltage VL; however, for example, the coupling unit voltage VL can be voltage between the third terminal 17a of the primary-side switching circuit 10a and the connecting line 5 or voltage between the third terminal 17b of the secondary-side switching circuit 10b and the connecting line 5.

Furthermore, a primary-side capacitor voltage V1 output from the primary-side converting unit 1a, a secondary-side capacitor voltage V2 output from the secondary-side converting unit 1b, the coupling reactor current IL output from the coupling unit 1c, and the coupling unit voltage VL are input to a control unit 30a. The control unit 30a outputs gate signals G1a, G1b, G2a, and G2b for controlling on/off of each of the switching elements 11a, 11b, 12a, and 12b to the primary-side converting unit 1a and the secondary-side converting unit 1b so that a power PL that flows in the coupling unit 1c from the primary side to the secondary side is consistent with a command value P*.

The command value P* corresponds to a signal or the like that, for example, is input from a control device that controls a power storage system including the DC-DC converter of the present invention and is an upper-level device of the control unit 30a of the DC-DC converter.

Current in the first terminal 15a and current in the second terminal 16a of the primary-side switching circuit 10a, current in the coupling reactor 3 and current in the connecting line 5, and current in a first terminal 15b and current in a second terminal 16b of the secondary-side switching circuit 10b are each have the same value but flow in the opposite directions. Therefore, the content of the present invention can be accomplished by detecting any one of them. In the whole explanation in the specification, it is assumed that the current in the first terminal 15a of the primary-side switching circuit 10a (hereinafter, referred to as a primary-side switching circuit current I1), the current in the coupling reactor 3 (hereinafter, referred to as a coupling reactor current IL), and the current in the first terminal 15b of the secondary-side switching circuit 10b (hereinafter, referred to as a secondary-side switching circuit current I2) are detected.

When the negative electrode side (a line from the primary-side input/output terminal 24a to the secondary-side input/output terminal 24b via the second terminal 16a and the fourth terminal 18a of the primary-side switching circuit 10a, the connecting line 5, and the fourth terminal 18b and the second terminal 16b of the secondary-side switching circuit 10b) in the circuit is grounded, the potential to the ground of the second terminal 16a of the primary-side switching circuit 10a, the second terminal 16b of the secondary-side switching circuit 10b, and the connecting line 5 that is to be a ground potential is stable at a low level compared with the potential to the ground of the first terminal 15a of the primary-side switching circuit 10a, the first terminal 15b of the secondary-side switching circuit 10b, and the coupling reactor 3 that are high and fluctuates regularly. Therefore, the dielectric strength voltage required to the current detector can be low, and the current detector can obtain detection values with less noise by providing the current detector on the negative electrode side of the circuit.

Next, the configuration of the control unit 30a is explained.

Figure 2:
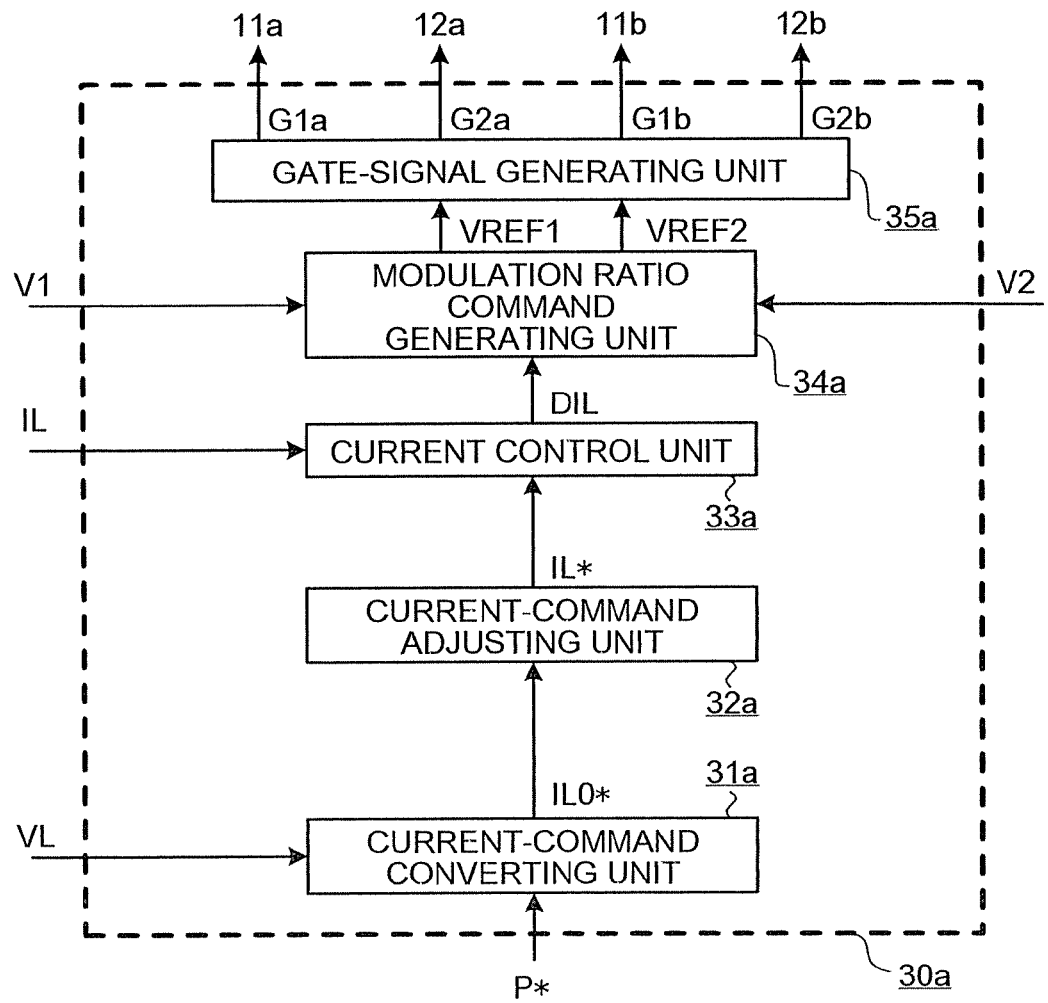
FIG. 2 is a diagram illustrating a configuration example of a control unit 30a according to the first embodiment.

FIG. 2 is a diagram illustrating a configuration example of the control unit 30a according to the first embodiment of the present invention.

As shown in FIG. 2, the control unit 30a includes a current-command converting unit 31a, a current-command adjusting unit 32a, a current control unit 33a, a modulation ratio command generating unit 34a, and a gate-signal generating unit 35a.

The current-command converting unit 31a generates a coupling-reactor base current command IL0* based on the power command P* and the coupling unit voltage VL.

The current-command adjusting unit 32a adjusts the coupling-reactor base current command IL0* input from the current-command converting unit 31a, and generates a coupling-reactor current command IL*.

The current control unit 33a generates a current difference DIL based on the coupling-reactor current command IL* and the coupling reactor current IL.

The modulation ratio command generating unit 34a generates a primary-side modulation ratio command VREF1 and a secondary-side modulation ratio command VREF2 based on the current difference DIL input from the current control unit 33a, the primary-side capacitor voltage V1, and the secondary-side capacitor voltage V2.

The gate-signal generating unit 35a generates the gate signals G1a, G1b, G2a, and G2b for controlling on/off of each of the switching elements 11a, 11b, 12a, and 12b based on the primary-side modulation ratio command VREF1 and the secondary-side modulation ratio command VREF2 input from the modulation ratio command generating unit 34a.

In FIG. 2, the control unit 30a is configured so that the command value P* is input from outside; however, the configuration can be such that a signal corresponding to the coupling-reactor base current command IL0* or the coupling-reactor current command IL* is input from outside instead of the command value P*. In this case, the current-command converting unit 31a and the current-command adjusting unit 32a can be omitted.

The configuration examples of the current-command converting unit 31a, the current-command adjusting unit 32a, the current control unit 33a, the modulation ratio command generating unit 34a, and the gate-signal generating unit 35a are explained below.

Figure 3:
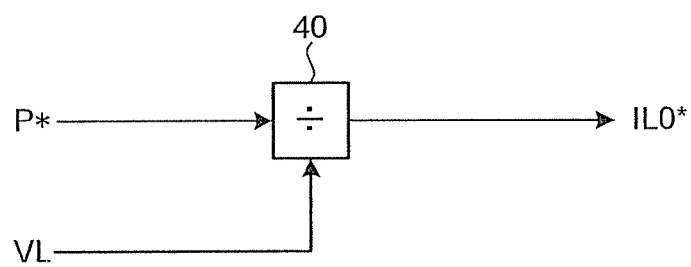
FIG. 3 is a diagram illustrating a configuration example of a current-command converting unit 31a according to the first embodiment.

FIG. 3 is a diagram illustrating a configuration example of the current-command converting unit 31a according to the first embodiment of the present invention. The configuration can be such that a low-pass filter or the like is inserted into input and output of a function block of a divider 40 or the like to remove unnecessary frequency components, although not shown.

As shown in FIG. 3, the current-command converting unit 31a generates the coupling-reactor base current command IL0* by dividing the command value P* by the coupling unit voltage VL by using the divider 40.

Figure 4:
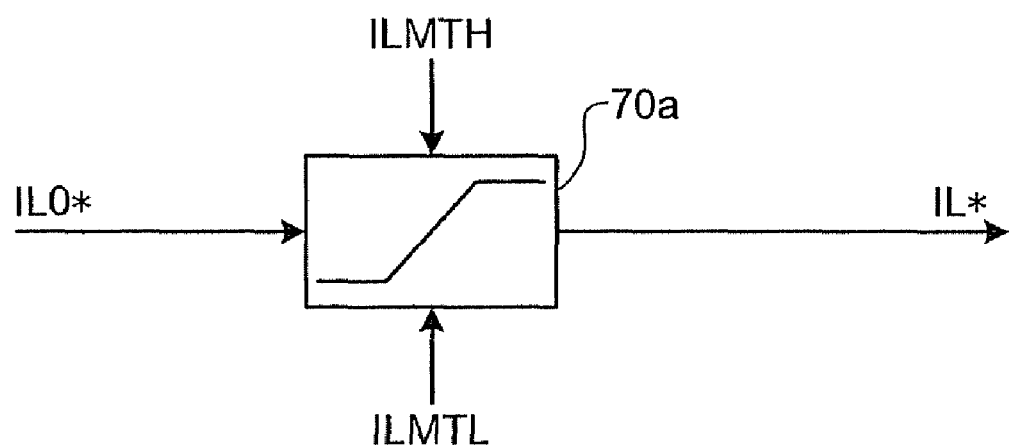
FIG. 4 is a diagram illustrating a configuration example of a current-command adjusting unit 32a according to the first embodiment.

FIG. 4 is a diagram illustrating a configuration example of the current-command adjusting unit 32a according to the first embodiment of the present invention. The configuration can be such that a low-pass filter or the like is inserted into input and output of a limiter 70a to remove unnecessary frequency components, although not shown.

As shown in FIG. 4, the current-command adjusting unit 32a causes the limiter 70a in which the upper and lower limits are set by a current-command upper-limit limiting value ILMTH and a current-command lower-limit limiting value ILMTL to limit an upper limit and a lower limit of the coupling-reactor base current command IL0* generated by the current-command converting unit 31a, and outputs the value as the coupling-reactor current command IL*.

The function of the limiter 70a is explained. A signal that is obtained by limiting the upper and lower limits of the coupling-reactor base current command IL0* is used as the coupling-reactor current command IL*, so that the upper and lower limits of the actual coupling reactor current IL which is controlled to be consistent with the coupling-reactor base current command IL0* can be limited. The coupling reactor current IL is current that always flows in any of the switching elements 11a to 12b. Therefore, the current in the switching elements 11a to 12b can be limited by limiting the upper and lower limits of the coupling reactor current IL.

It is appropriate to set the current-command upper-limit limiting value ILMTH and the current-command lower-limit limiting value ILMTL to be equal to or lower than a current resistance of the switching elements 11a to 12b.

With the above configuration of the current-command adjusting unit 32a, even if the coupling-reactor base current command IL0* calculated in the current-command converting unit 31a becomes too large with respect to the current resistance of the switching elements 11a to 12b in the case, for example, where the excessive command value P* is input to the control unit 30a, it is possible to limit the coupling-reactor current command IL* within the current resistance of the switching elements 11a to 12b by the limiter 70a.

Thus, the actual coupling reactor current IL and therefore the current in the switching elements 11a to 12b can be limited within the current resistance thereof. Consequently, the switching elements 11a to 12b can be prevented from breakage because of overcurrent, so that the bidirectional buck boost DC-DC converter that is strong against disturbance such as excessive power command input can be obtained.

Figure 5:
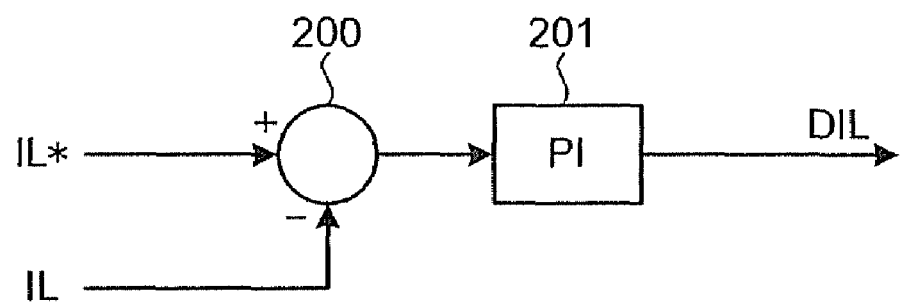
FIG. 5 is a diagram illustrating a configuration example of a current control unit 33a according to the first embodiment.

FIG. 5 is a diagram illustrating a configuration example of the current control unit 33a according to the first embodiment of the present invention. The configuration can be such that a low-pass filter or the like is inserted into input and output of a function block of a subtractor 200 or the like to remove unnecessary frequency components, although not shown.

As shown in FIG. 5, in the current control unit 33a, a deviation between the coupling-reactor current command IL* and the coupling reactor current IL generated in the current-command adjusting unit 32a is generated by the subtractor 200, which is input to a proportional-integral controller 201. In the proportional-integral controller 201, the current difference DIL is calculated by the following equation:

$$DIL=(K1+K2/s)\times(IL^*-IL)$$

where K1; proportional gain, K2; integral gain, and s; Laplace operator.

Figure 6:
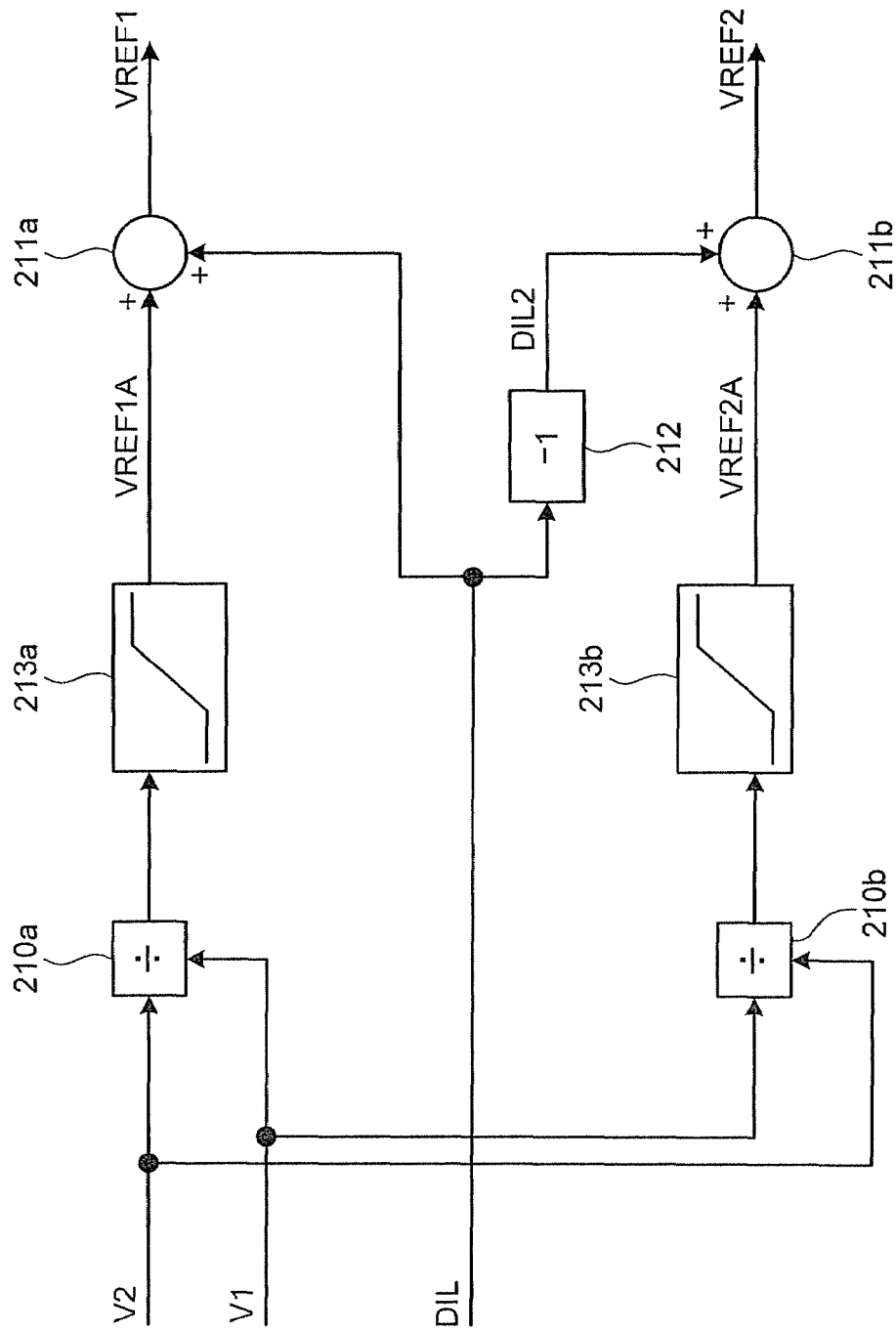
FIG. 6 is a diagram illustrating a configuration example of a modulation ratio command generating unit 34a according to the first embodiment.

FIG. 6 is a diagram illustrating a configuration example of the modulation ratio command generating unit 34a according to the first embodiment of the present invention. The configuration can be such that a low-pass filter or the like is inserted into input and output of a function block of an adder 211a or the like to remove unnecessary frequency components, although not shown.

As shown in FIG. 6, the secondary-side capacitor voltage V2 is divided by the primary-side capacitor voltage V1 in a divider 210a of the modulation ratio command generating unit 34a to obtain a ratio V2/V1 between the secondary-side capacitor voltage V2 and the primary-side capacitor voltage V1. A limiter 213a limits the lower and upper limits of the ratio V2/V1 to zero and one to obtain a value that is to be a primary-side base modulation ratio command VREF1A to the primary-side converting unit 1a.

The current difference DIL generated in the current control unit 33a is added to the primary-side base modulation ratio command VREF1A by the adder 211a to obtain the primary-side modulation ratio command VREF1 as the modulation ratio command of the primary-side converting unit 1a.

That is, the VREF1 is expressed by VREF1=VREF1A+DIL.

On the other hand, the primary-side capacitor voltage V1 is divided by the secondary-side capacitor voltage V2 in a divider 210b to obtain a ratio V1/V2 between the primary-side capacitor voltage V1 and the secondary-side capacitor voltage V2. A limiter 213b limits the lower and upper limits of the ratio V1/V2 to zero and one to obtain a value that is to be a secondary-side base modulation ratio command VREF2A to the secondary-side converting unit 1b.

A DIL2 that is obtained by inverting a sign of the current difference DIL generated in the current control unit 33a by a sign inverting circuit 212 is added to the secondary-side base modulation ratio command VREF2A by the adder 211b to obtain the secondary-side modulation ratio command VREF2 as the modulation ratio command of the secondary-side converting unit 1b.

That is, the VREF2 is expressed by VREF2=VREF2A+DIL2.

Figure 7:
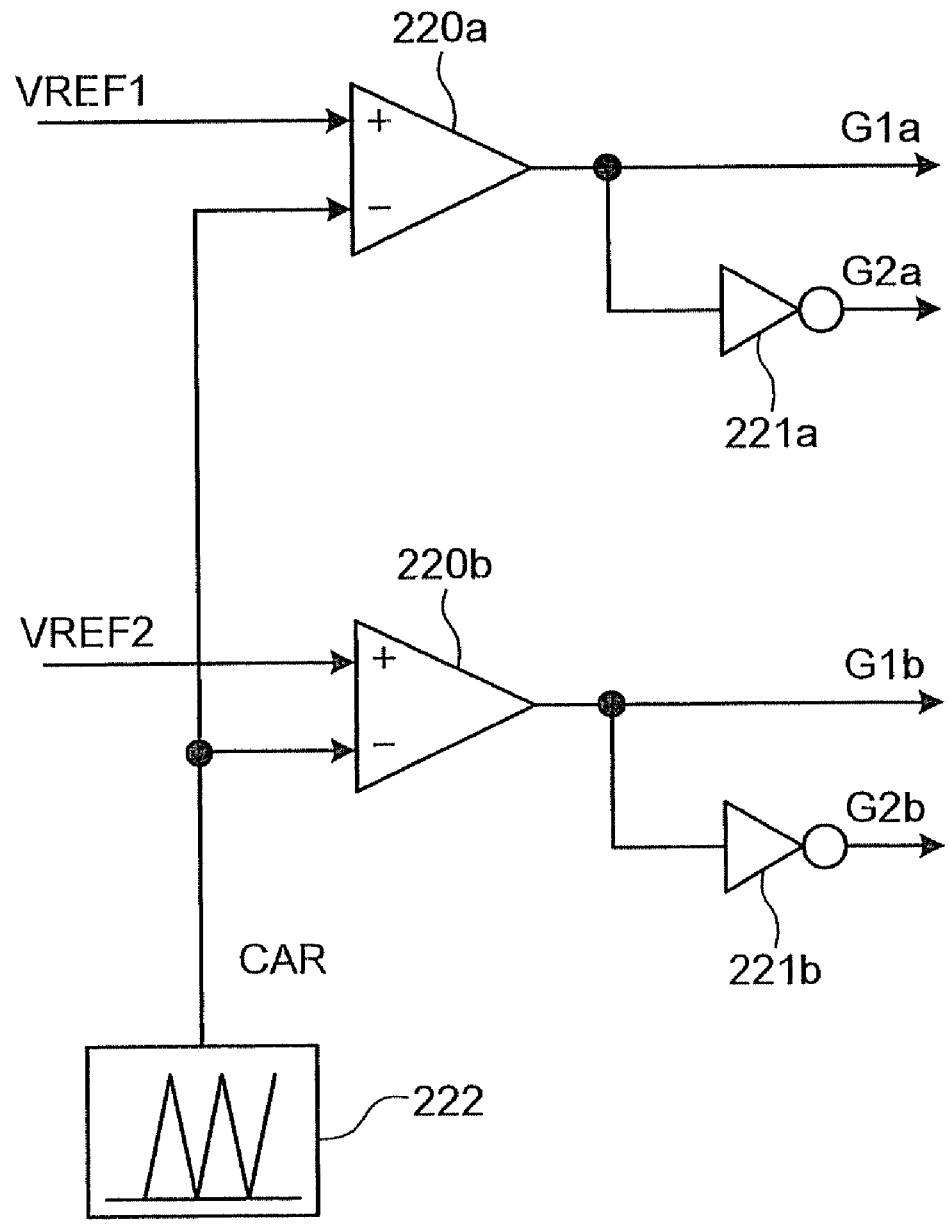
FIG. 7 is a diagram illustrating a configuration example of a gate-signal generating unit 35a according to the first embodiment.
Figure 8:
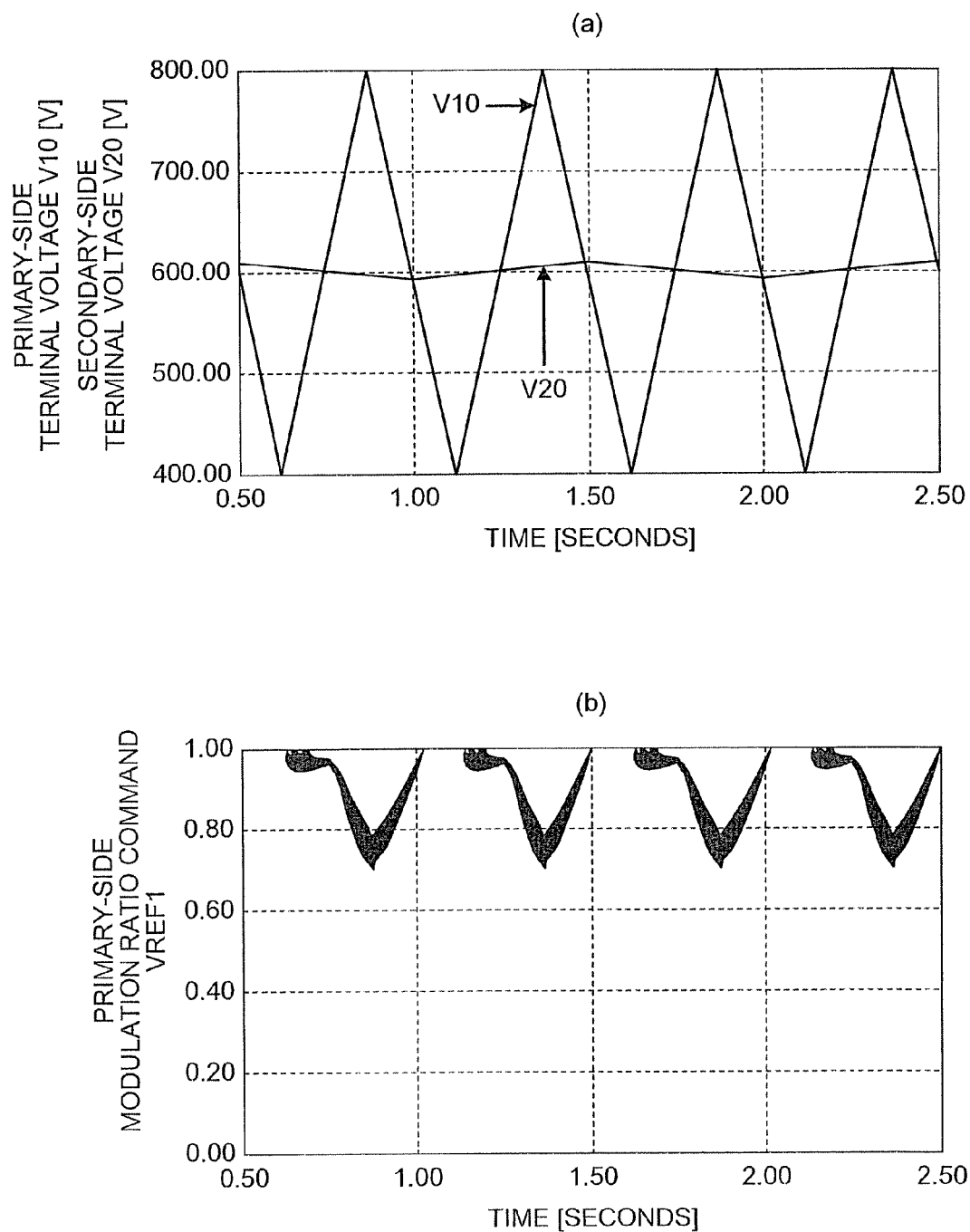
FIG. 8 is a diagram illustrating a result of a simulation of operation waveforms of the bidirectional buck boost DC-DC converter according to the first embodiment.
Figure 9:
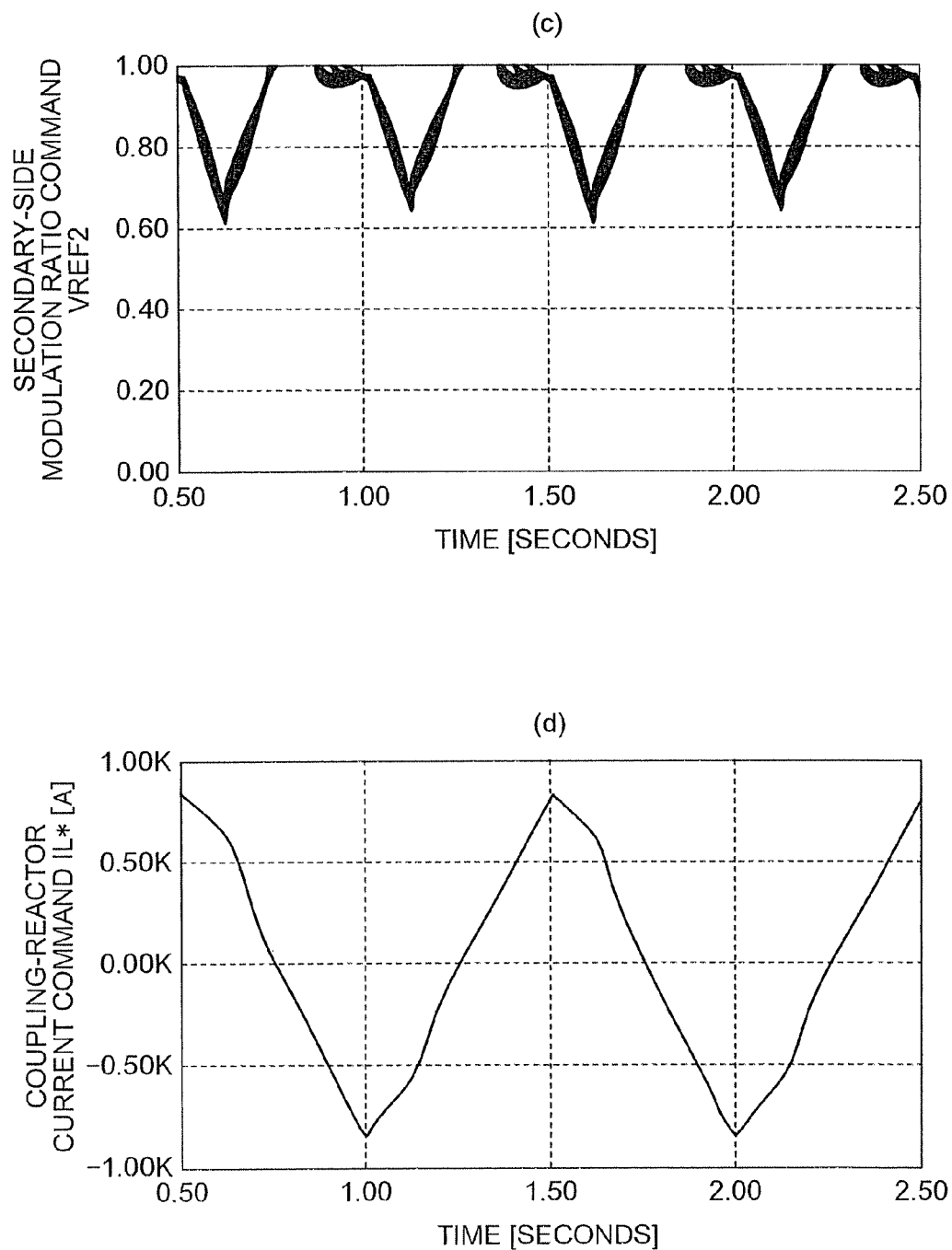
FIG. 9 is a diagram illustrating a result of a simulation of operation waveforms of the bidirectional buck boost DC-DC converter according to the first embodiment.
Figure 10:
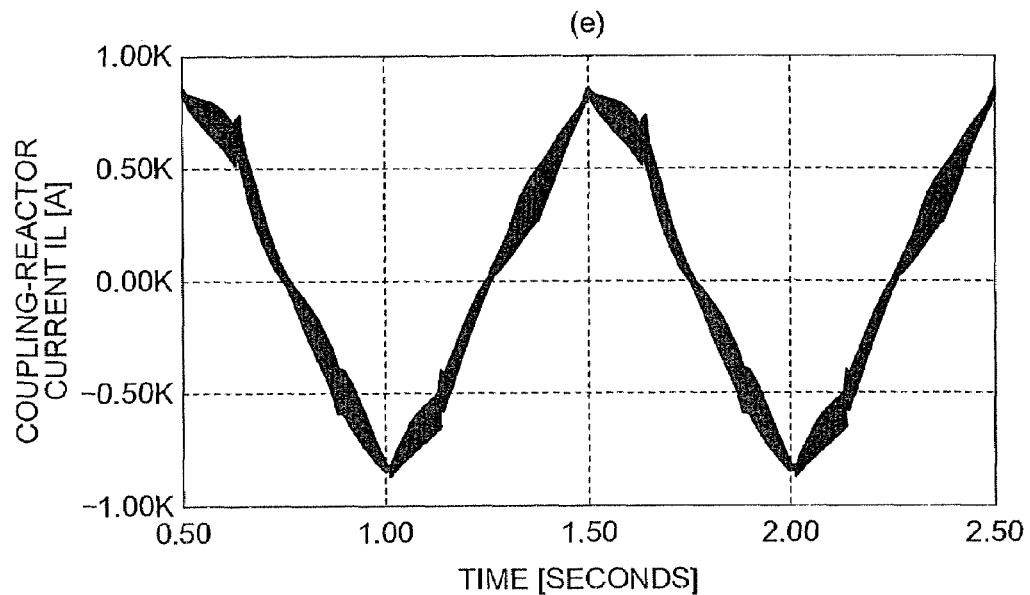
FIG. 10 is a diagram illustrating a result of a simulation of operation waveforms of the bidirectional buck boost DC-DC converter according to the first embodiment.
Figure 10:
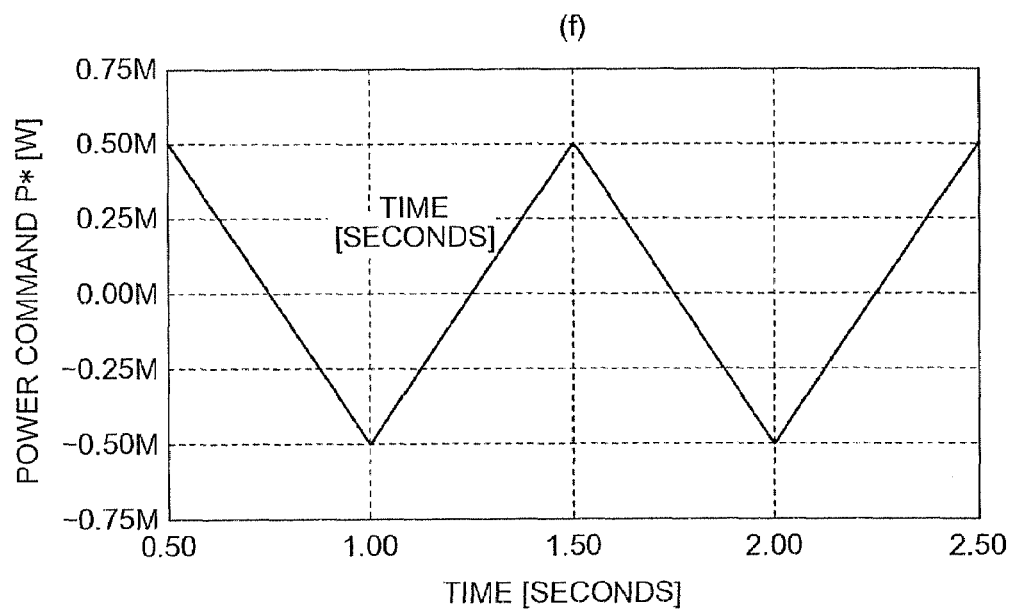
Figure 11:
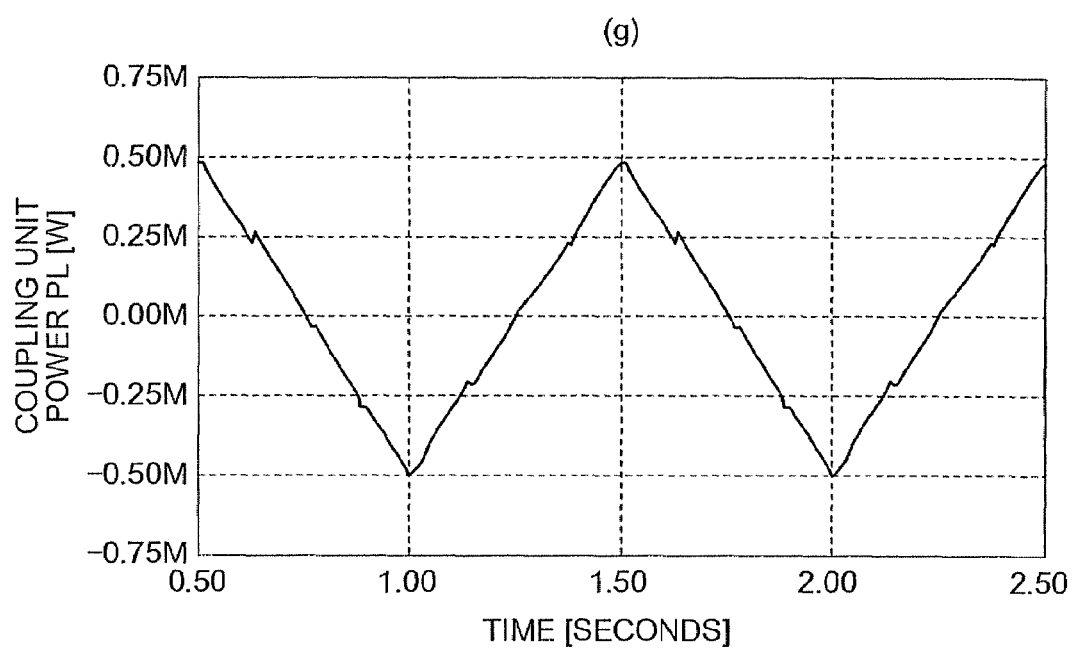
FIG. 11 is a diagram illustrating a result of a simulation of operation waveforms of the bidirectional buck boost DC-DC converter according to the first embodiment.
Figure 12:
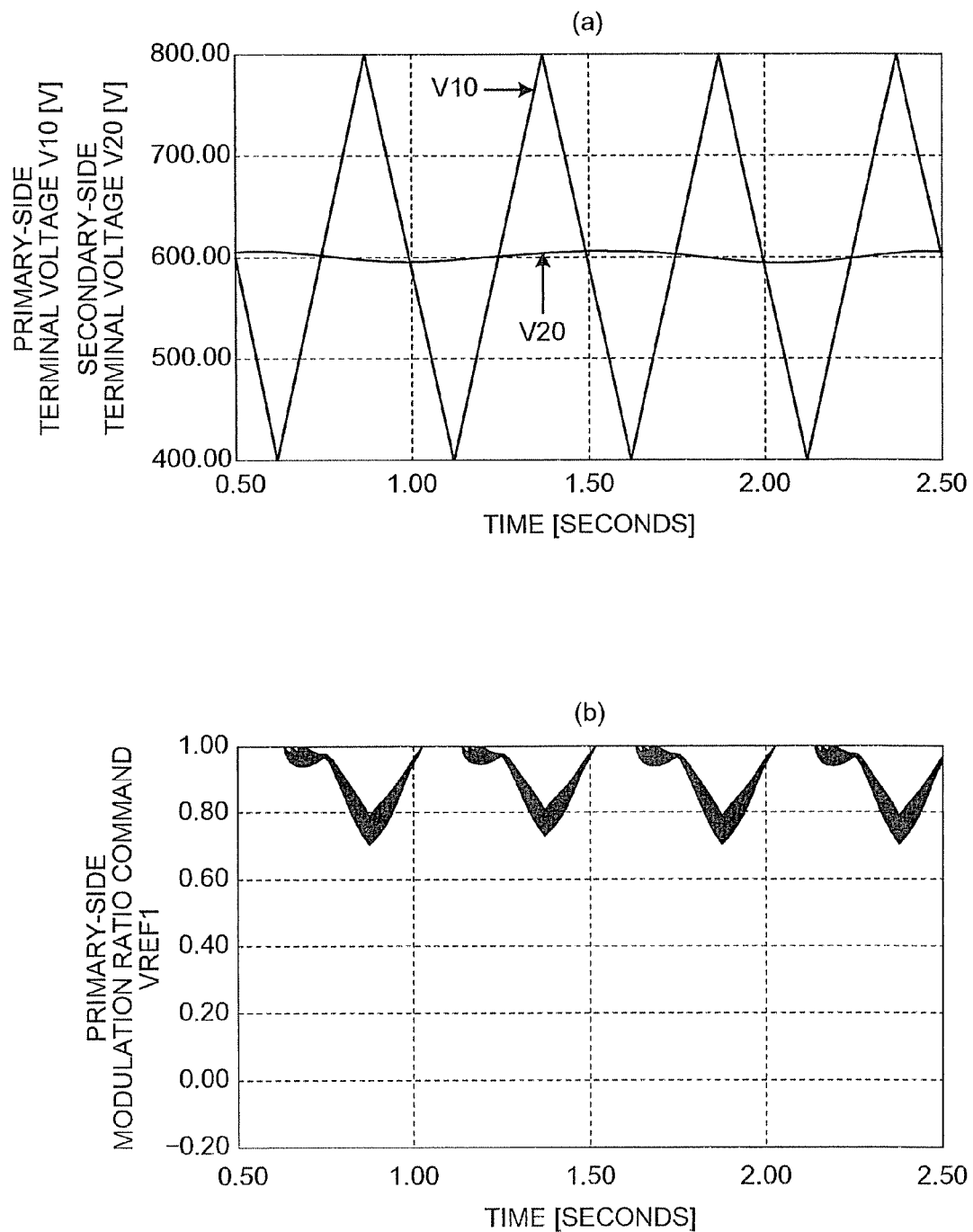
FIG. 12 is a diagram illustrating a result of a simulation of operation waveforms of the bidirectional buck boost DC-DC converter according to the first embodiment.
Figure 13:
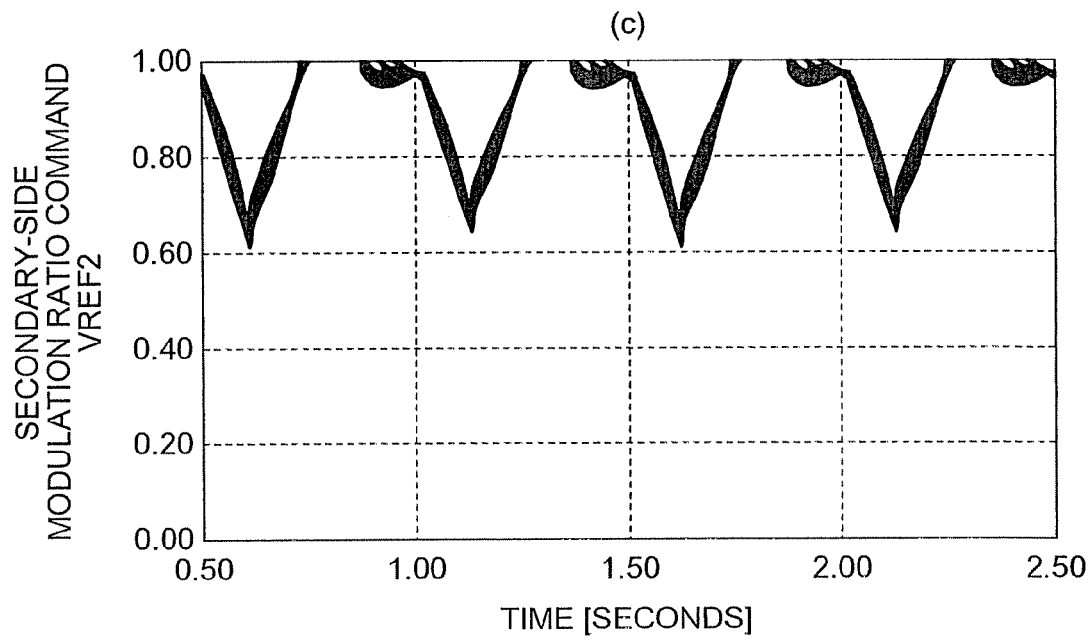
FIG. 13 is a diagram illustrating a result of a simulation of operation waveforms of the bidirectional buck boost DC-DC converter according to the first embodiment.
Figure 13:
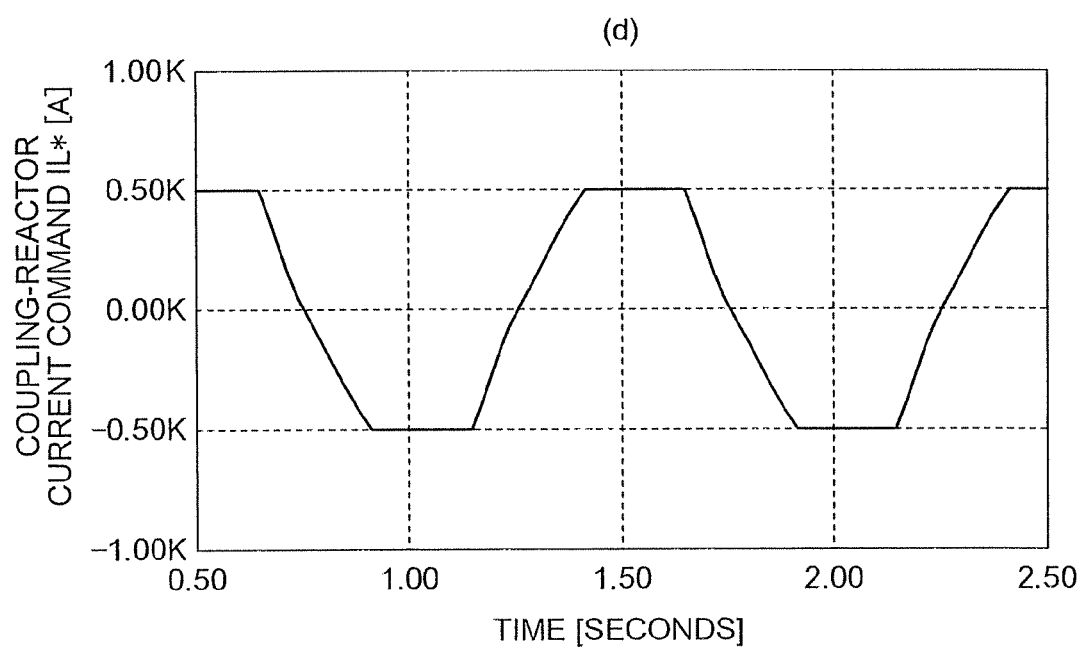
Figure 14:
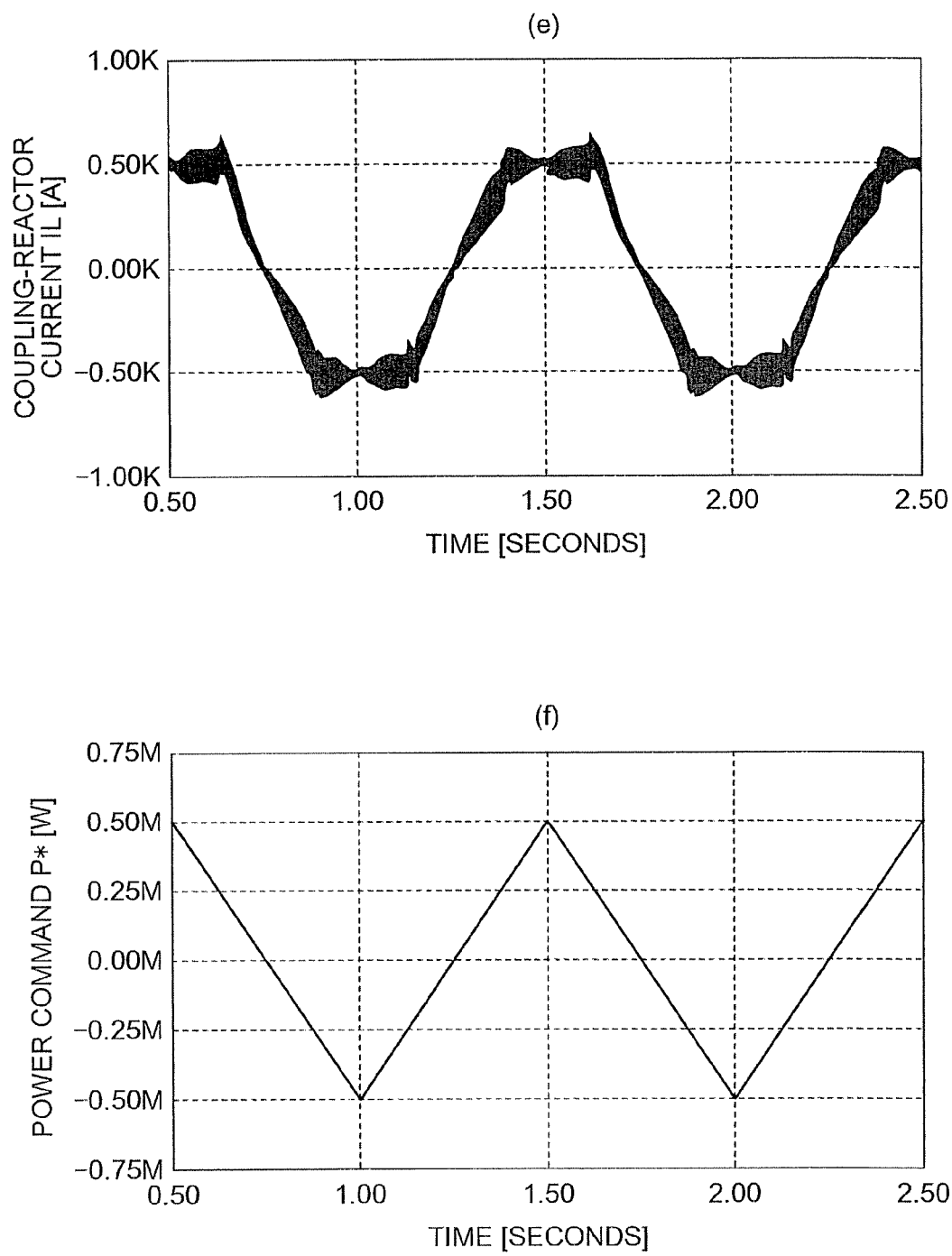
FIG. 14 is a diagram illustrating a result of a simulation of operation waveforms of the bidirectional buck boost DC-DC converter according to the first embodiment.
Figure 15:
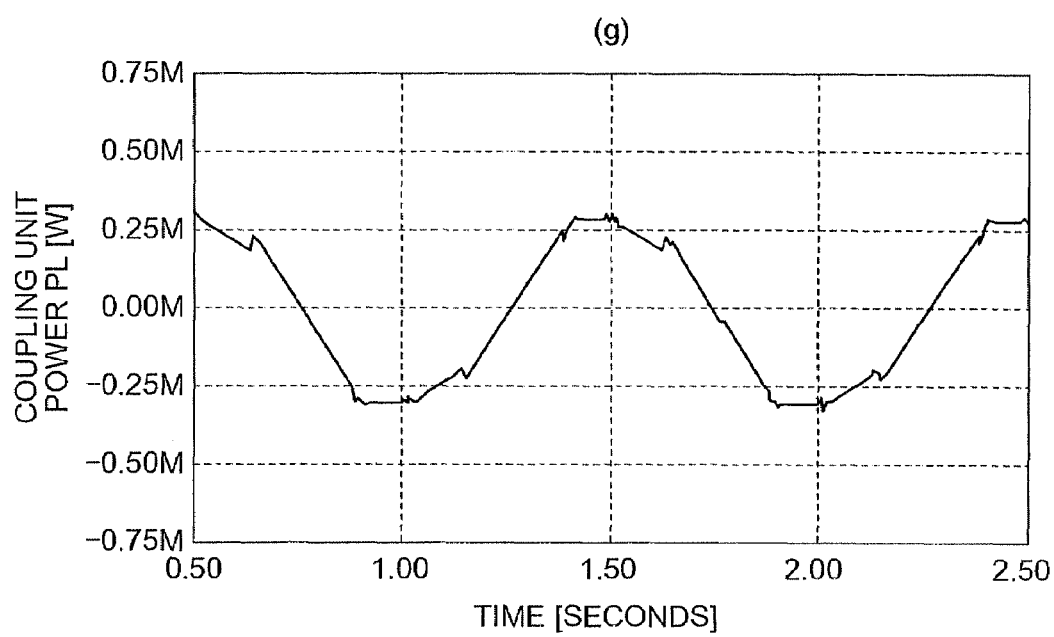
FIG. 15 is a diagram illustrating a result of a simulation of operation waveforms of the bidirectional buck boost DC-DC converter according to the first embodiment.

FIG. 7 is a diagram illustrating a configuration example of the gate-signal generating unit 35a according to the first embodiment of the present invention. The configuration can be such that a low-pass filter or the like is inserted into input and output of a function block of a comparator 220a or the like to remove unnecessary frequency components, although not shown.

As shown in FIG. 7, the gate-signal generating unit 35a first generates a carrier signal CAR that takes a value of zero to one in a carrier signal generator 222. It is appropriate that the carrier signal CAR is, for example, a triangle wave or a sawtooth wave.

Then, the comparators 220a and 220b, and inverting circuits 221a and 221b determine the gate signals G1a to G2b of each of the switching elements 11a to 12b by the following logic in accordance with a magnitude relation between the primary-side modulation ratio command VREF1 and the secondary-side modulation ratio command VREF2 generated by the modulation ratio command generating unit 34a, and the carrier signal CAR.

If VREF1>CAR, the gate signal G1a to the switching element 11a is turned on and the gate signal G2a to the switching element 12a is turned off. Adversely, if VREF1<CAR, the gate signal G1a to the switching element 11a is turned off and the gate signal G2a to the switching element 12a is turned on.

If VREF2>CAR, the gate signal G1b to the switching element 11b is turned on and the gate signal G2b to the switching element 12b is turned off. Adversely, if VREF2<CAR, the gate signal G1b to the switching element 11b is turned off and the gate signal G2b to the switching element 12b is turned on.

Accordingly, with the control unit 30a of the above configuration, when the power command P* is positive, the coupling-reactor base current command IL0* becomes positive regardless of the magnitude of the primary-side capacitor voltage V1 and the secondary-side capacitor voltage V2 or the magnitude relation between the primary-side capacitor voltage V1 and the secondary-side capacitor voltage V2, so that it is possible to cause the power PL flowing in the coupling unit 1c (hereinafter, referred to as a coupling unit power PL) to flow in a direction from the primary-side power supply 2a to the secondary-side power supply 2b, and the coupling unit power PL is consistent with the power command P*.

On the other hand, when the power command P* is negative, the coupling-reactor base current command IL0* becomes negative, so that it is possible to cause the coupling unit power PL to flow in a direction from the secondary-side power supply 2b to the primary-side power supply 2a, and the coupling unit power PL is consistent with the power command P*.

When the power command P* is zero, the coupling-reactor base current command IL0* becomes zero, so that the power flow between the primary-side power supply 2a and the secondary-side power supply 2b can be stopped.

In this manner, the magnitude and the direction of the coupling unit power PL can be controlled arbitrary and continuously on instantaneous value basis by arbitrary setting the magnitude and the direction of the power command P* from positive to negative including zero.

The current in the switching elements 11a to 12b can be limited to an arbitrary value, for example, to be within the current resistance thereof. Thus, the switching elements 11a to 12b can be prevented from breakage because of overcurrent, so that the bidirectional buck boost DC-DC converter that is strong against disturbance such as excessive power command input can be obtained.

The first embodiment is focused on the coupling unit power PL, which is controlled to be consistent with the power command P* In other words, the power command P* is converted into the coupling-reactor current command IL* corresponding thereto, which is controlled to be consistent with the actual coupling reactor current IL.

Furthermore, when the minor loss in the primary-side converting unit 1a, the coupling unit 1c, and the secondary-side converting unit 1b and the minor fluctuation in energy stored in the primary-side capacitor 13a and a secondary-side capacitor 13b are ignored, an input/output power P10 of the primary-side power supply 2a, the coupling unit power PL, and an input/output power P20 of the secondary-side power supply 2b become equal on instantaneous value basis. Therefore, the power flow between the primary-side power supply 2a and the secondary-side power supply 2b can be controlled by controlling the coupling unit power PL.

If control accuracy is required to the degree that the loss in the primary-side converting unit 1a, the coupling unit 1c, and the secondary-side converting unit 1b cannot be ignored, the control accuracy of the power flow can be further improved by setting the power command P* or the coupling-reactor current command IL* to a value that includes the loss (normally, a few percent of the whole power that is input to or output from the DC-DC converter), although not shown.

If control accuracy is required to the degree that the fluctuation in energy stored in the primary-side capacitor 13a and the secondary-side capacitor 13b cannot be ignored, the transitional control accuracy of the power flow can be improved by adjusting the power command P* or the coupling-reactor current command IL* depending upon the amount of the fluctuation in energy stored in the primary-side capacitor 13a and the secondary-side capacitor 13b, although not shown.

FIG. 8 to FIG. 11, and FIG. 12 to FIG. 15 are diagrams illustrating a result of a simulation of operation waveforms of the bidirectional buck boost DC-DC converter to which the configuration of the control unit 30a is applied according to the first embodiment of the present invention.

FIG. 8(a) and FIG. 12(a) are diagrams illustrating a primary-side terminal voltage V10 and a secondary-side terminal voltage V20, and FIG. 8(b) and FIG. 12(b) are diagrams illustrating the primary-side modulation ratio command VREF1.

FIG. 9(c) and FIG. 13(c) are diagrams illustrating the secondary-side modulation ratio command VREF2, and FIG. 9(d) and FIG. 13(d) are diagrams illustrating the coupling-reactor current command IL*.

FIG. 10(e) and FIG. 14(e) are diagrams illustrating the coupling reactor current IL, and FIG. 10(f) and FIG. 14(f) are diagrams illustrating the power command P*.

FIG. 11(g) and FIG. 15(g) are diagrams illustrating the coupling unit power PL.

FIG. 8 to FIG. 11 are diagrams illustrating operation waveforms in the case where a voltage source that changes the primary-side terminal voltage V10 between 400V and 800V in a ramp manner at two Hz is connected as the primary-side power supply 2a, a large-capacity capacitor with the initial voltage of 600V is connected as the secondary-side power supply 2b, and the power command P* is changed in a ramp manner at one Hz within the range of ±500 KW. The limiter 70a is set to ±1000 A, so that the coupling-reactor current command IL* is limited within the range of ±1000 A.

As shown in FIG. 8 to FIG. 11, the primary-side modulation ratio command VREF1 and the secondary-side modulation ratio command VREF2 are appropriately adjusted regardless of a magnitude relation between the primary-side terminal voltage V10 and the secondary-side terminal voltage V20, and the coupling reactor current IL is consistent with the coupling-reactor current command IL*. The coupling-reactor current command IL* is within the range of ±1000 A, so that it is operated without being limited by the limiter 70a. Consequently, it is found that the coupling unit power PL is consistent with the power command P* in the whole region.

FIG. 12 to FIG. 15 are diagrams illustrating operation waveforms in the case where a voltage source that changes the primary-side terminal voltage V10 between 400V and 800V in a ramp manner at two Hz is connected as the primary-side power supply 2a, a large-capacity capacitor with the initial voltage of 600V is connected as the secondary-side power supply 2b, and the power command P* is changed in a ramp manner at one Hz within the range of ±500 KW. The limiter 70a is set to ±500 A, so that the coupling-reactor current command IL* is limited within the range of ±500 A.

As shown in FIG. 12 to FIG. 15, the primary-side modulation ratio command VREF1 and the secondary-side modulation ratio command VREF2 are appropriately adjusted regardless of a magnitude relation between the primary-side terminal voltage V10 and the secondary-side terminal voltage V20, and the coupling reactor current IL is consistent with the coupling-reactor current command IL* while being limited within the range of ±500 A. It is found that the coupling unit power PL is consistent with the power command P* in the region where the coupling reactor current IL is within the range of ±500 A, and when the coupling reactor current IL is limited within the range of ±500 KW, the coupling unit power PL is smaller than the power command P* by an insufficient amount of the coupling reactor current IL.

In this manner, the coupling reactor current IL can be limited to the value set by the limiter 70a. Therefore, even when the excessive power command P* is input, the switching elements 11a to 12b are prevented from breakage because of overcurrent.

Second Embodiment

A configuration of a bidirectional buck boost DC-DC converter according to the second embodiment of the present invention is explained in detail below with reference to the drawings. Only parts different from the bidirectional buck boost DC-DC converter in the first embodiment of the present invention are described below.

Figure 16:
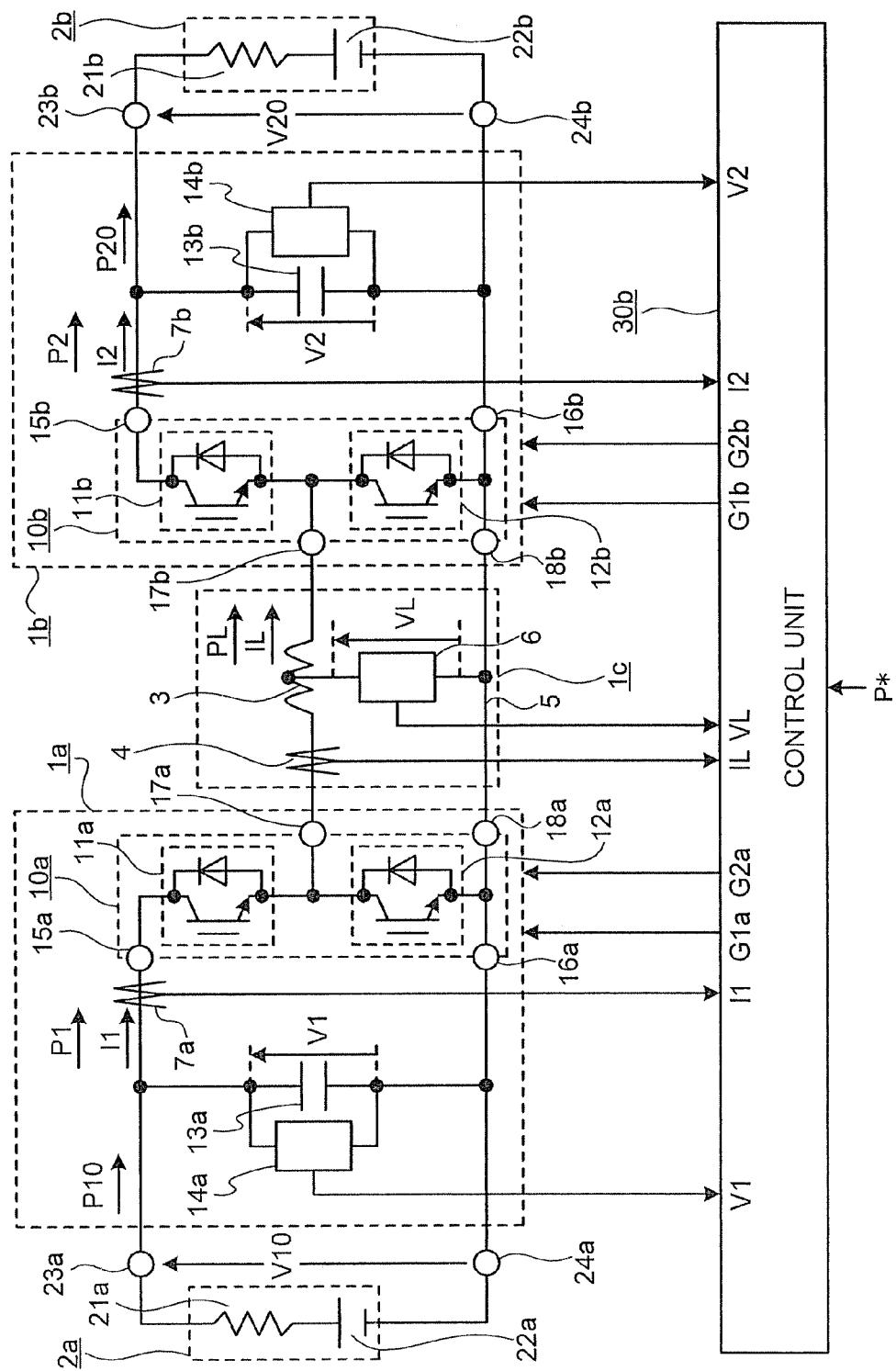
FIG. 16 is a configuration diagram of a bidirectional buck boost DC-DC converter according to a second embodiment.

FIG. 16 is a configuration diagram of the bidirectional buck boost DC-DC converter according to the second embodiment of the present invention. In addition to the above first embodiment, the bidirectional buck boost DC-DC converter in the second embodiment includes a current detector 7a that detects the primary-side switching circuit current I1 and a current detector 7b that detects the secondary-side switching circuit current I2. Furthermore, a configuration of a control unit 30b has the following characteristics.

Figure 17:
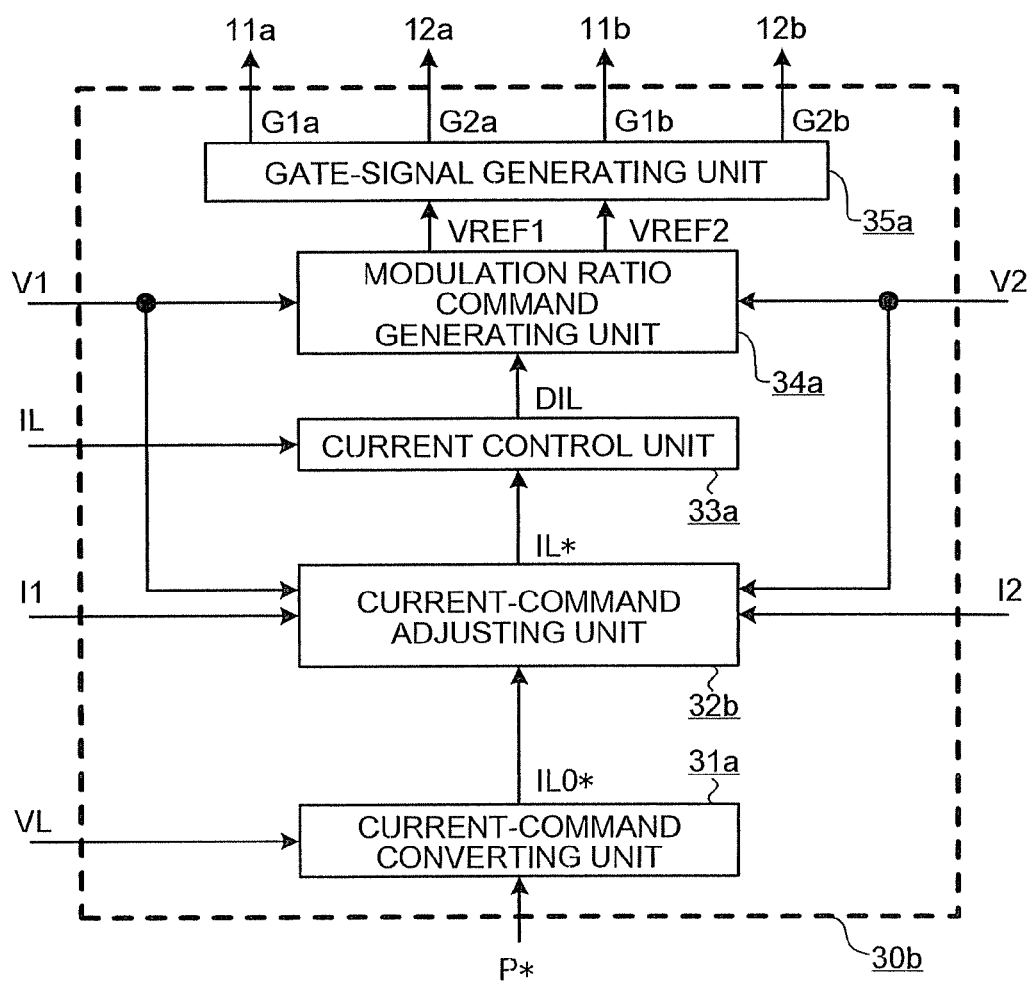
FIG. 17 is a diagram illustrating a configuration example of a control unit 30b according to the second embodiment.

FIG. 17 is a diagram illustrating a configuration example of the control unit 30b according to the second embodiment of the present invention. A current-command adjusting unit 32b is configured such that the primary-side switching circuit current I1, the secondary-side switching circuit current I2, the primary-side capacitor voltage V1, and the secondary-side capacitor voltage V2 are input, and has the following characteristics.

Figure 18:
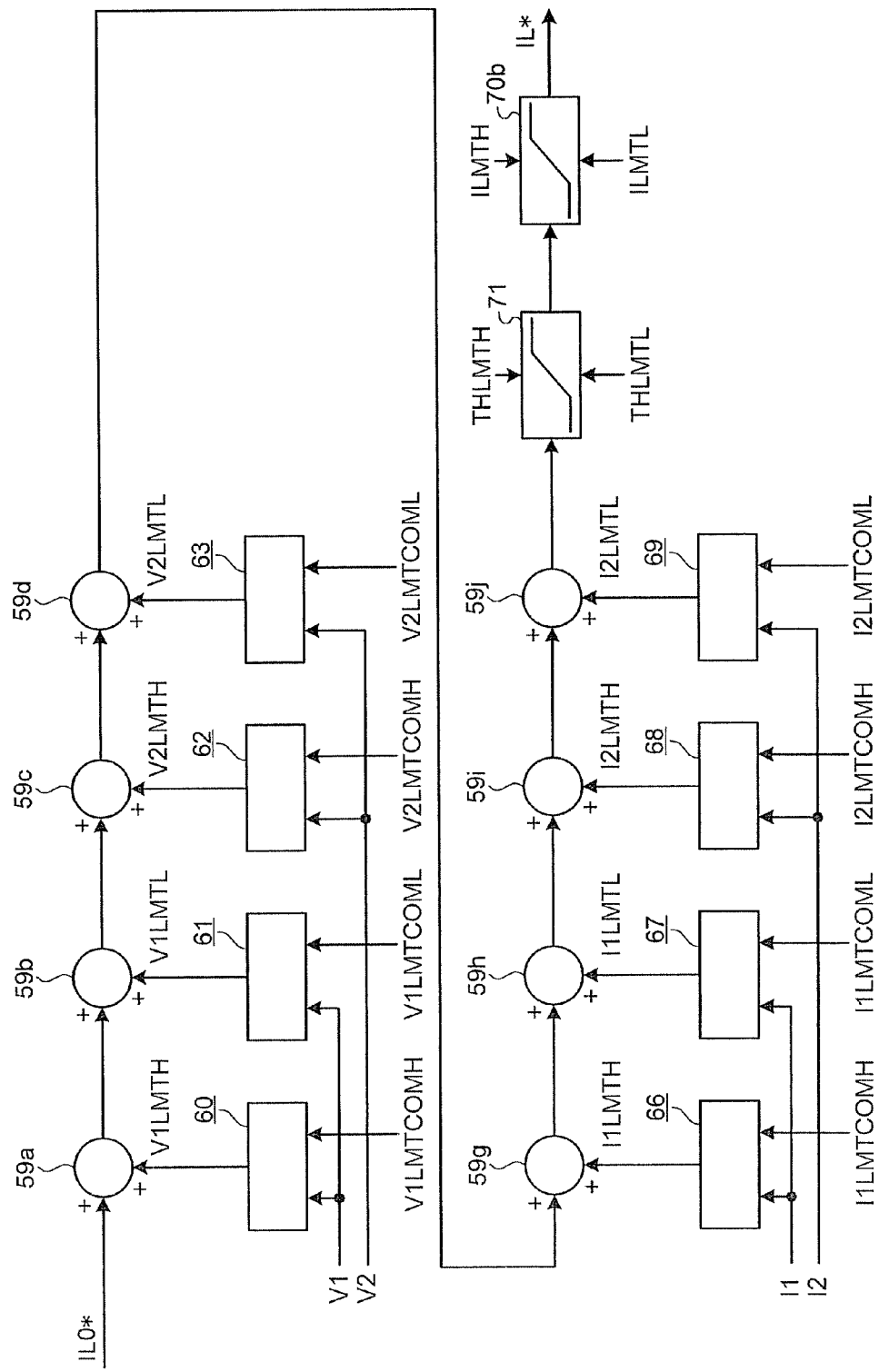
FIG. 18 is a diagram illustrating a configuration example of a current-command adjusting unit 32b according to the second embodiment.

FIG. 18 is a diagram illustrating a configuration example of the current-command adjusting unit 32b according to the second embodiment of the present invention.

As shown in FIG. 18, in the current-command adjusting unit 32b, the coupling-reactor base current command IL0* that is input from the current-command converting unit 31a is corrected by adding a primary-side capacitor-voltage upper-limit limiting operation amount V1LMTH calculated in a primary-side capacitor-voltage upper-limit limiting operation-amount calculating unit 60, a primary-side capacitor-voltage lower-limit limiting operation amount V1LMTL calculated in a primary-side capacitor-voltage lower-limit limiting operation-amount calculating unit 61, a secondary-side capacitor-voltage upper-limit limiting operation amount V2LMTH calculated in a secondary-side capacitor-voltage upper-limit limiting operation-amount calculating unit 62, a secondary-side capacitor-voltage lower-limit limiting operation amount V2LMTL calculated in a secondary-side capacitor-voltage lower-limit limiting operation-amount calculating unit 63, a primary-side switching-circuit-current upper-limit limiting operation amount I1LMTH calculated in a primary-side switching-circuit-current upper-limit limiting operation-amount calculating unit 66, a primary-side switching-circuit-current lower-limit limiting operation amount I1LMTL calculated in a primary-side switching-circuit-current lower-limit limiting operation-amount calculating unit 67, a secondary-side switching-circuit-current upper-limit limiting operation amount I2LMTH calculated in a secondary-side switching-circuit-current upper-limit limiting operation-amount calculating unit 68, and a secondary-side switching-circuit-current lower-limit limiting operation amount I2LMTL calculated in a secondary-side switching-circuit-current lower-limit limiting operation-amount calculating unit 69, in adders 59a to 59j, by using the primary-side capacitor voltage V1, the secondary-side capacitor voltage V2, the primary-side switching circuit current I1, the secondary-side switching circuit current I2, a primary-side capacitor-voltage upper-limit limiting value V1LMTCOMH, a primary-side capacitor-voltage lower-limit limiting value V1LMTCOML, a secondary-side capacitor-voltage upper-limit limiting value V2LMTCOMH, a secondary-side capacitor-voltage lower-limit limiting value V2LMTCOML, a primary-side switching-circuit-current upper-limit limiting value I1LMTCOMH, a primary-side switching-circuit-current lower-limit limiting value I1LMTCOML, a secondary-side switching-circuit-current upper-limit limiting value I2LMTCOMH, a secondary-side switching-circuit-current lower-limit limiting value I2LMTCOML, a temperature-protecting-current-command upper-limit limiting value THLMTH, a temperature-protecting-current-command lower-limit limiting value THLMTL, the current-command upper-limit limiting value ILMTH, and a current-command lower-limit limiting value ILMTL, and thereafter is limited by a limiter 71 that limits the coupling-reactor base current command IL0* to the temperature-protecting-current-command upper-limit limiting value THLMTH and the temperature-protecting-current-command lower-limit limiting value THLMTL and a limiter 70b that limits the coupling-reactor base current command IL0* to the current-command upper-limit limiting value ILMTH and the current-command lower-limit limiting value ILMTL, thereby generating the coupling-reactor current command IL*.

The limiter 71 performs a current command limitation for protection from excessive heat. For example, the limiter 71 determines the temperature-protecting-current-command upper-limit limiting value THLMTH and the temperature-protecting-current-command lower-limit limiting value THLMTL depending upon the value detected by a temperature sensor (not shown) that can detect temperature of the primary-side power supply 2a, the secondary-side power supply 2b, the switching elements 11a to 12b, and the coupling reactor 3, and limits the magnitude of the coupling-reactor current command IL* when the temperature rises, thereby suppressing temperature rise of the primary-side power supply 2a, the secondary-side power supply 2b, the switching elements 11a to 12b, and the coupling reactor 3. Therefore, the limiter 70 is operated to avoid the primary-side power supply 2a, the secondary-side power supply 2b, the switching elements 11a to 12b, and the coupling reactor 3 from being damaged due to excessive heat.

Hereinafter, configuration examples of the primary-side capacitor-voltage upper-limit limiting operation-amount calculating unit 60, the primary-side capacitor-voltage lower-limit limiting operation-amount calculating unit 61, the secondary-side capacitor-voltage upper-limit limiting operation-amount calculating unit 62, the secondary-side capacitor-voltage lower-limit limiting operation-amount calculating unit 63, the primary-side switching-circuit-current upper-limit limiting operation-amount calculating unit 66, the primary-side switching-circuit-current lower-limit limiting operation-amount calculating unit 67, the secondary-side switching-circuit-current upper-limit limiting operation-amount calculating unit 68, and the secondary-side switching-circuit-current lower-limit limiting operation-amount calculating unit 69 are explained.

Figure 19:
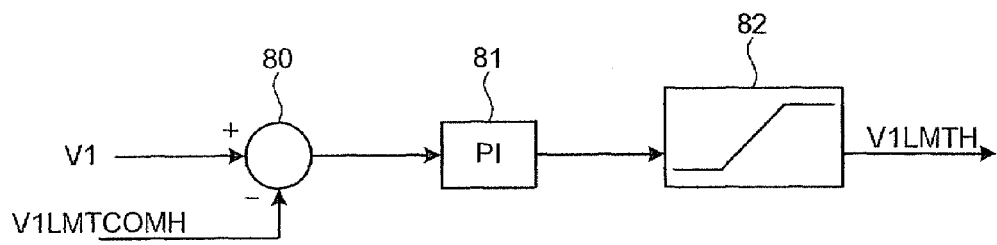
FIG. 19 is a diagram illustrating a configuration example of a primary-side capacitor-voltage upper-limit limiting operation-amount calculating unit 60 according to the second embodiment.

FIG. 19 is a diagram illustrating a configuration example of the primary-side capacitor voltage upper-limit limiting operation-amount calculating unit 60 according to the second embodiment of the present invention. The configuration can be such that a low-pass filter or the like is inserted into input and output of a function block of a subtractor 80 or the like to remove unnecessary frequency components, although not shown.

As shown in FIG. 19, the primary-side capacitor-voltage upper-limit limiting value V1LMTCOMH is subtracted from the primary-side capacitor voltage V1 in the subtractor 80 in the primary-side capacitor-voltage upper-limit limiting operation-amount calculating unit 60 to obtain a deviation. The deviation is amplified by a proportional-integral controller 81 and the negative side of the amplified deviation is cut off by a negative-side limiter 82, which is output as the primary-side capacitor-voltage upper-limit limiting operation amount V1LMTH.

In this manner, when the primary-side capacitor voltage V1 becomes equal to or higher than the primary-side capacitor-voltage upper-limit limiting value V1LMTCOMH, the primary-side capacitor-voltage upper-limit limiting operation amount V1LMTH is output depending upon the deviation, and the coupling-reactor current command IL* is increased, whereby the coupling unit power PL is increased, and rise of the primary-side capacitor voltage V1 is suppressed. Therefore, the primary-side capacitor voltage V1 can be kept close to the primary-side capacitor-voltage upper-limit limiting value V1LMTCOMH.

Figure 20:
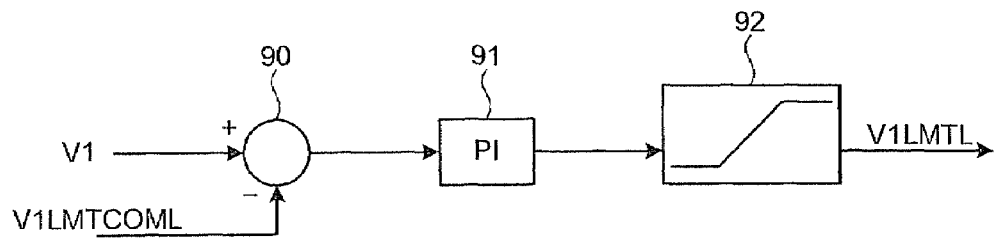
FIG. 20 is a diagram illustrating a configuration example of a primary-side capacitor-voltage lower-limit limiting operation-amount calculating unit 61 according to the second embodiment.

FIG. 20 is a diagram illustrating a configuration example of the primary-side capacitor-voltage lower-limit limiting operation-amount calculating unit 61 according to the second embodiment of the present invention. The configuration can be such that a low-pass filter or the like is inserted into input and output of a function block of a subtractor 90 or the like to remove unnecessary frequency components, although not shown.

As shown in FIG. 20, the primary-side capacitor-voltage low-limit limiting value V1LMTCOML is subtracted from the primary-side capacitor voltage V1 in the subtractor 90 in the primary-side capacitor-voltage lower-limit limiting operation-amount calculating unit 61 to obtain a deviation. The deviation is amplified by a proportional-integral controller 91 and the positive side of the amplified deviation is cut off by a positive-side limiter 92, which is output as the primary-side capacitor-voltage lower-limit limiting operation amount V1LMTL.

In this manner, when the primary-side capacitor voltage V1 becomes equal to or lower than the primary-side capacitor-voltage lower-limit limiting value V1LMTCOML, the primary-side capacitor-voltage lower-limit limiting operation amount V1LMTL is output depending upon the deviation, and the coupling-reactor current command IL* is decreased, whereby the coupling unit power PL is decreased, and drop of the primary-side capacitor voltage V1 is suppressed. Therefore, the primary-side capacitor voltage V1 can be kept close to the primary-side capacitor-voltage lower-limit limiting value V1LMTCOML.

Figure 21:
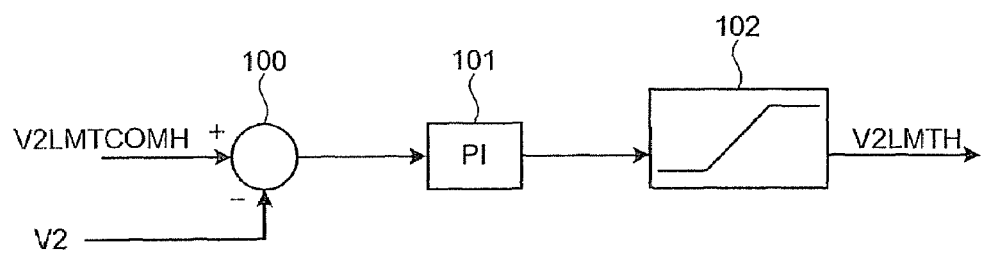
FIG. 21 is a diagram illustrating a configuration example of a secondary-side capacitor-voltage upper-limit limiting operation-amount calculating unit 62 according to the second embodiment.

FIG. 21 is a diagram illustrating a configuration example of the secondary-side capacitor voltage upper-limit limiting operation-amount calculating unit 62 according to the second embodiment of the present invention. The configuration can be such that a low-pass filter or the like is inserted into input and output of a function block of a subtractor 100 or the like to remove unnecessary frequency components, although not shown.

As shown in FIG. 21, the secondary-side capacitor voltage V2 is subtracted from the secondary-side capacitor-voltage upper-limit limiting value V2LMTCOMH in the subtractor 100 in the secondary-side capacitor-voltage upper-limit limiting operation-amount calculating unit 62 to obtain a deviation. The deviation is amplified by a proportional-integral controller 101 and the positive side of the amplified deviation is cut off by a positive-side limiter 102, which is output as the secondary-side capacitor-voltage upper-limit limiting operation amount V2LMTH.

In this manner, when the secondary-side capacitor voltage V2 becomes equal to or higher than the secondary-side capacitor-voltage upper-limit limiting value V2LMTCOMH, the secondary-side capacitor-voltage upper-limit limiting operation amount V2LMTH is output depending upon the deviation, and the coupling-reactor current command IL* is decreased, whereby the coupling unit power PL is decreased, and rise of the secondary-side capacitor voltage V2 is suppressed. Therefore, the secondary-side capacitor voltage V2 can be kept close to the secondary-side capacitor-voltage upper-limit limiting value V2LMTCOMH.

Figure 22:
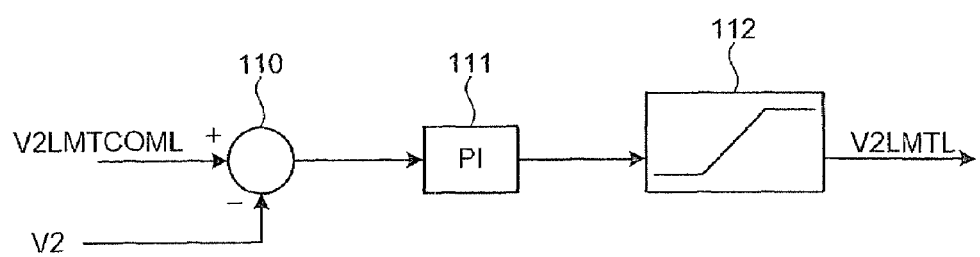
FIG. 22 is a diagram illustrating a configuration example of a secondary-side capacitor-voltage lower-limit limiting operation-amount calculating unit 63 according to the second embodiment.

FIG. 22 is a diagram illustrating a configuration example of the secondary-side capacitor voltage lower-limit limiting operation-amount calculating unit 63 according to the second embodiment of the present invention. The configuration can be such that a low-pass filter or the like is inserted into input and output of a function block of a subtractor 110 or the like to remove unnecessary frequency components, although not shown.

As shown in FIG. 22, the secondary-side capacitor voltage V2 is subtracted from the secondary-side capacitor-voltage lower-limit limiting value V2LMTCOML in the subtractor 110 in the secondary-side capacitor-voltage lower-limit limiting operation-amount calculating unit 63 to obtain a deviation. The deviation is amplified by a proportional-integral controller 111 and the negative side of the amplified deviation is cut off by a negative-side limiter 112, which is output as the secondary-side capacitor-voltage lower-limit limiting operation amount V2LMTL.

In this manner, when the secondary-side capacitor voltage V2 becomes equal to or lower than the secondary-side capacitor-voltage lower-limit limiting value V2LMTCOML, the secondary-side capacitor-voltage lower-limit limiting operation amount V2LMTL is output depending upon the deviation, and the coupling-reactor current command IL* is increased, whereby the coupling unit power PL is increased, and drop of the secondary-side capacitor voltage V2 is suppressed. Therefore, the secondary-side capacitor voltage V2 can be kept close to the secondary-side capacitor-voltage lower-limit limiting value V2LMTCOML.

Figure 23:
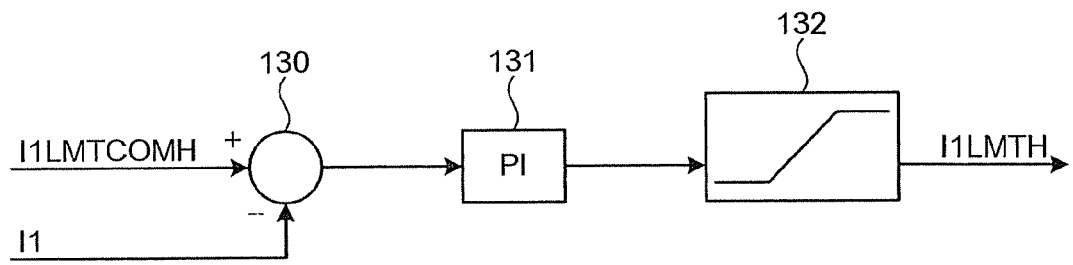
FIG. 23 is a diagram illustrating a configuration example of a primary-side switching-circuit-current upper-limit limiting operation-amount calculating unit 66 according to the second embodiment.

FIG. 23 is a diagram illustrating a configuration example of the primary-side switching-circuit-current upper-limit limiting operation-amount calculating unit 66 according to the second embodiment of the present invention. The configuration can be such that a low-pass filter or the like is inserted into input and output of a function block of a subtractor 130 or the like to remove unnecessary frequency components, although not shown.

As shown in FIG. 23, the primary-side switching circuit current I1 is subtracted from the primary-side switching-circuit-current upper-limit limiting value I1LMTCOMH in the subtractor 130 in the primary-side switching-circuit-current upper-limit limiting operation-amount calculating unit 66 to obtain a deviation. The deviation is amplified by a proportional-integral controller 131 and the positive side of the amplified deviation is cut off by a positive-side limiter 132, which is output as the primary-side switching-circuit-current upper-limit limiting operation amount I1LMTH.

With this configuration, when the primary-side switching circuit current I1 becomes equal to or higher than the primary-side switching-circuit-current upper-limit limiting value I1LMTCOMH, the primary-side switching-circuit-current upper-limit limiting operation amount I1LMTH is output depending upon the deviation, and the coupling-reactor current command IL* is decreased, whereby the coupling unit power PL is decreased, and rise of the primary-side switching circuit current I1 is suppressed. Therefore, the primary-side switching circuit current I1 can be kept close to the primary-side switching-circuit-current upper-limit limiting value I1LMTCOMH.

Figure 24:
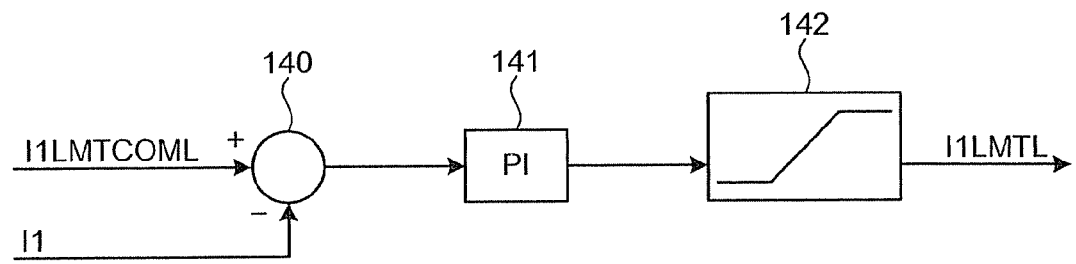
FIG. 24 is a diagram illustrating a configuration example of a primary-side switching-circuit-current upper-limit limiting operation-amount calculating unit 67 according to the second embodiment.

FIG. 24 is a diagram illustrating a configuration example of the primary-side switching-circuit-current lower-limit limiting operation-amount calculating unit 67 according to the second embodiment of the present invention. The configuration can be such that a low-pass filter or the like is inserted into input and output of a function block of a subtractor 140 or the like to remove unnecessary frequency components, although not shown.

As shown in FIG. 24, the primary-side switching circuit current I1 is subtracted from the primary-side switching-circuit-current lower-limit limiting value I1LMTCOML in the subtractor 140 in the primary-side switching-circuit-current lower-limit limiting operation-amount calculating unit 67 to obtain a deviation. The deviation is amplified by a proportional-integral controller 141 and the negative side of the amplified deviation is cut off by a negative-side limiter 142, which is output as the primary-side switching-circuit-current lower-limit limiting operation amount I1LMTL.

With this configuration, when the primary-side switching circuit current I1 becomes equal to or lower than the primary-side switching-circuit-current lower-limit limiting value I1LMTCOML, the primary-side switching-circuit-current lower-limit limiting operation amount I1LMTL is output depending upon the deviation, and the coupling-reactor current command IL* is increased, whereby the coupling unit power PL is increased, and drop of the primary-side switching circuit current I1 is suppressed. Therefore, the primary-side switching circuit current I1 can be kept close to the primary-side switching-circuit-current lower-limit limiting value I1LMTCOML.

Figure 25:
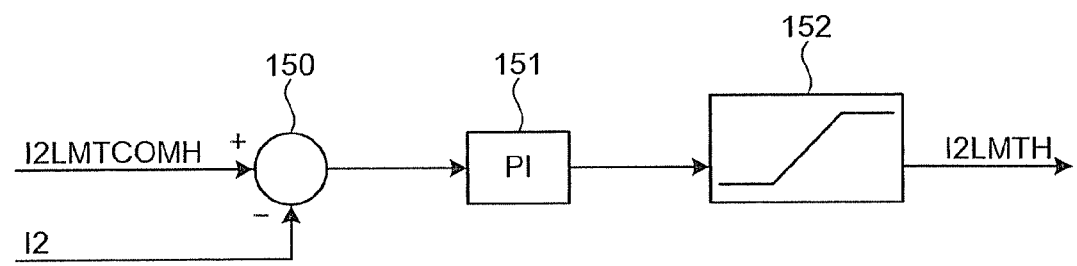
FIG. 25 is a diagram illustrating a configuration example of a secondary-side switching-circuit-current upper-limit limiting operation-amount calculating unit 68 according to the second embodiment.

FIG. 25 is a diagram illustrating a configuration example of the secondary-side switching-circuit-current upper-limit limiting operation-amount calculating unit 68 according to the second embodiment of the present invention. The configuration can be such that a low-pass filter or the like is inserted into input and output of a function block of a subtractor 150 or the like to remove unnecessary frequency components, although not shown.

As shown in FIG. 25, the secondary-side switching circuit current I2 is subtracted from the secondary-side switching-circuit-current upper-limit limiting value I2LMTCOMH in the subtractor 150 in the secondary-side switching-circuit-current upper-limit limiting operation-amount calculating unit 68 to obtain a deviation. The deviation is amplified by a proportional-integral controller 151 and the positive side of the amplified deviation is cut off by a positive-side limiter 152, which is output as the secondary-side switching-circuit-current upper-limit limiting operation amount I2LMTH.

With this configuration, when the secondary-side switching circuit current I2 becomes equal to or higher than the secondary-side switching-circuit-current upper-limit limiting value I2LMTCOMH, the secondary-side switching-circuit-current upper-limit limiting operation amount I2LMTH is output depending upon the deviation, and the coupling-reactor current command IL* is decreased, whereby the coupling unit power PL is decreased, and rise of the secondary-side switching circuit current I2 is suppressed. Therefore, the secondary-side switching circuit current I2 can be kept close to the secondary-side switching-circuit-current upper-limit limiting value I2LMTCOMH.

Figure 26:
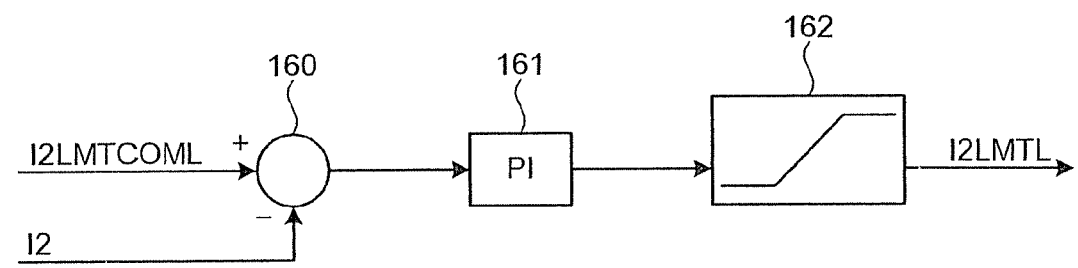
FIG. 26 is a diagram illustrating a configuration example of a secondary-side switching-circuit-current upper-limit limiting operation-amount calculating unit 69 according to the second embodiment.

FIG. 26 is a diagram illustrating a configuration example of a secondary-side switching-circuit-current lower-limit limiting operation-amount calculating unit 69 according to the second embodiment of the present invention. The configuration can be such that a low-pass filter or the like is inserted into input and output of a function block of a subtractor 160 or the like to remove unnecessary frequency components, although not shown.

As shown in FIG. 26, the secondary-side switching circuit current I2 is subtracted from the secondary-side switching-circuit-current lower-limit limiting value I2LMTCOML in the subtractor 160 in the secondary-side switching-circuit-current lower-limit limiting operation-amount calculating unit 69 to obtain a deviation. The deviation is amplified by a proportional-integral controller 161 and the negative side of the amplified deviation is cut off by a negative-side limiter 162, which is output as the secondary-side switching-circuit-current lower-limit limiting operation amount I2LMTL.

With this configuration, when the secondary-side switching circuit current I2 becomes equal to or lower than the secondary-side switching-circuit-current lower-limit limiting value I2LMTCOML, the secondary-side switching-circuit-current lower-limit limiting operation amount I2LMTL is output depending upon the deviation, and the coupling-reactor current command IL* is increased, whereby the coupling unit power PL is increased, and drop of the secondary-side switching circuit current I2 is suppressed. Therefore, the secondary-side switching circuit current I2 can be kept close to the secondary-side switching-circuit-current lower-limit limiting value I2LMTCOML.

The current-command adjusting unit 32b is configured as above, so that it is possible to protect the primary-side power supply 2a, the secondary-side power supply 2b, the primary-side converting unit 1a, the secondary-side converting unit 1b, and the coupling reactor 3 from overvoltage, overcurrent, and excessive heat.

Third Embodiment

A configuration of a bidirectional buck boost DC-DC converter according to the third embodiment of the present invention is explained in detail below with reference to the drawings. The configuration in the third embodiment is based on that in the second embodiment. Only parts different from the bidirectional buck boost DC-DC converter in the second embodiment of the present invention are described below.

Figure 27:
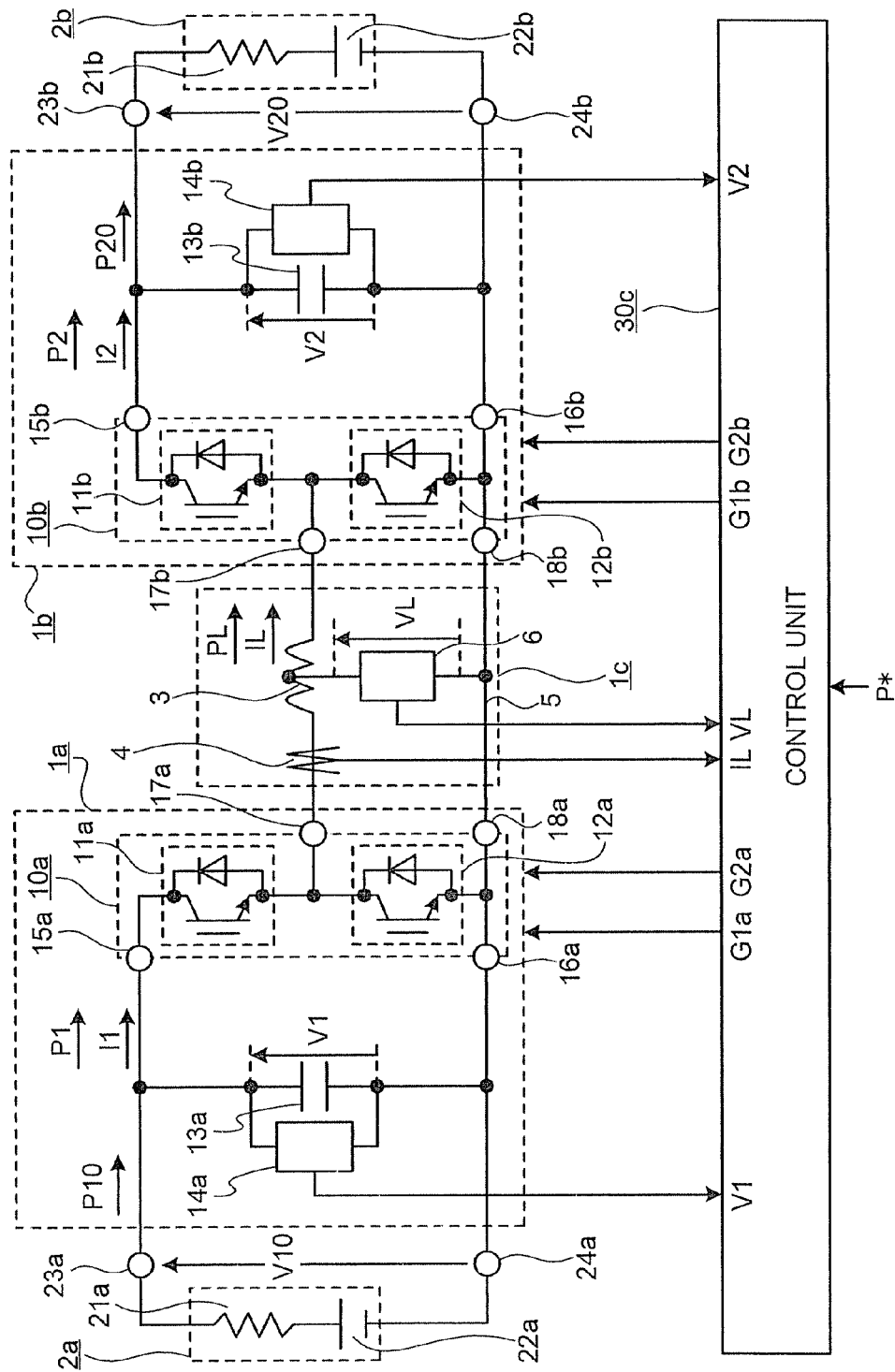
FIG. 27 is a configuration diagram of a bidirectional buck boost DC-DC converter according to a third embodiment.

FIG. 27 is a configuration diagram of the bidirectional buck boost DC-DC converter according to a third embodiment of the present invention. In the bidirectional buck boost DC-DC converter in the third embodiment, the current detector 7a for detecting the primary-side switching circuit current I1 and the current detector 7b for detecting the secondary-side switching circuit current I2 that are provided in the configuration in the second embodiment are omitted. Furthermore, a configuration of a control unit 30c has the following characteristics.

Figure 28:
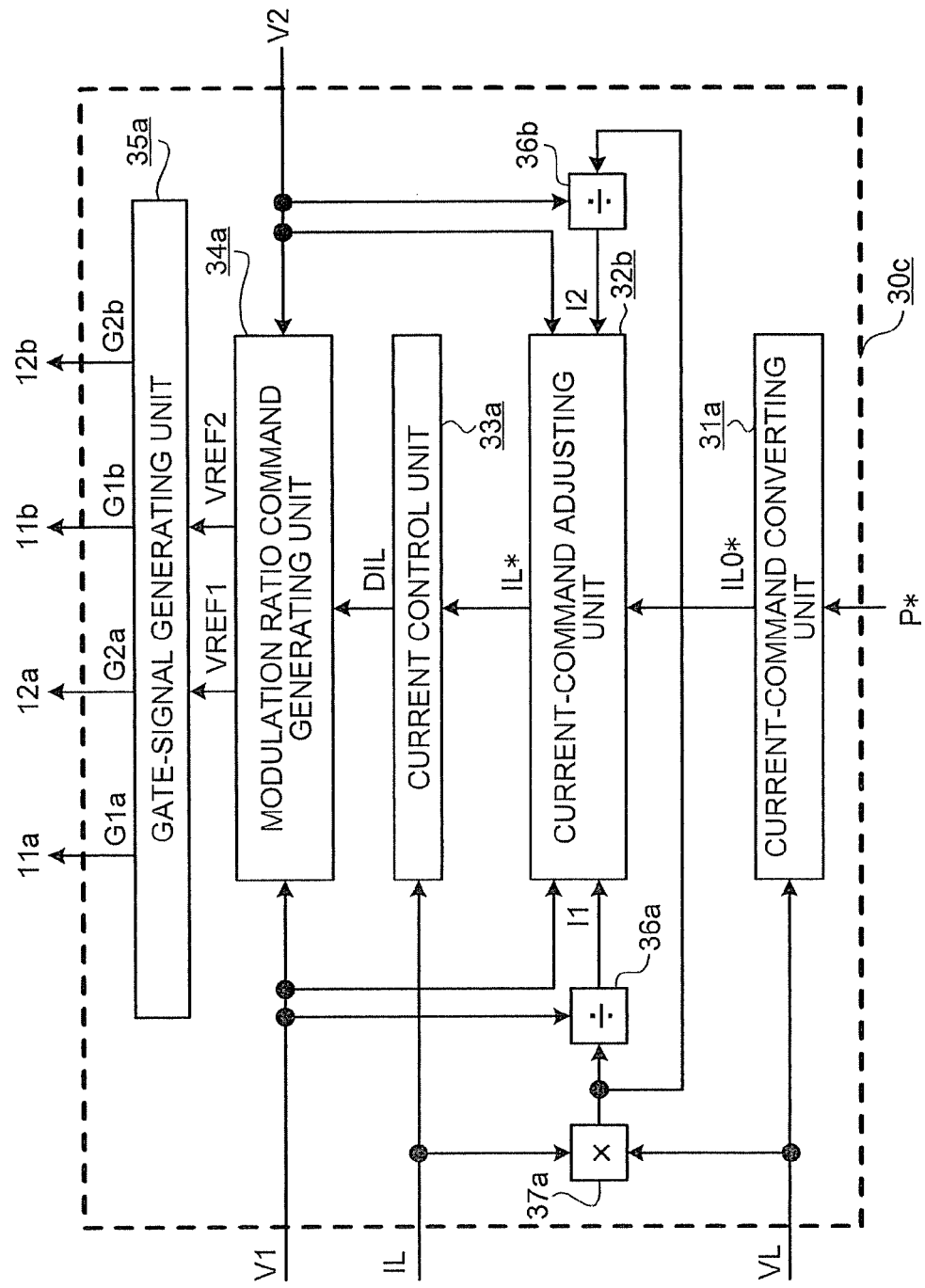
FIG. 28 is a diagram illustrating a configuration example of a control unit 30c according to the third embodiment.

FIG. 28 is a diagram illustrating a configuration example of the control unit 30c according to the third embodiment of the present invention.

As shown in FIG. 28, the primary-side switching circuit current I1 and the secondary-side switching circuit current I2 that are input to the current-command adjusting unit 32b are calculated based on the coupling reactor current IL, the coupling unit voltage VL, the primary-side capacitor voltage V1, and the secondary-side capacitor voltage V2.

As shown in FIG. 27, the power passing through the first terminal 15a and the second terminal 16a of the primary-side switching circuit 10a (hereinafter, referred to as a primary-side switching circuit power P1) and the coupling unit power PL are equal on instantaneous value basis on condition that the loss in the primary-side converting unit 1a and the coupling unit 1c is ignored.

With the use of this, as shown in FIG. 28, a multiplier 37a generates a product of the coupling reactor current IL and the coupling unit voltage VL, and a divider 36a divides the product by the primary-side capacitor voltage V1, thereby obtaining the primary-side switching circuit current I1 in the control unit 30c.

In the same manner, the multiplier 37a generates a product of the coupling reactor current IL and the coupling unit voltage VL, and a divider 36b divides the product by the secondary-side capacitor voltage V2, thereby obtaining the secondary-side switching circuit current I2.

Accordingly, with the above configuration, the bidirectional buck boost DC-DC converter according to the third embodiment of the present invention can perform control using the primary-side switching circuit current I1 and the secondary-side switching circuit current I2 without directly detecting them by the current detectors 7a and 7b. Thus, it is possible to configure a higher-functional control unit without increasing the number of components, size, and weight of the DC-DC converter.

Fourth Embodiment

A configuration of a bidirectional buck boost DC-DC converter according to the fourth embodiment of the present invention is explained in detail below with reference to the drawings. Only parts different from the bidirectional buck boost DC-DC converter in the first embodiment of the present invention are described below.

Figure 29:
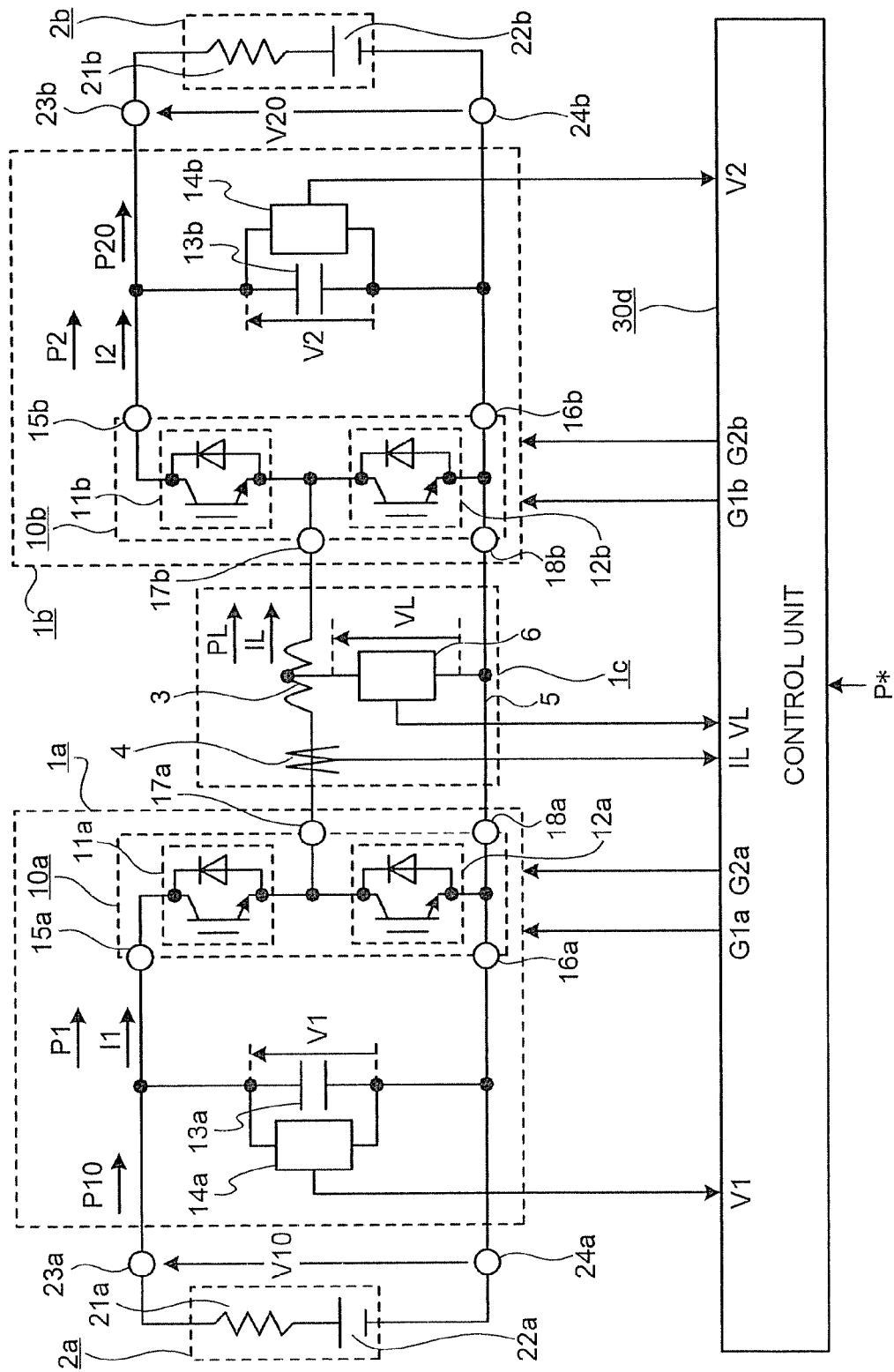
FIG. 29 is a configuration diagram of a bidirectional buck boost DC-DC converter according to a fourth embodiment.

FIG. 29 is a configuration diagram of the bidirectional buck boost DC-DC converter according to the fourth embodiment of the present invention. A control unit 30d has the following characteristics.

Figure 30:
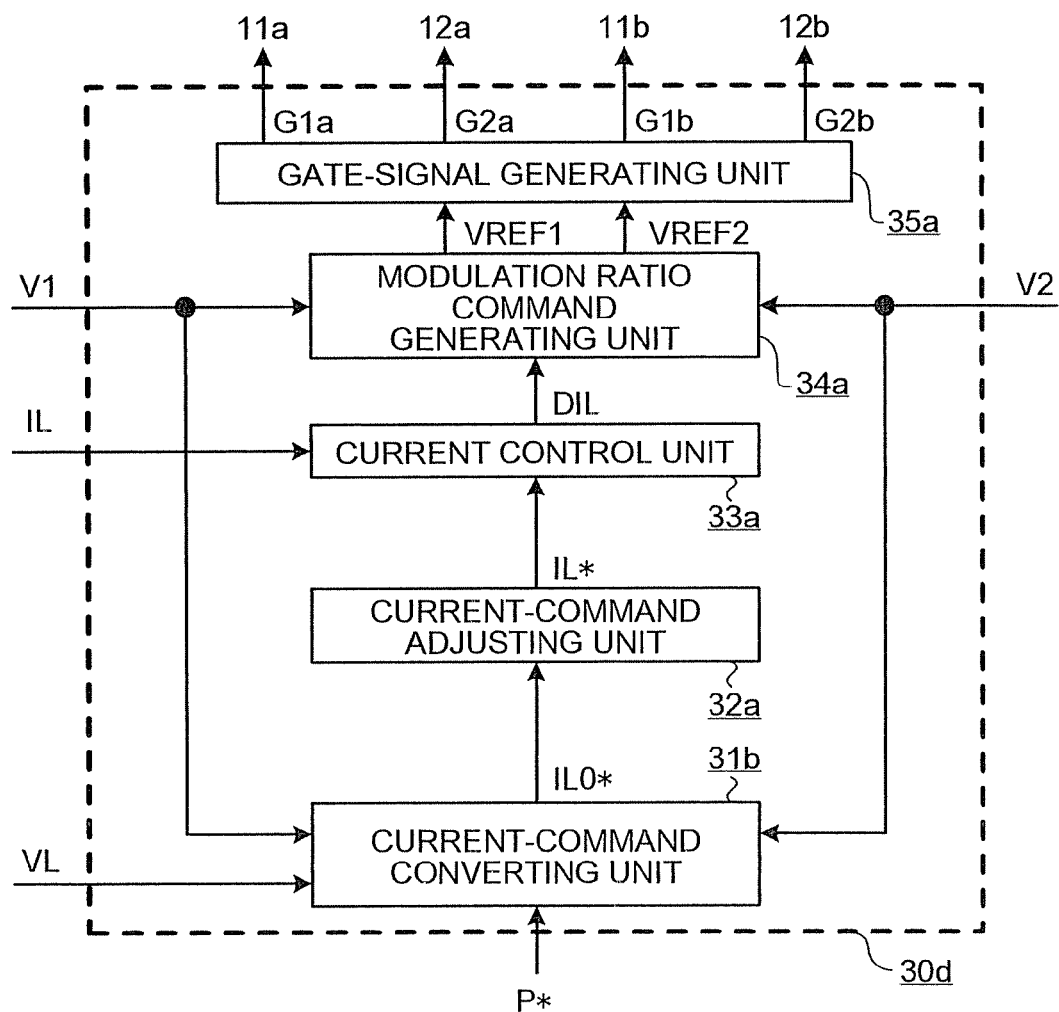
FIG. 30 is a diagram illustrating a configuration example of a control unit 30d according to the fourth embodiment.

FIG. 30 is a diagram illustrating a configuration example of the control unit 30d according to the fourth embodiment of the present invention.

A current-command converting unit 31b is configured such that the primary-side capacitor voltage V1 and the secondary-side capacitor voltage V2 are further input thereto.

Figure 31:
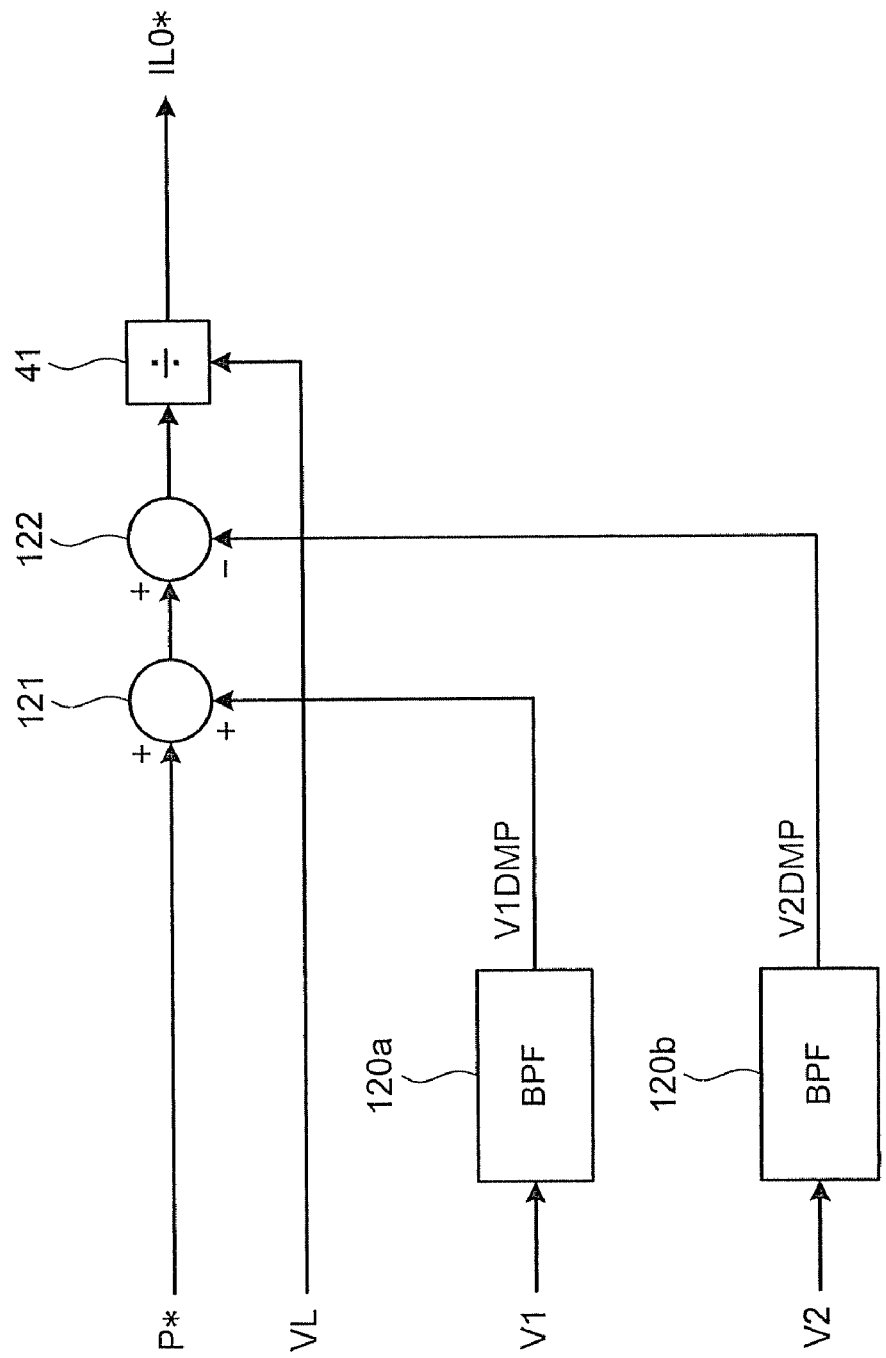
FIG. 31 is a diagram illustrating a configuration example of a current-command converting unit 31b according to the fourth embodiment.

FIG. 31 illustrates a configuration example of the current-command converting unit 31b according to the fourth embodiment of the present invention. As shown in FIG. 31, in the current-command converting unit 31b, the primary-side capacitor voltage V1 and the secondary-side capacitor voltage V2 pass through band-pass filters 120a and 120b, respectively, thereby obtaining a primary-side capacitor-voltage-oscillation suppressing operation amount V1DMP and a secondary-side capacitor-voltage-oscillation suppressing operation amount V2DMP that are alternating current components in which gain and phase are adjusted.

The V1DMP is added to the power command P* by an adder 121 and the V2DMP is subtracted from the power command P* by a subtractor 122, and the result thereof is divided by the coupling unit voltage VL by a divider 41 to be the coupling-reactor base current command IL0*.

With this configuration, when the primary-side capacitor voltage V1 tends to increase, the power command P* is adjusted so that the coupling unit power PL is increased, and when the primary-side capacitor voltage V1 tends to decrease, the power command P* is adjusted so that the coupling unit power PL is decreased.

When the secondary-side capacitor voltage V2 tends to increase, the power command P* is adjusted so that the coupling unit power PL is decreased, and when the secondary-side capacitor voltage V2 tends to decrease, the power command P* is adjusted so that the coupling unit power PL is increased.

With the above configuration, the bidirectional buck boost DC-DC converter according to the fourth embodiment of the present invention can suppress voltage oscillation of the primary-side capacitor voltage V1 and the secondary-side capacitor voltage V2, so that control can be made more stably.

Fifth Embodiment

A configuration of a bidirectional buck boost DC-DC converter according to the fifth embodiment of the present invention is explained in detail below with reference to the drawings. Only parts different from the bidirectional buck boost DC-DC converter in the first embodiment of the present invention are described below.

Figure 32:
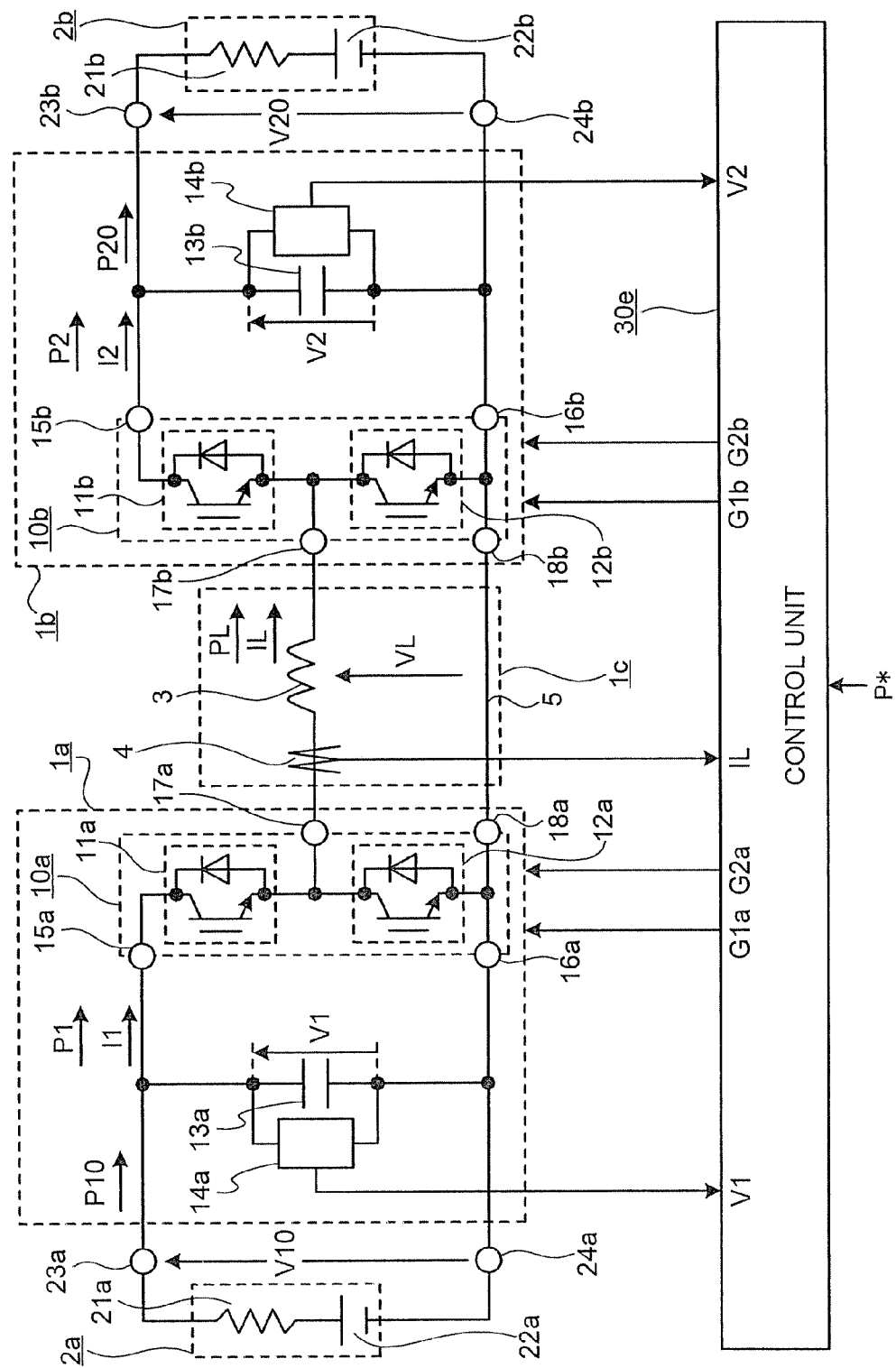
FIG. 32 is a configuration diagram of a bidirectional buck boost DC-DC converter according to a fifth embodiment.

FIG. 32 is a configuration diagram of the bidirectional buck boost DC-DC converter according to the fifth embodiment of the present invention. In the bidirectional buck boost DC-DC converter in the fifth embodiment, the voltage detector 6 that detects the coupling unit voltage VL is omitted, and a control unit 30e has the following characteristics.

Figure 33:
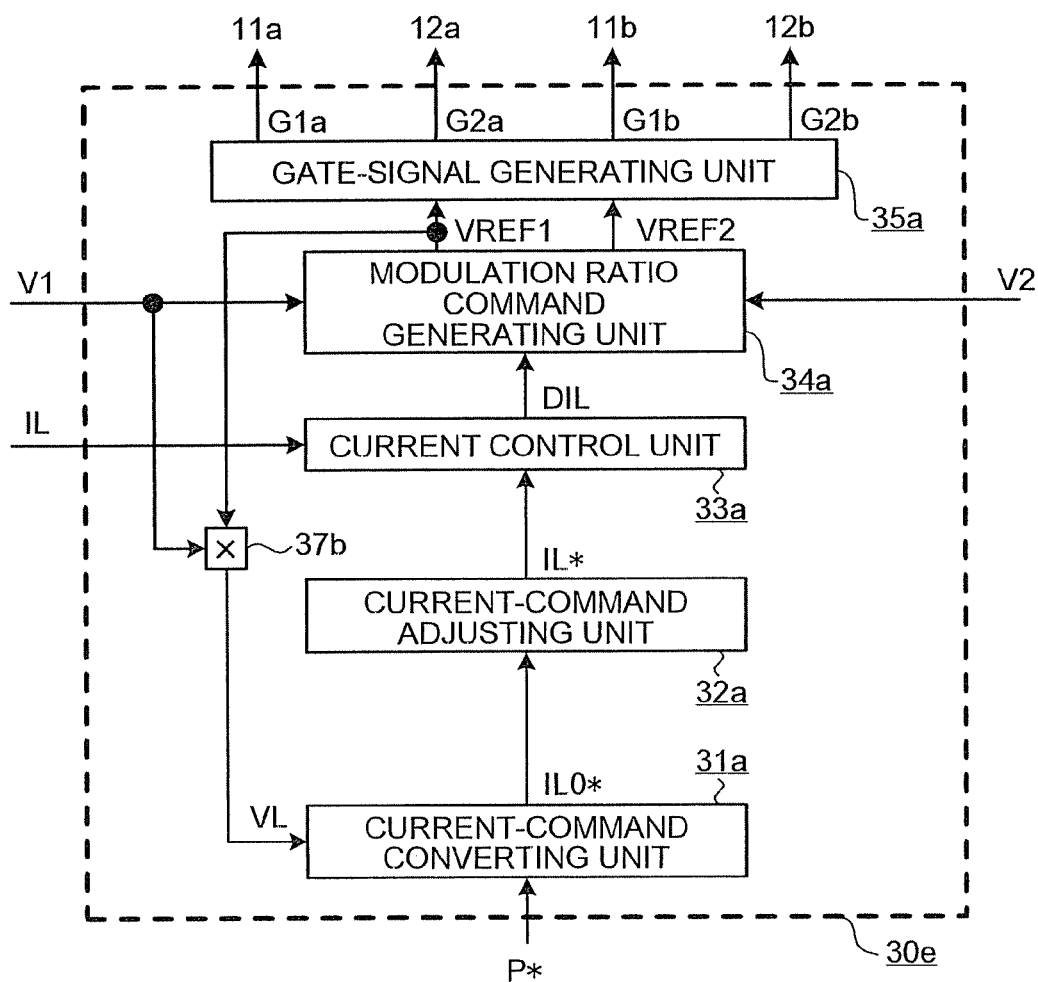
FIG. 33 is a diagram illustrating a configuration example of a control unit 30e according to the fifth embodiment.

FIG. 33 is a diagram illustrating a configuration example of the control unit 30e according to the fifth embodiment of the present invention.

As shown in FIG. 33, a multiplier 37b generates a product of the primary-side capacitor voltage V1 and the primary-side modulation ratio command VREF1, and the result thereof is used as the coupling unit voltage VL.

With the above configuration, the bidirectional buck boost DC-DC converter according to the fifth embodiment of the present invention can omit the voltage detector 6 that detects the coupling unit voltage VL, so that the apparatus as a whole can be configured smaller and more lightweight.

Sixth Embodiment

A configuration of a bidirectional buck boost DC-DC converter according to the sixth embodiment of the present invention is explained in detail below with reference to the drawings. Only parts different from the bidirectional buck boost DC-DC converter in the first embodiment of the present invention are described below.

Figure 34:
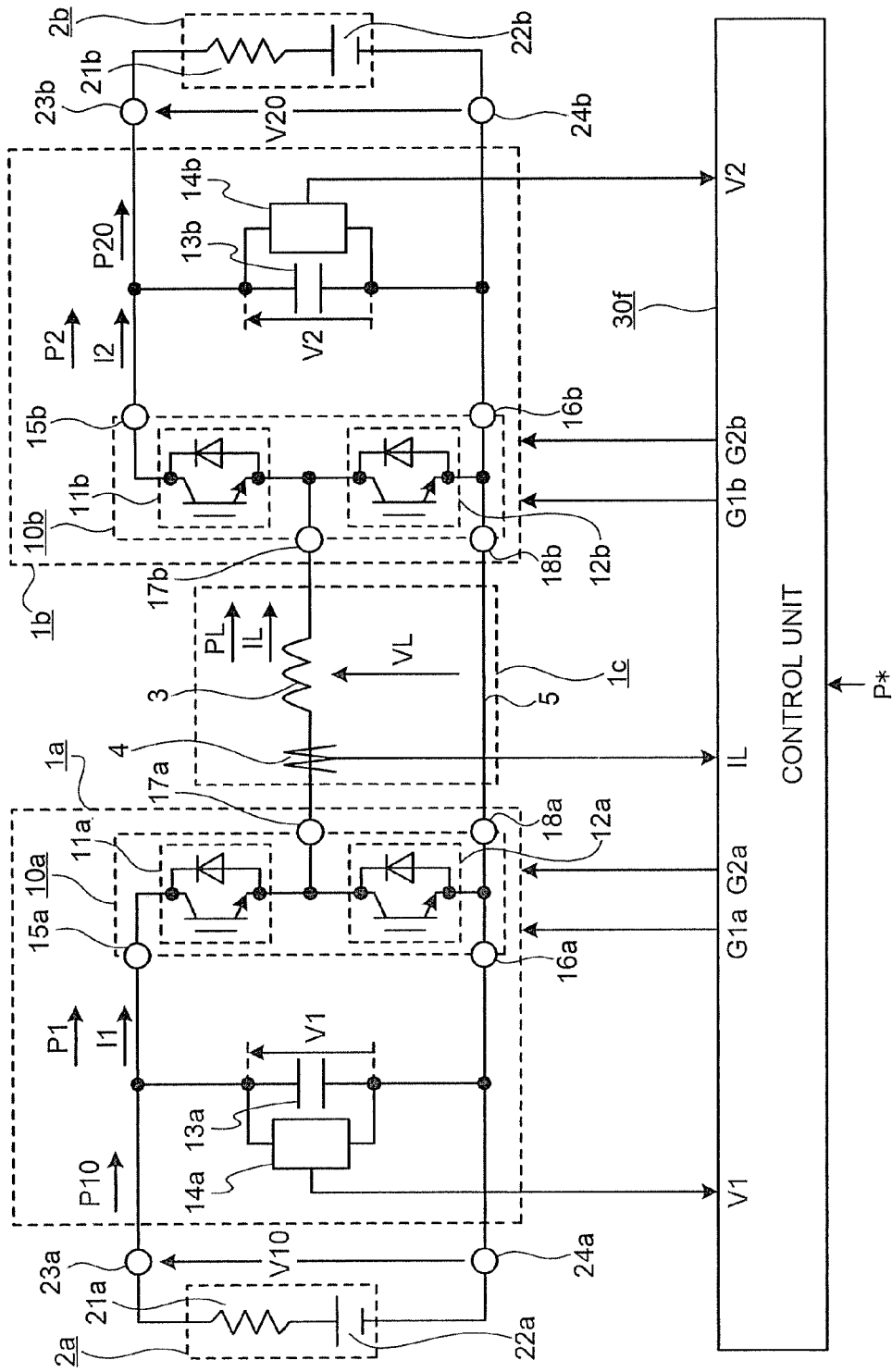
FIG. 34 is a configuration diagram of a bidirectional buck boost DC-DC converter according to a sixth embodiment.

FIG. 34 is a configuration diagram of the bidirectional buck boost DC-DC converter according to the sixth embodiment of the present invention. In the bidirectional buck boost DC-DC converter in the sixth embodiment, the voltage detector 6 that detects the coupling unit voltage VL is omitted, and a control unit 30f has the following characteristics.

Figure 35:
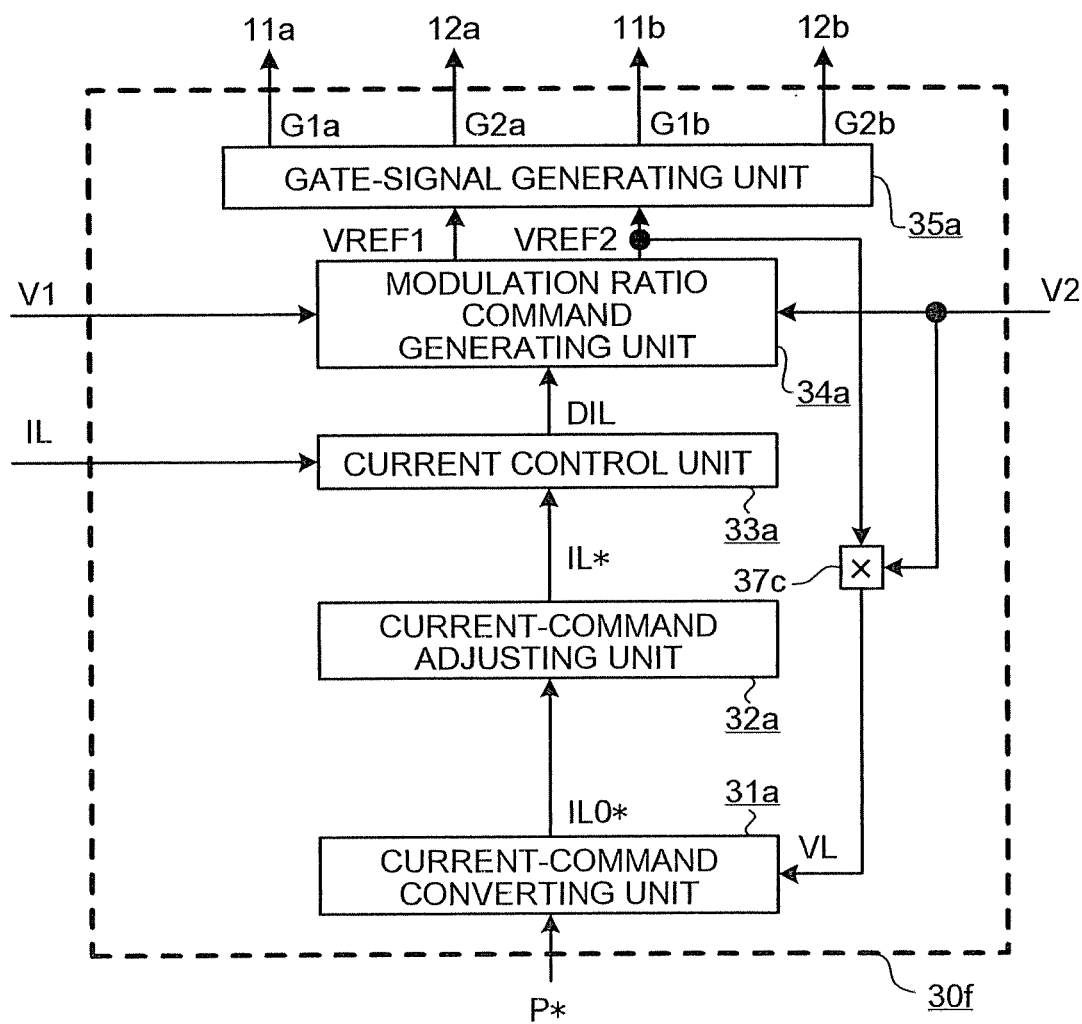
FIG. 35 is a diagram illustrating a configuration example of a control unit 30f according to the sixth embodiment.

FIG. 35 is a diagram illustrating a configuration example of the control unit 30f according to the sixth embodiment of the present invention.

As shown in FIG. 35, a multiplier 37c in the control unit 30f generates a product of the secondary-side capacitor voltage V2 and the secondary-side modulation ratio command VREF2, and the result thereof is used as the coupling unit voltage VL.

With the above configuration, the bidirectional buck boost DC-DC converter according to the sixth embodiment of the present invention can omit the voltage detector 6 that detects the coupling unit voltage VL, so that the apparatus as a whole can be configured smaller and more lightweight.

Seventh Embodiment

A configuration of a bidirectional buck boost DC-DC converter according to the seventh embodiment of the present invention is explained in detail below with reference to the drawings. Only parts different from the bidirectional buck boost DC-DC converter in the first embodiment of the present invention are described below.

Figure 36:
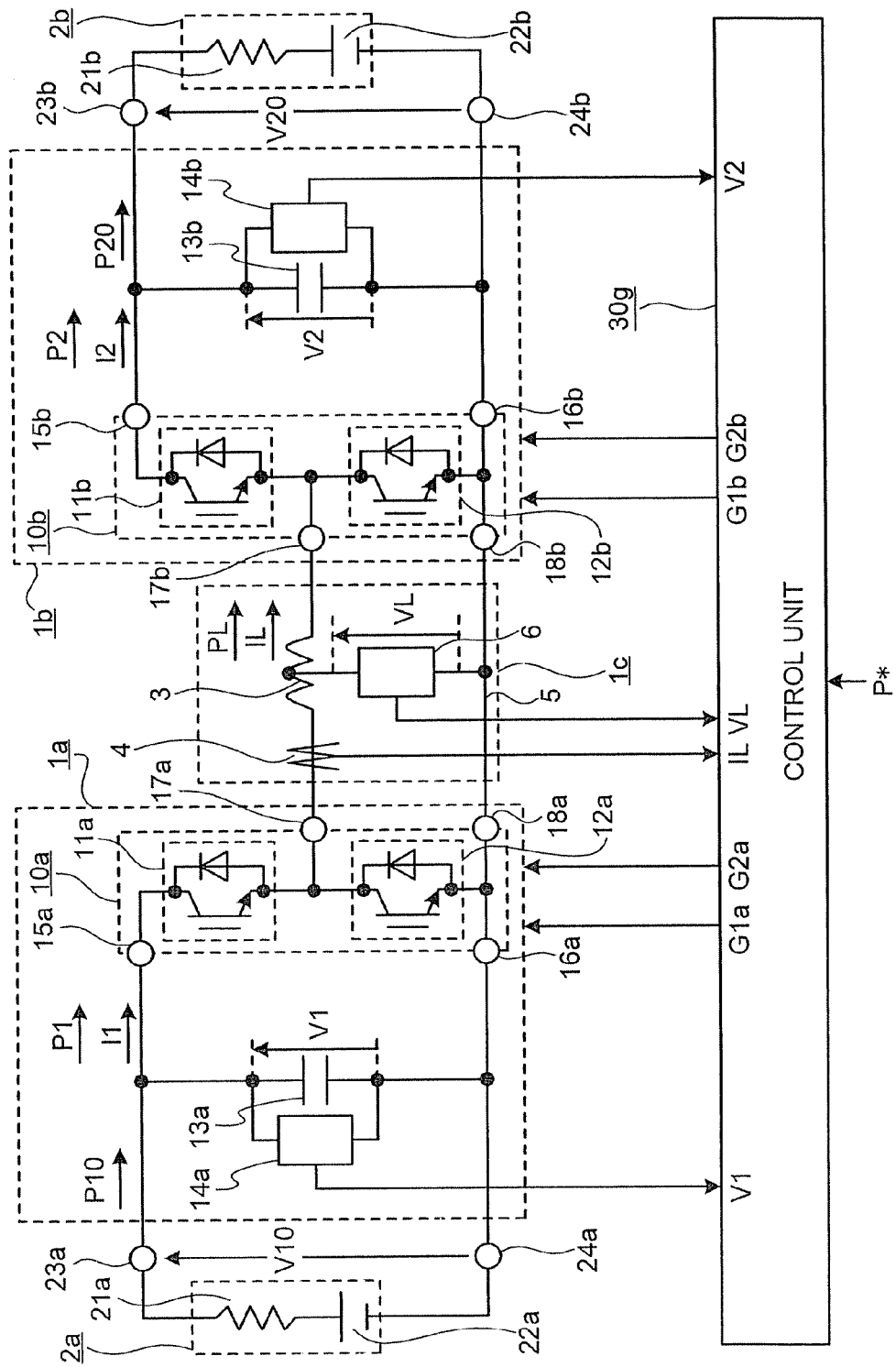
FIG. 36 is a configuration diagram of a bidirectional buck boost DC-DC converter according to a seventh embodiment.

FIG. 36 is a configuration diagram of the bidirectional buck boost DC-DC converter according to the seventh embodiment of the present invention. A control unit 30g has the following characteristics.

Figure 37:
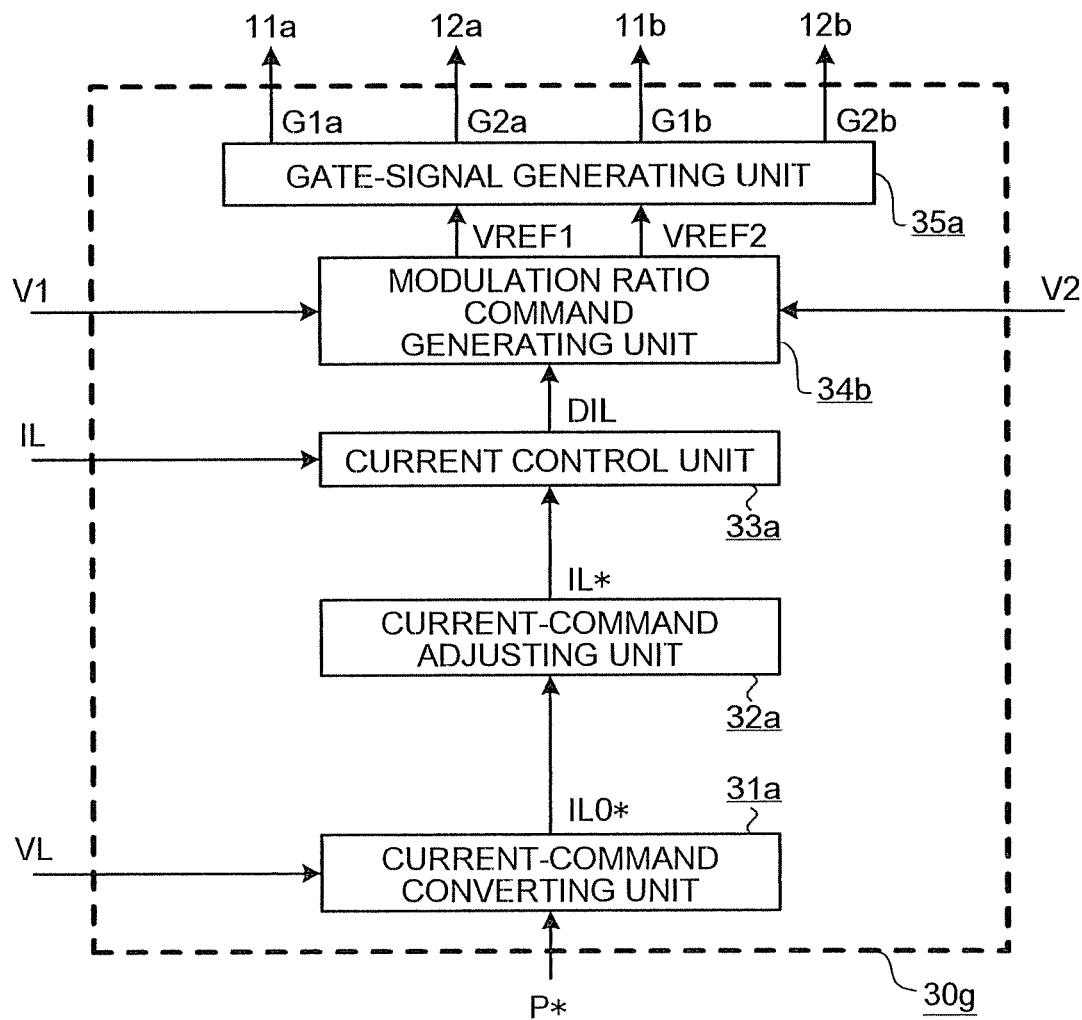
FIG. 37 is a diagram illustrating a configuration example of a control unit 30g according to the seventh embodiment.

FIG. 37 is a diagram illustrating a configuration example of the control unit 30g according to the seventh embodiment of the present invention.

A modulation ratio command generating unit 34b has the following characteristics.

Figure 38:
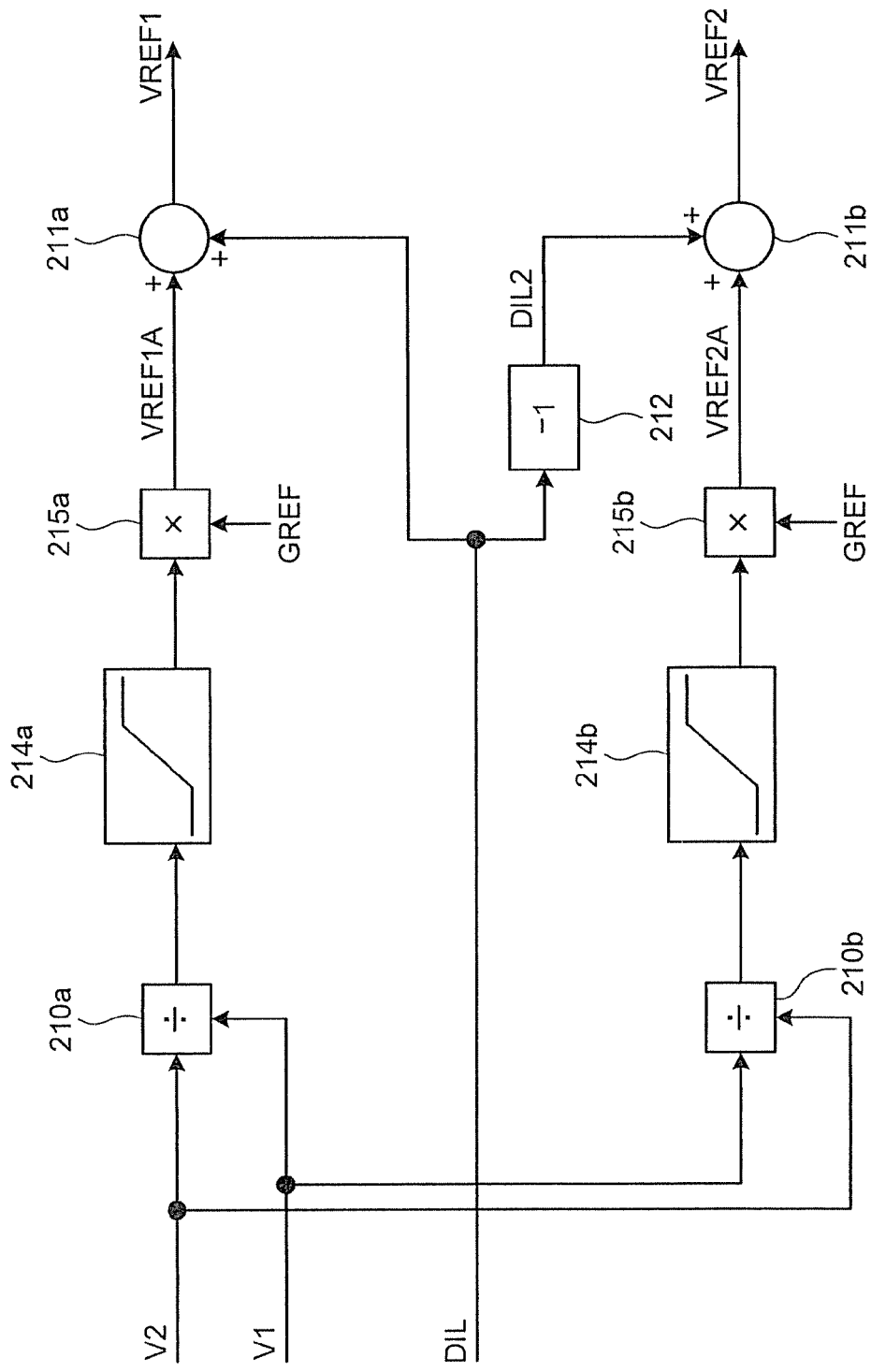
FIG. 38 is a diagram illustrating a configuration example of a modulation ratio command generating unit 34b according to the seventh embodiment.
Figure 39:
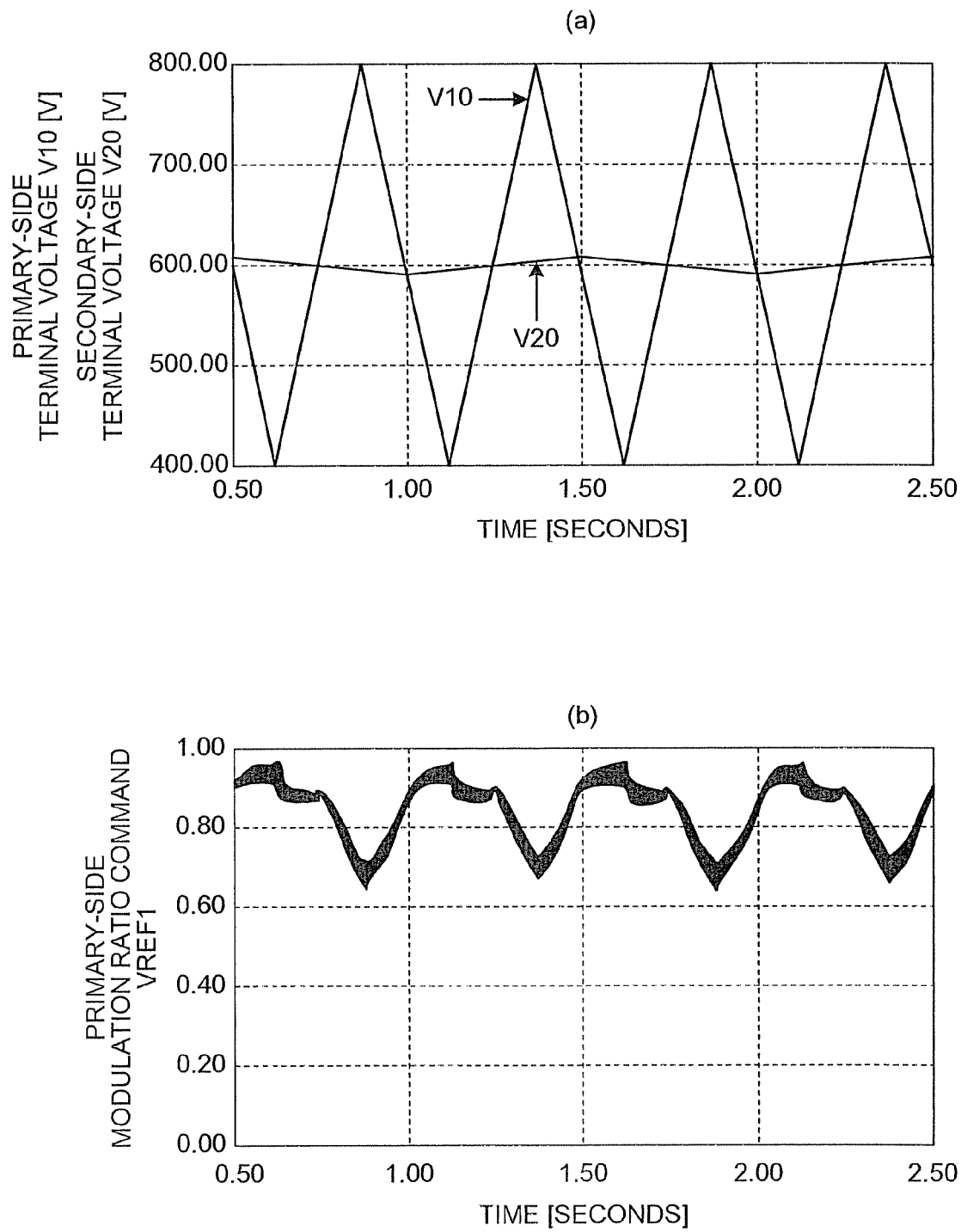
FIG. 39 is a diagram illustrating a result of a simulation of operation waveforms of the bidirectional buck boost DC-DC converter according to the seventh embodiment.
Figure 40:
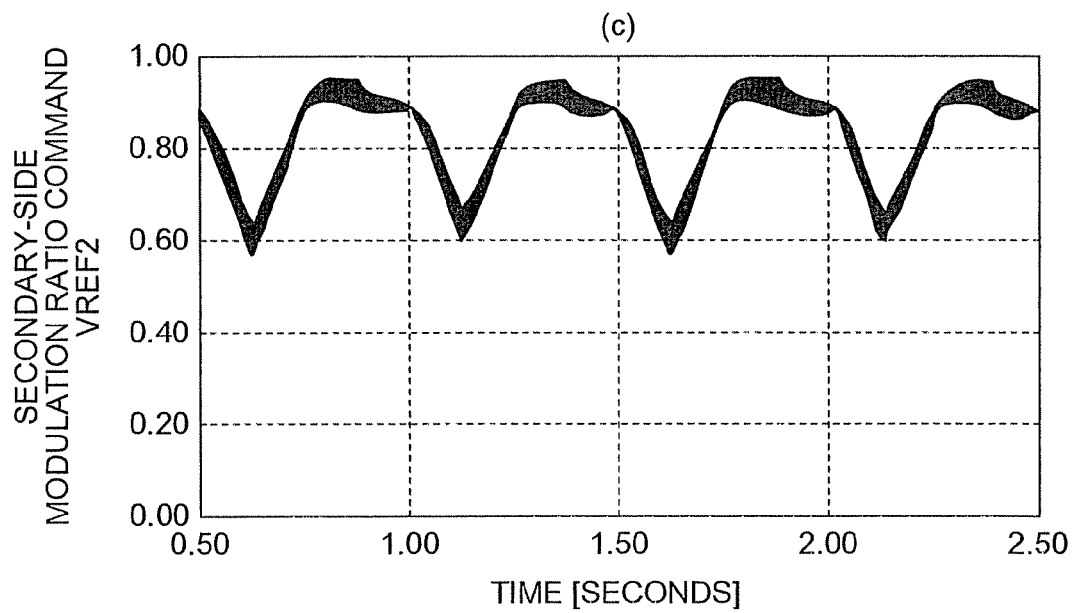
FIG. 40 is a diagram illustrating a result of a simulation of operation waveforms of the bidirectional buck boost DC-DC converter according to the seventh embodiment.
Figure 40:
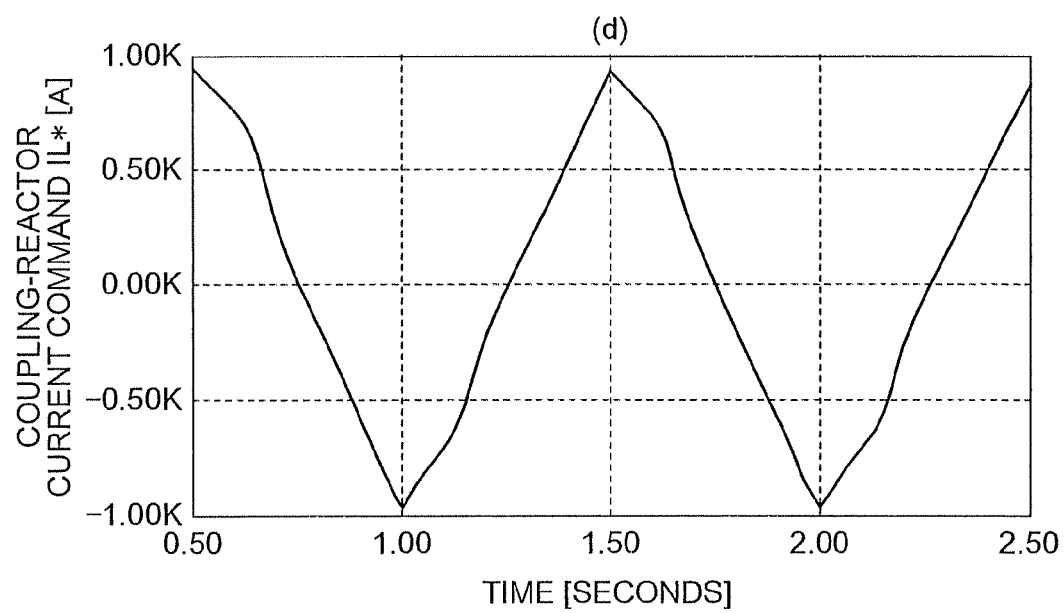
Figure 41:
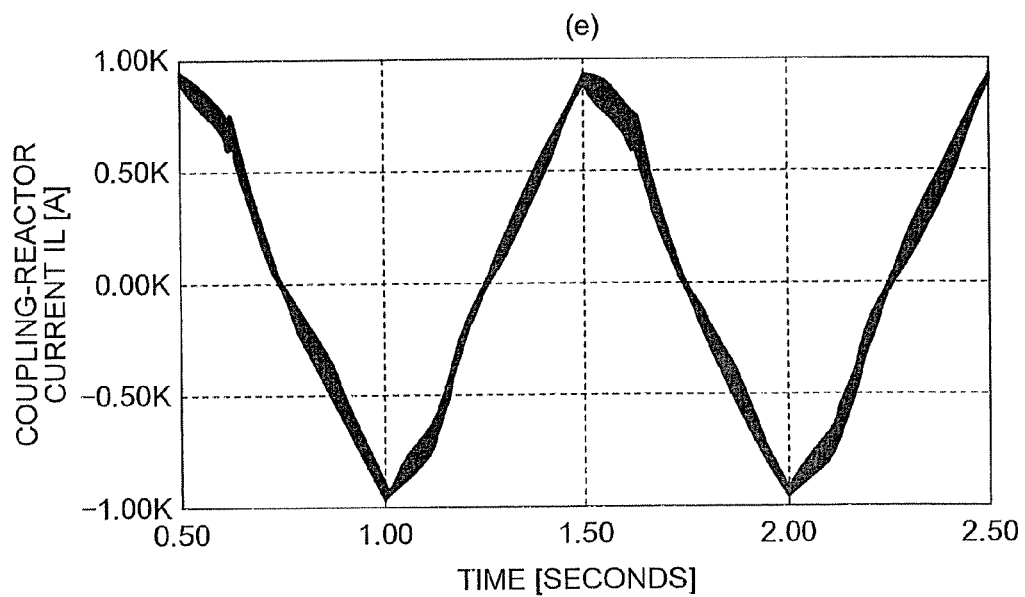
FIG. 41 is a diagram illustrating a result of a simulation of operation waveforms of the bidirectional buck boost DC-DC converter according to the seventh embodiment.
Figure 41:
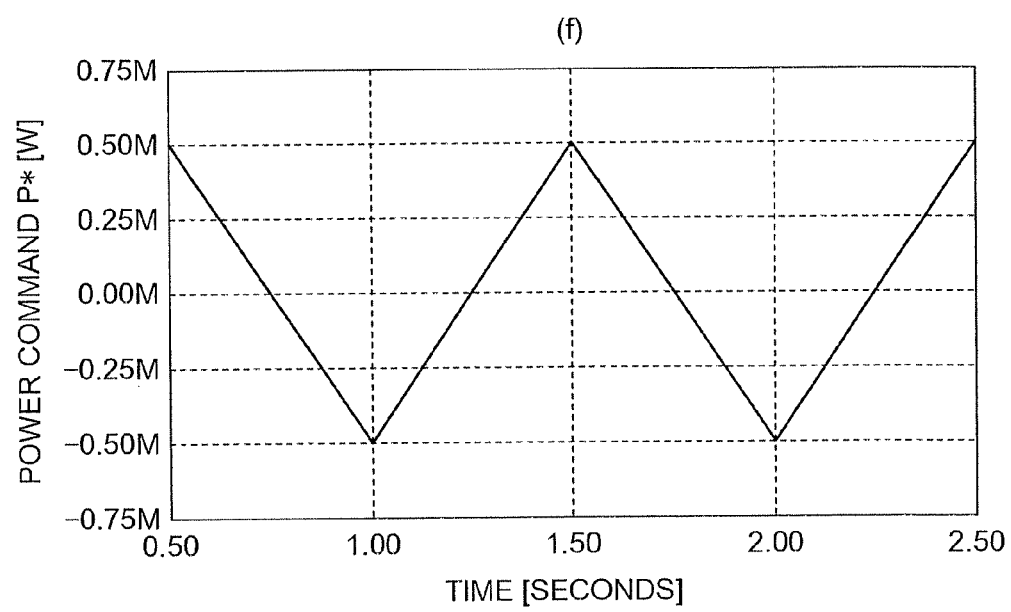
Figure 42:
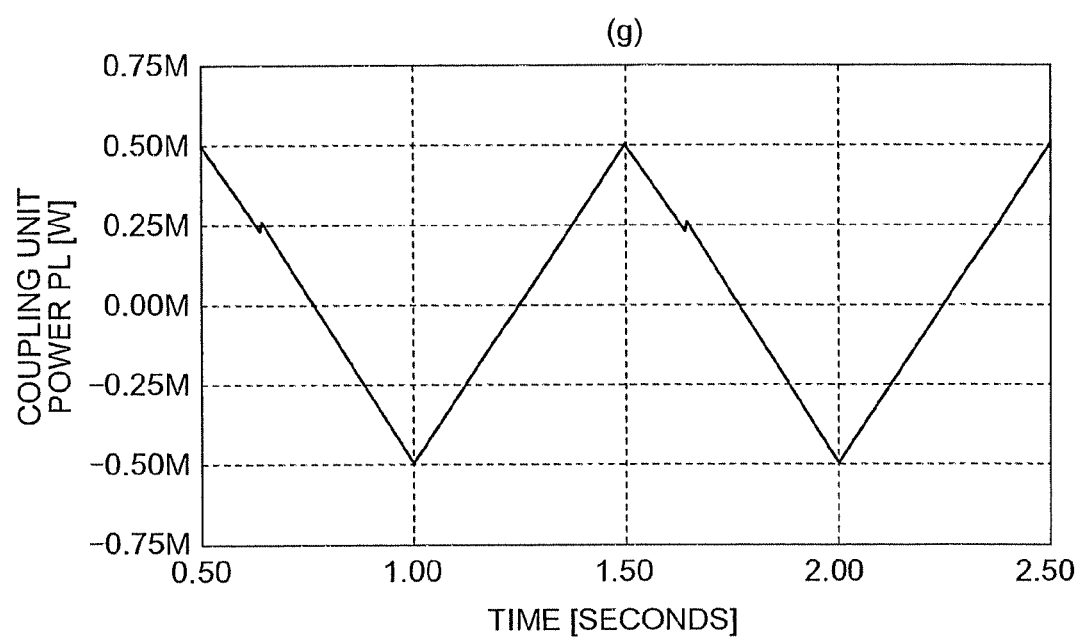
FIG. 42 is a diagram illustrating a result of a simulation of an operation waveform of the bidirectional buck boost DC-DC converter according to the seventh embodiment.

FIG. 38 is a diagram illustrating a configuration example of the modulation ratio command generating unit 34b according to the seventh embodiment of the present invention.

The divider 210a divides the secondary-side capacitor voltage V2 by the primary-side capacitor voltage V1, and the upper and lower limits of the calculated value is limited by a limiter 214a, which is further multiplied by a conduction rate gain GREF by a multiplier 215a to be the primary-side base modulation ratio command VREF1A. The divider 210b divides the primary-side capacitor voltage V1 by the secondary-side capacitor voltage V2, and the upper and lower limits of the calculated value is limited by a limiter 214b, which is further multiplied by the conduction rate gain GREF by a multiplier 215b to be the secondary-side base modulation ratio command VREF2A.

The conduction rate gain GREF can be any arbitrary value between zero and one.

The lower and upper limits of the limiters 214a and 214b are set zero and one.

With the above configuration, for example, when the GREF is 0.9, the primary-side base modulation ratio command VREF1A is calculated by multiplying a value that is obtained by limiting the upper limit of the V2/V1 to 1 by 0.9, and the secondary-side base modulation ratio command VREF2A is calculated by multiplying a value that is obtained by limiting the upper limit of the V1/V2 to 1 by 0.9, any of which takes the maximum value of 0.9.

The primary-side modulation ratio command VREF1 and the secondary-side modulation ratio command VREF2 are values that are calculated by adding the current difference DIL and the DIL2 that is obtained by inverting a sign of the current difference DIL by the sign inverting circuit 212 by the adders 211a and 211b to the primary-side base modulation ratio command VREF1A and the secondary-side base modulation ratio command VREF2A, respectively. If the DIL and the DIL2 are ignored because they are small in a steady state, the maximum values of the primary-side modulation ratio command VREF1 and the secondary-side modulation ratio command VREF2 are 0.9 that is equal to the GREF, and do not exceed 0.9.

Specially, even when the primary-side capacitor voltage V1 is equal to the secondary-side capacitor voltage V2, in which case the primary-side modulation ratio command VREF1 and the secondary-side modulation ratio command VREF2 take the maximum values, the maximum values of the primary-side modulation ratio command VREF1 and the secondary-side modulation ratio command VREF2 are 0.9 that is equal to the conduction rate gain GREF, and do not exceed 0.9.

This indicates that the maximum values of the primary-side modulation ratio command VREF1 and the secondary-side modulation ratio command VREF2 can be limited to the conduction rate gain GREF.

Furthermore, on/off pulse widths of the switching elements 11a to 12b are determined depending upon a magnitude relation between the primary-side modulation ratio command VREF1, the secondary-side modulation ratio command VREF2, and the carrier signal CAR, so that limiting the maximum values of the primary-side modulation ratio command VREF1 and the secondary-side modulation ratio command VREF2 has the meaning same as limiting the minimum value of the on/off pulse widths of the switching elements 11a to 12b. In other words, the minimum pulse widths of the switching elements 11a to 12b can be arbitrary controlled with the conduction rate gain GREF.

Generally, in a switching element, the minimum value of a pulse width capable of accurately performing an on/off operation has a limitation because of delay in the on/off operation. When a gate signal with a pulse width narrower than several $\mu$ seconds to over ten $\mu$ seconds is input to a switching element, it is difficult to perform the on/off operation in accordance with the gate signal. Therefore, a pulse width cannot be properly output in accordance with the gate signal.

In this case, control performance is deteriorated such as causing a minute difference between the coupling reactor current IL and the coupling-reactor current command IL*.

According to the seventh embodiment, the minimum pulse widths of the switching elements 11a to 12b can be set to an arbitrary value with the conduction rate gain GREF. Therefore, if the GREF is set to a value so that the switching elements 11a to 12b do not operate with a pulse width narrower than its limits, specially, even when the primary-side capacitor voltage V1 is equal to the secondary-side capacitor voltage V2, in which case the primary-side modulation ratio command VREF1 and the secondary-side modulation ratio command VREF2 take the maximum values, the switching elements 11a to 12b are prevented from operating with a pulse width narrower than its limits.

Thus, the switching elements 11a to 12b can properly output pulse widths in accordance with the gate signals input thereto, so that it is prevented that control performance is deteriorated such as causing a minute difference between the coupling reactor current IL and the coupling-reactor current command IL*.

FIG. 39 to FIG. 42 are diagrams illustrating a results of a simulation of operation waveforms of the bidirectional buck boost DC-DC converter to which the configuration of the control unit 30g is applied according to the seventh embodiment of the present invention. FIG. 39(a) is a diagram illustrating the primary-side terminal voltage V10 and the secondary-side terminal voltage V20, FIG. 39(b) is a diagram illustrating the primary-side modulation ratio command VREF1, FIG. 40(c) is a diagram illustrating the secondary-side modulation ratio command VREF2, FIG. 40(d) is a diagram illustrating the coupling-reactor current command IL*, FIG. 41(e) is a diagram illustrating the coupling reactor current IL, FIG. 41(f) is a diagram illustrating the power command P*, and FIG. 42(g) is a diagram illustrating the coupling unit power PL.

FIG. 39 to FIG. 42 are diagrams illustrating operation waveforms in the case where the conduction rate gain GREF is set to 0.9, a voltage source that changes the primary-side terminal voltage V10 between 400V and 800V in a ramp manner at two Hz is connected as the primary-side power supply 2a, a large-capacity capacitor with the initial voltage of 600V is connected as the secondary-side power supply 2b, and the power command P* is changed in a ramp manner at one Hz within the range of ±500 KW. The limiter 70a is set to ±1000 A, so that the coupling-reactor current command IL* is limited within the range of ±1000 A. The primary-side modulation ratio command VREF1 and the secondary-side modulation ratio command VREF2 are appropriately adjusted regardless of a magnitude relation between the primary-side terminal voltage V10 and the secondary-side terminal voltage V20, and the coupling reactor current IL is consistent with the coupling-reactor current command IL*. The coupling-reactor current command IL* is within the range of ±1000 A, so that it is operated without being limited by the limiter 70a. Consequently, it is found that the coupling unit power PL is consistent with the power command P* in the whole region.

Specially, it is confirmed that the maximum values of the primary-side modulation ratio command VREF1 and the secondary-side modulation ratio command VREF2, in which case the primary-side capacitor voltage V1 is equal to the secondary-side capacitor voltage V2, are around 0.9 that is set as the conduction rate gain GREF. Therefore, it is found that this configuration can prevent the switching elements 11a to 12b from operating with a pulse width narrower than its limits.

The conduction rate gain GREF can be changed to an arbitrary value at an arbitrary timing during operation.

For example, when the difference between the primary-side capacitor voltage V1 and the secondary-side capacitor voltage V2 is sufficient, the GREF can be set to 1.0, and only when the difference between the primary-side capacitor voltage V1 and the secondary-side capacitor voltage V2 becomes small, the GREF can be changed to 0.9.

The conduction rate gain GREF is changed in the above manner, so that when the difference between the primary-side capacitor voltage V1 and the secondary-side capacitor voltage V2 is sufficient, the conduction rate gain of any of the primary-side converting unit 1a and the secondary-side converting unit 1b is 1.0. Therefore, the upper-arm side switching element or the lower-arm side switching element of the converting unit can be kept in an on state or off state, enabling to stop the switching operation. Accordingly, switching loss can be reduced.

When the difference between the primary-side capacitor voltage V1 and the secondary-side capacitor voltage V2 becomes small, the conduction rate gain GREF is changed to a value with which the switching elements 11a to 12b do not operate with a pulse width over its limits. Therefore, the switching elements 11a to 12b can be prevented from operating with a pulse width narrower than its limits, so that a pulse width can be properly output in accordance with the gate signals. Consequently, it is possible to prevent that control performance is deteriorated such as causing a minute difference between the coupling reactor current IL and the coupling-reactor current command IL*.

Eighth Embodiment

A configuration of a bidirectional buck boost DC-DC converter according to the eighth embodiment of the present invention is explained in detail below with reference to the drawings. Only parts different from the bidirectional buck boost DC-DC converter in the first embodiment of the present invention are described below.

Figure 43:
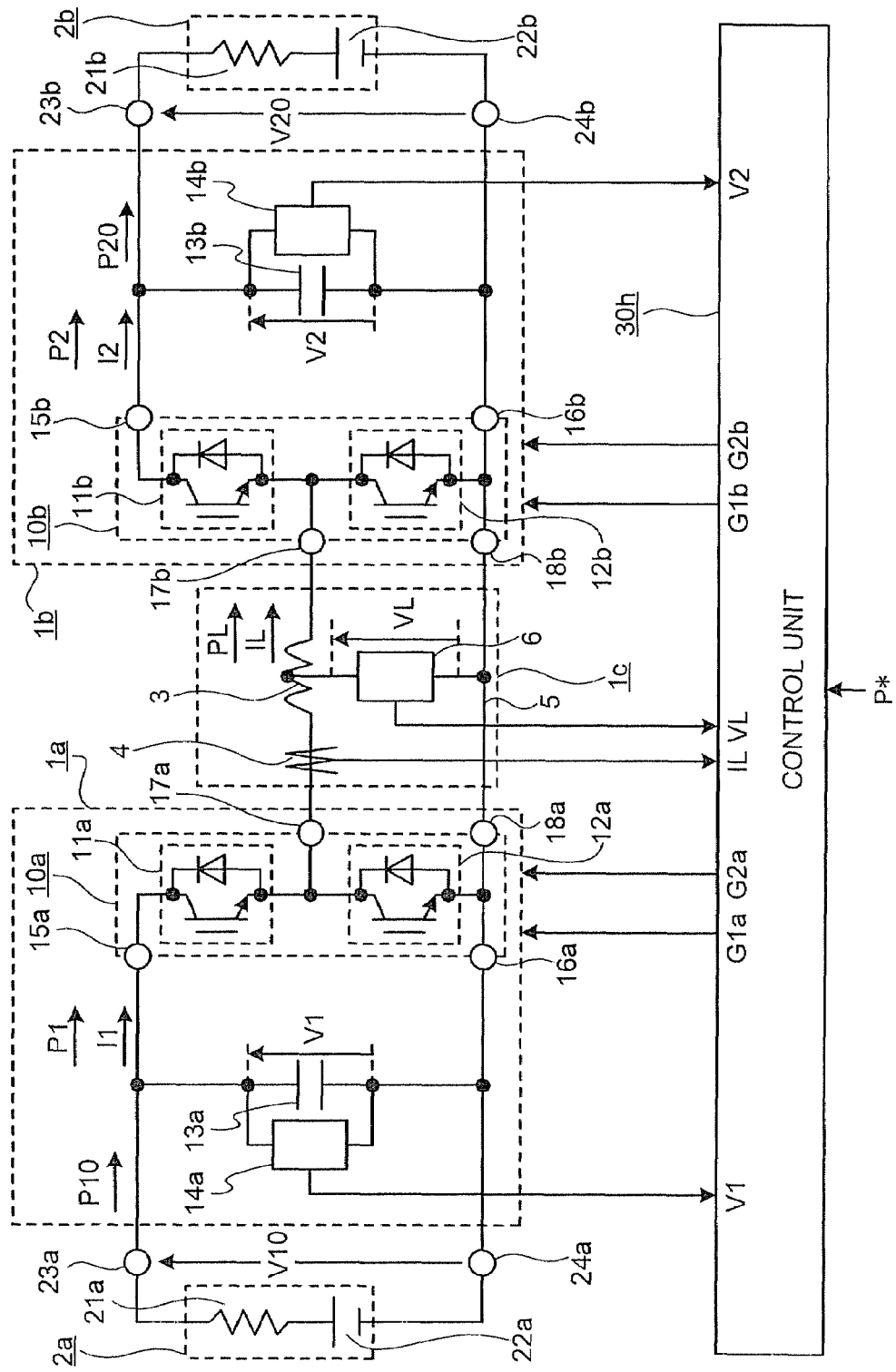
FIG. 43 is a configuration diagram of a bidirectional buck boost DC-DC converter according to an eighth embodiment.

FIG. 43 is a configuration diagram of the bidirectional buck boost DC-DC converter according to the eighth embodiment of the present invention. A control unit 30h has the following characteristics.

Figure 44:
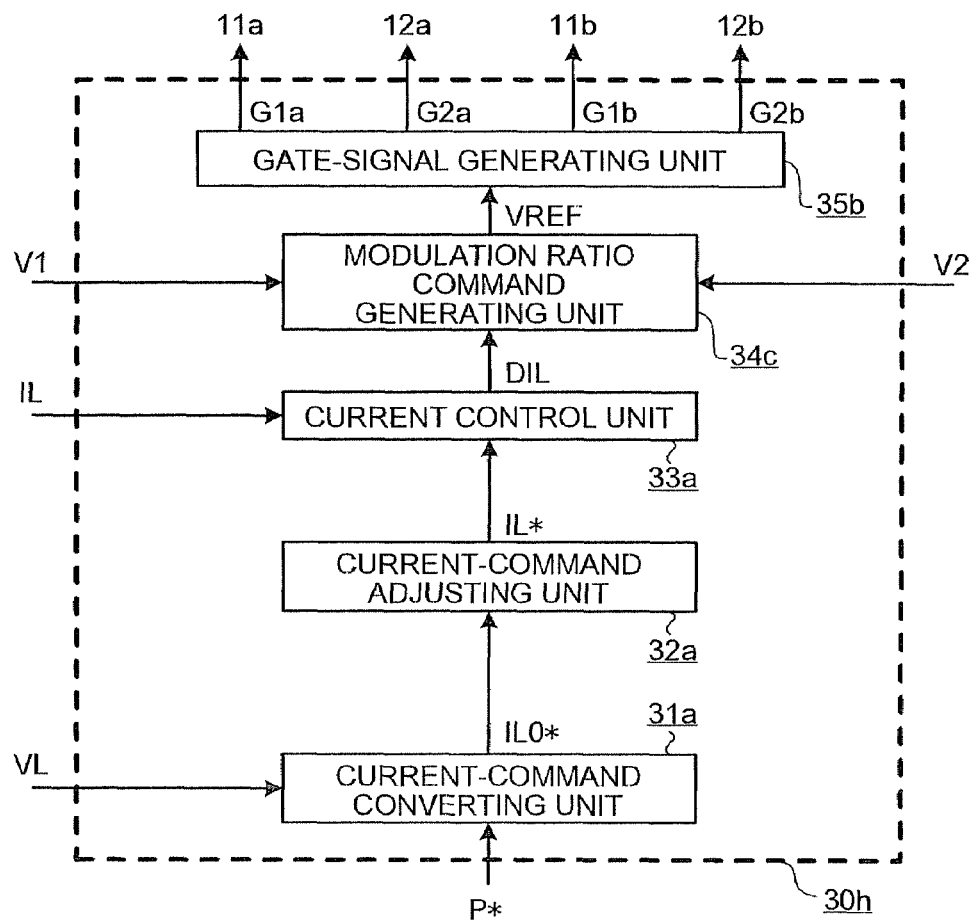
FIG. 44 is a diagram illustrating a configuration example of a control unit 30h according to the eighth embodiment.

FIG. 44 is a diagram illustrating a configuration example of the control unit 30h according to the eighth embodiment of the present invention. The signal output from a modulation ratio command generating unit 34c is changed to a VREF, and the modulation ratio command generating unit 34c and a gate-signal generating unit 35b have the following characteristics.

Figure 45:
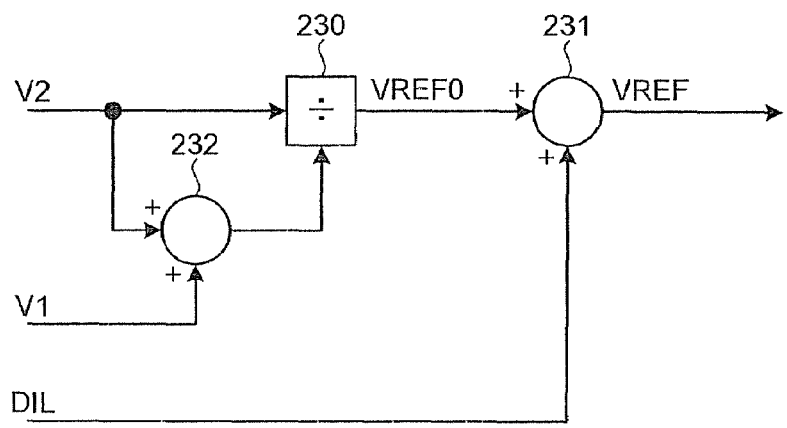
FIG. 45 is a diagram illustrating a configuration example of a modulation ratio command generating unit 34c according to the eighth embodiment.

FIG. 45 is a diagram illustrating a configuration example of the modulation ratio command generating unit 34c according to the eighth embodiment of the present invention.

The configuration can be such that a low-pass filter or the like is inserted into input and output of a function block of an adder 232 or the like to remove unnecessary frequency components, although not shown.

As shown in FIG. 45, the adder 232 calculates a sum of the primary-side capacitor voltage V1 and the secondary-side capacitor voltage V2. Then, a divider 230 divides the secondary-side capacitor voltage V2 by the sum of the primary-side capacitor voltage V1 and the secondary-side capacitor voltage V2 to obtain a ratio V2/(V1+V2) between the secondary-side capacitor voltage V2 and the sum of the primary-side capacitor voltage V1 and the secondary-side capacitor voltage V2. The ratio V2/(V1+V2) is set as a base modulation ratio command VREF0 that is common to the primary-side and secondary-side converting units 1a and 1b.

The current difference DIL is added to the base modulation ratio command VREF0 in an adder 231, which is set as the modulation ratio command VREF that is common to the primary-side and secondary-side converting units 1a and 1b.

Figure 46:
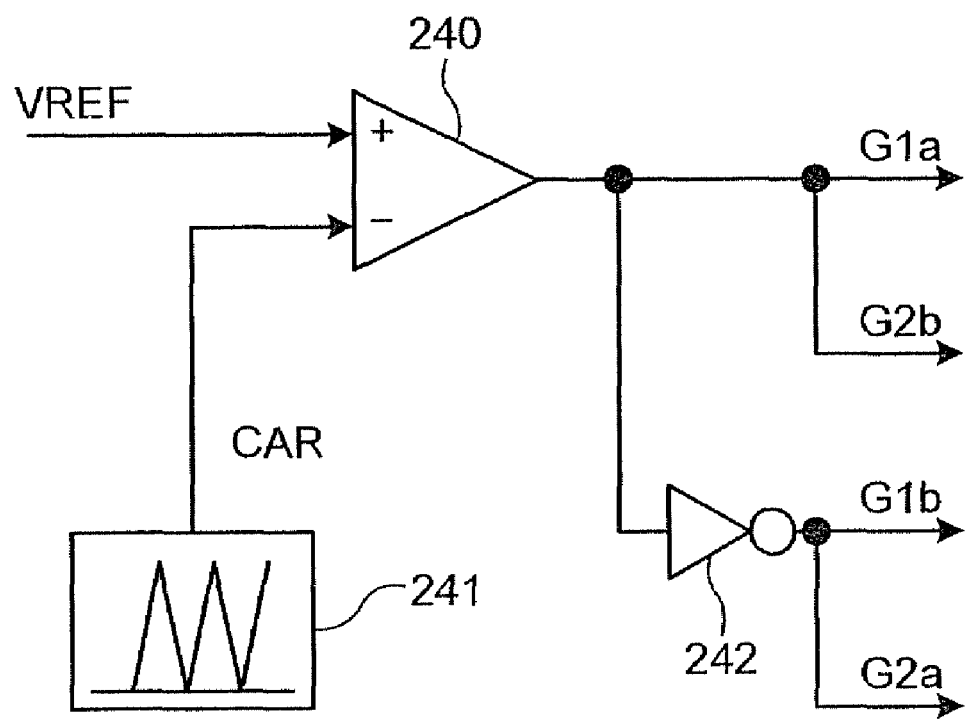
FIG. 46 is a diagram illustrating a configuration example of a gate-signal generating unit 35b according to the eighth embodiment.

FIG. 46 is a diagram illustrating a configuration example of the gate-signal generating unit 35b according to the eighth embodiment of the present invention.

The configuration can be such that a low-pass filter or the like is inserted into an input of a comparator 240 to remove unnecessary frequency components, although not shown.

First, a carrier-signal generating unit 241 generates the carrier signal CAR that takes a value of zero to one. It is appropriate that the carrier signal CAR is, for example, a triangle wave or a sawtooth wave.

Then, the comparator 240 and an inverting circuit 242 determine on/off of the gate signals G1a to G2b of each of the switching elements 11a to 12b by the following logic in accordance with a magnitude relation between the modulation ratio command VREF and the carrier signal CAR.

If VREF>CAR, the gate signal G1a to the switching element 11a of the primary-side converting unit 1a is turned on and the gate signal G2a to the switching element 12a of the primary-side converting unit 1a is turned off. At the same time, the gate signal G2b to the switching element 12b of the secondary-side converting unit 1b is turned on, and the gate signal G1b to the switching element 11b of the secondary-side converting unit 1b is turned off.

If VREF<CAR, the gate signal G1a to the switching element 11a is turned off and the gate signal G2a to the switching element 12a is turned on. At the same time, the gate signal G2b to the switching element 12b is turned off, and the gate signal G1b to the switching element 11b is turned on.

With the above configuration, when the primary-side capacitor voltage V1 is equal to the secondary-side capacitor voltage V2, the modulation ratio command VREF is 0.5, and an on/off duty ratio of each of the switching elements 11a and 12a, and the switching elements 11b and 12b is 50%.

On the other hand, when the primary-side capacitor voltage V1 is different from the secondary-side capacitor voltage V2, the on/off duty ratio of each of the switching elements 11a and 12a, and the switching elements 11b and 12b varies around 50% depending upon the degree of the difference.

With such an operation, even when the difference between the primary-side capacitor voltage V1 and the secondary-side capacitor voltage V2 becomes small, the switching elements 11a to 12b can be prevented from operating with a pulse width narrower than its limits. Thus, the switching elements 11a to 12b can properly output a pulse width in accordance with the gate signals input thereto, so that it is prevented that control performance is deteriorated such as causing a minute difference between the coupling reactor current IL and the coupling-reactor current command IL*.

Figure 47:
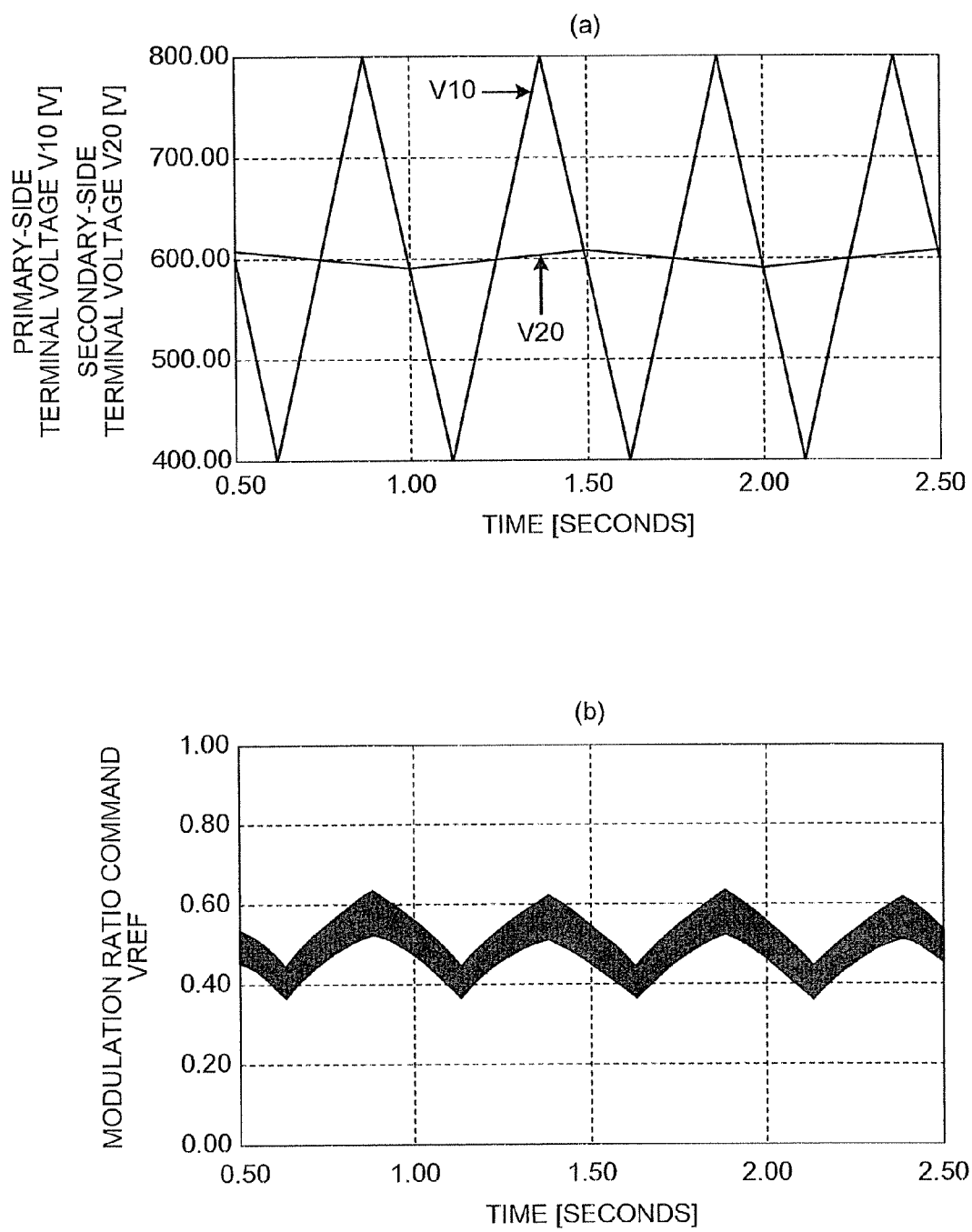
FIG. 47 is a diagram illustrating a result of a simulation of operation waveforms of the bidirectional buck boost DC-DC converter according to the eighth embodiment.
Figure 48:
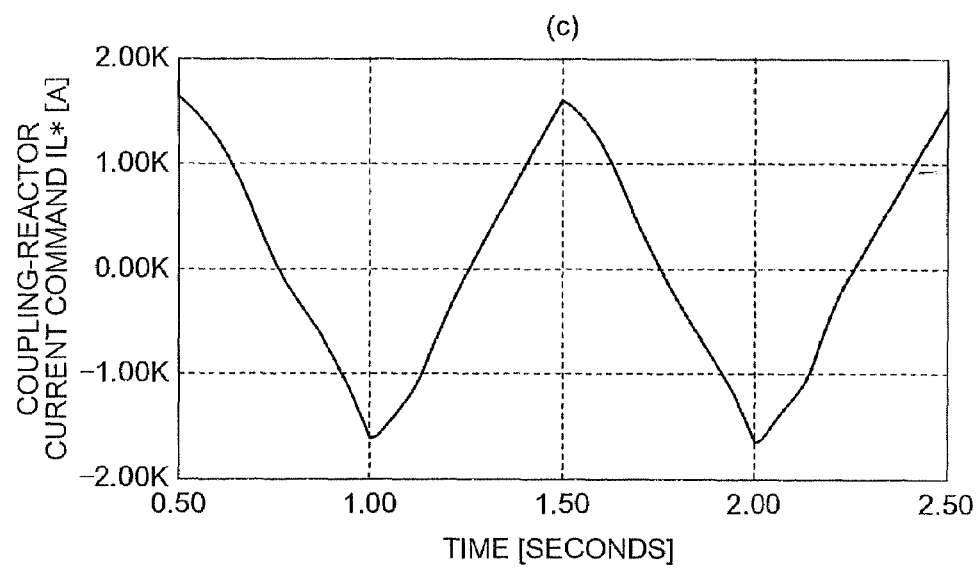
FIG. 48 is a diagram illustrating a result of a simulation of operation waveforms of the bidirectional buck boost DC-DC converter according to the eighth embodiment.
Figure 48:
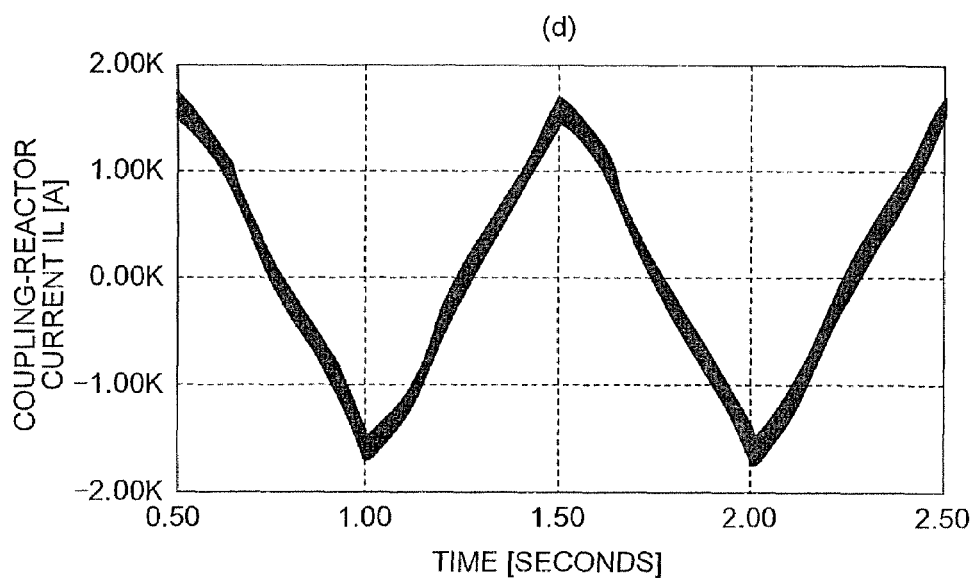
Figure 49:
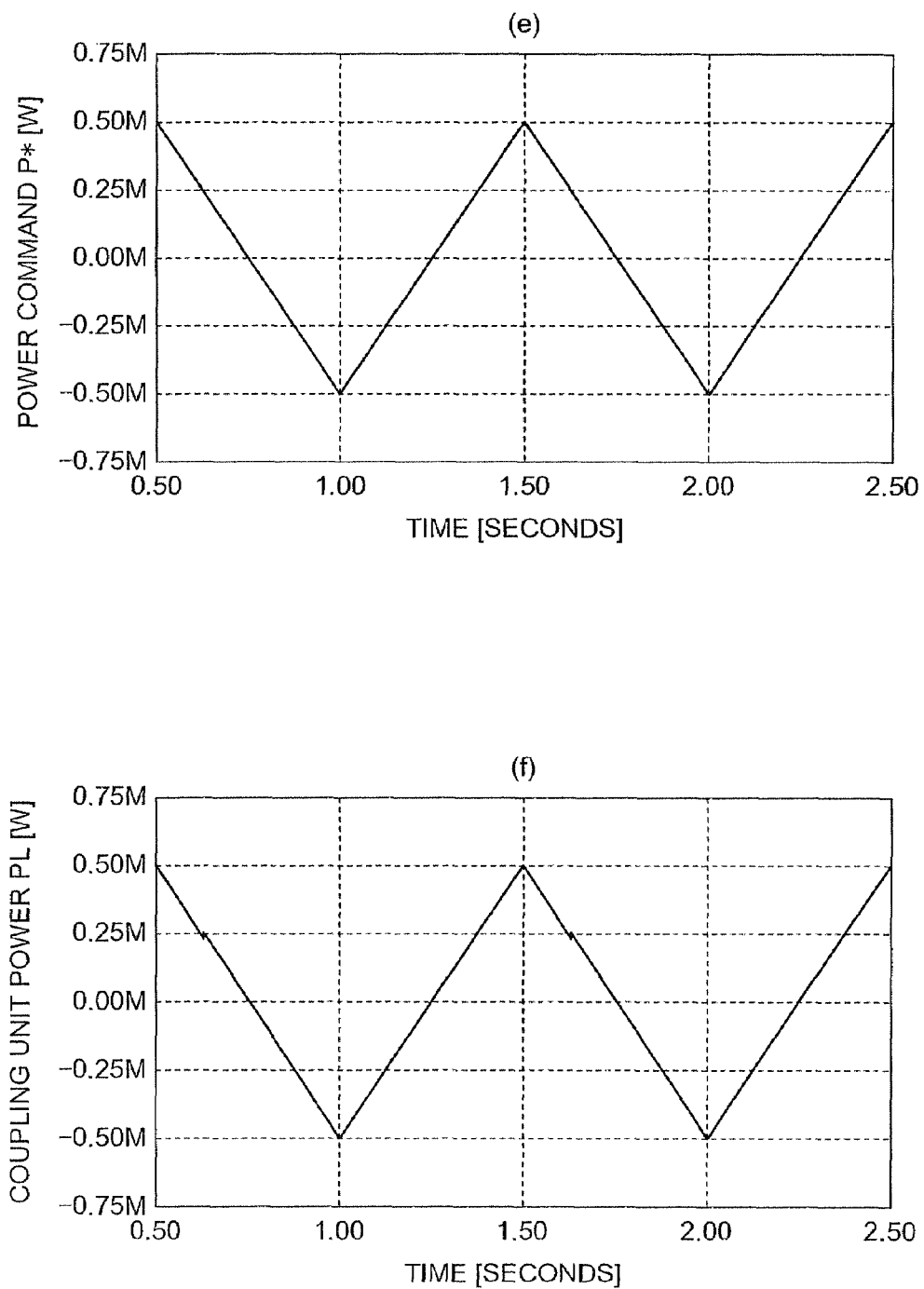
FIG. 49 is a diagram illustrating a result of a simulation of operation waveforms of the bidirectional buck boost DC-DC converter according to the eighth embodiment.

FIG. 47 to FIG. 49 are diagrams illustrating a results of a simulation of operation waveforms of the bidirectional buck boost DC-DC converter to which the configuration of the control unit 30h is applied according to the eighth embodiment of the present invention. FIG. 47(a) is a diagram illustrating the primary-side terminal voltage V10 and the secondary-side terminal voltage V20, FIG. 47(b) is a diagram illustrating the modulation ratio command VREF, FIG. 48(c) is a diagram illustrating the coupling-reactor current command IL*, FIG. 48(d) is a diagram illustrating the coupling reactor current IL, FIG. 49(e) is a diagram illustrating the power command P*, and FIG. 49(f) is a diagram illustrating the coupling unit power PL.

FIG. 47 to FIG. 49 are diagrams illustrating operation waveforms in the case where a voltage source that changes the primary-side terminal voltage V10 between 400V and 800V in a ramp manner at two Hz is connected as the primary-side power supply 2a, a large-capacity capacitor with the initial voltage of 600V is connected as the secondary-side power supply 2b, and the power command P* is changed in a ramp manner at one Hz within the range of ±500 KW. The limiter 70a is set to ±2000 A, so that the coupling-reactor current command IL* is limited within the range of ±2000 A. The modulation ratio command VREF is appropriately adjusted regardless of a magnitude relation between the primary-side terminal voltage V10 and the secondary-side terminal voltage V20, and the coupling reactor current IL is consistent with the coupling-reactor current command IL*. The coupling-reactor current command IL* is within the range of ±2000 A, so that it is operated without being limited by the limiter 70a. Consequently, it is found that the coupling unit power PL is consistent with the power command P* in the whole region.

Moreover, it is confirmed that when the primary-side capacitor voltage V1 is equal to the secondary-side capacitor voltage V2, the modulation ratio command VREF is 0.5, and when the primary-side capacitor voltage V1 is different from the secondary-side capacitor voltage V2, the modulation ratio command VREF varies around 0.5 depending upon the degree of the difference. Therefore, it is found that this configuration can prevent the switching elements 11a to 12b from operating with a pulse width narrower than its limits.

Ninth Embodiment

A configuration of a bidirectional buck boost DC-DC converter according to the ninth embodiment of the present invention is explained in detail below with reference to the drawings. The configuration in the ninth embodiment is based on that in the eighth embodiment. Only parts different from the bidirectional buck boost DC-DC converter in the eighth embodiment of the present invention are described below.

Figure 50:
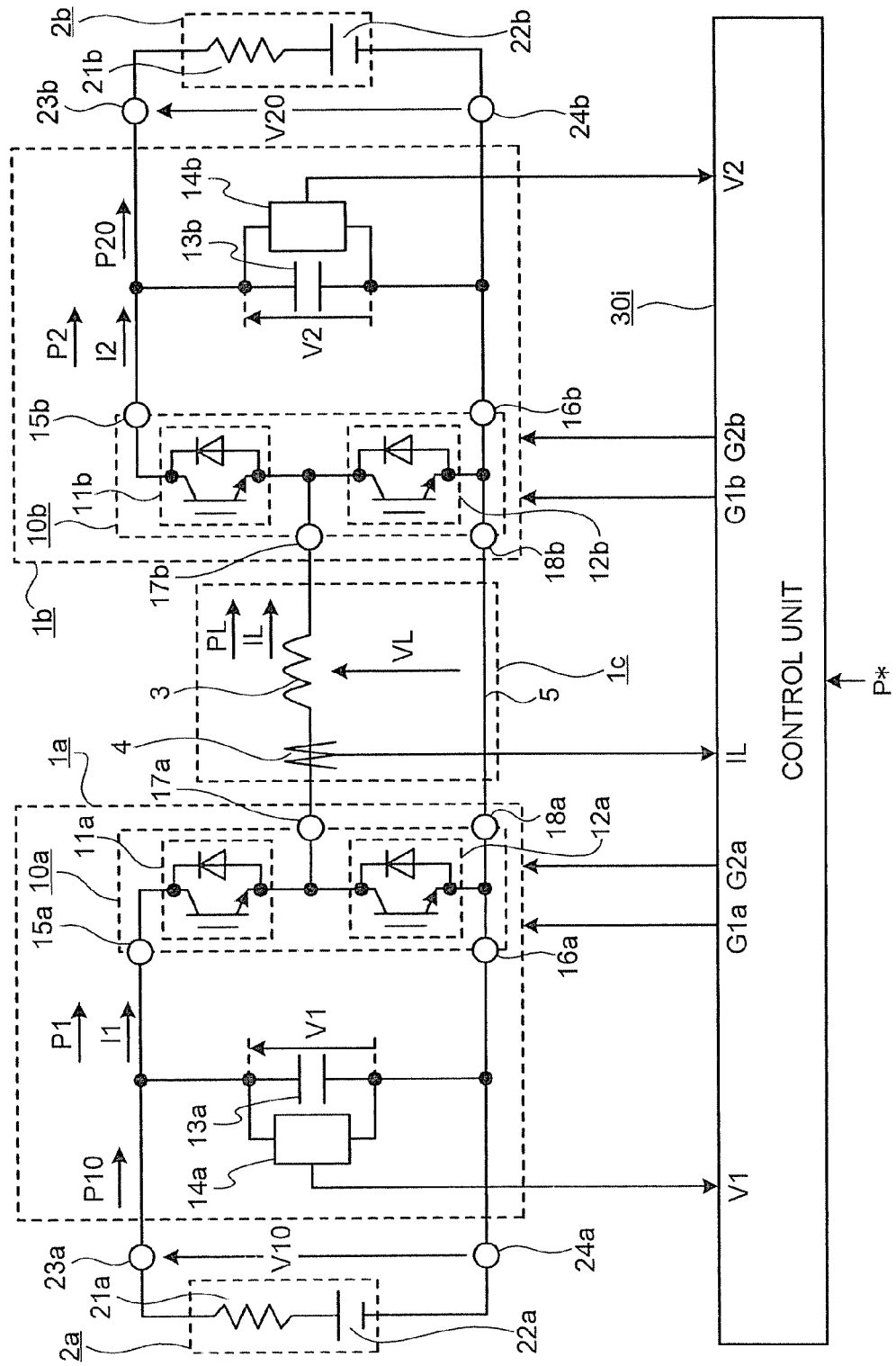
FIG. 50 is a configuration diagram of a bidirectional buck boost DC-DC converter according to a ninth embodiment.

FIG. 50 is a configuration diagram of the bidirectional buck boost DC-DC converter according to the ninth embodiment of the present invention. In the bidirectional buck boost DC-DC converter in the ninth embodiment, the voltage detector 6 that detects the coupling unit voltage VL is omitted, and a control unit 30i has the following characteristics.

Figure 51:
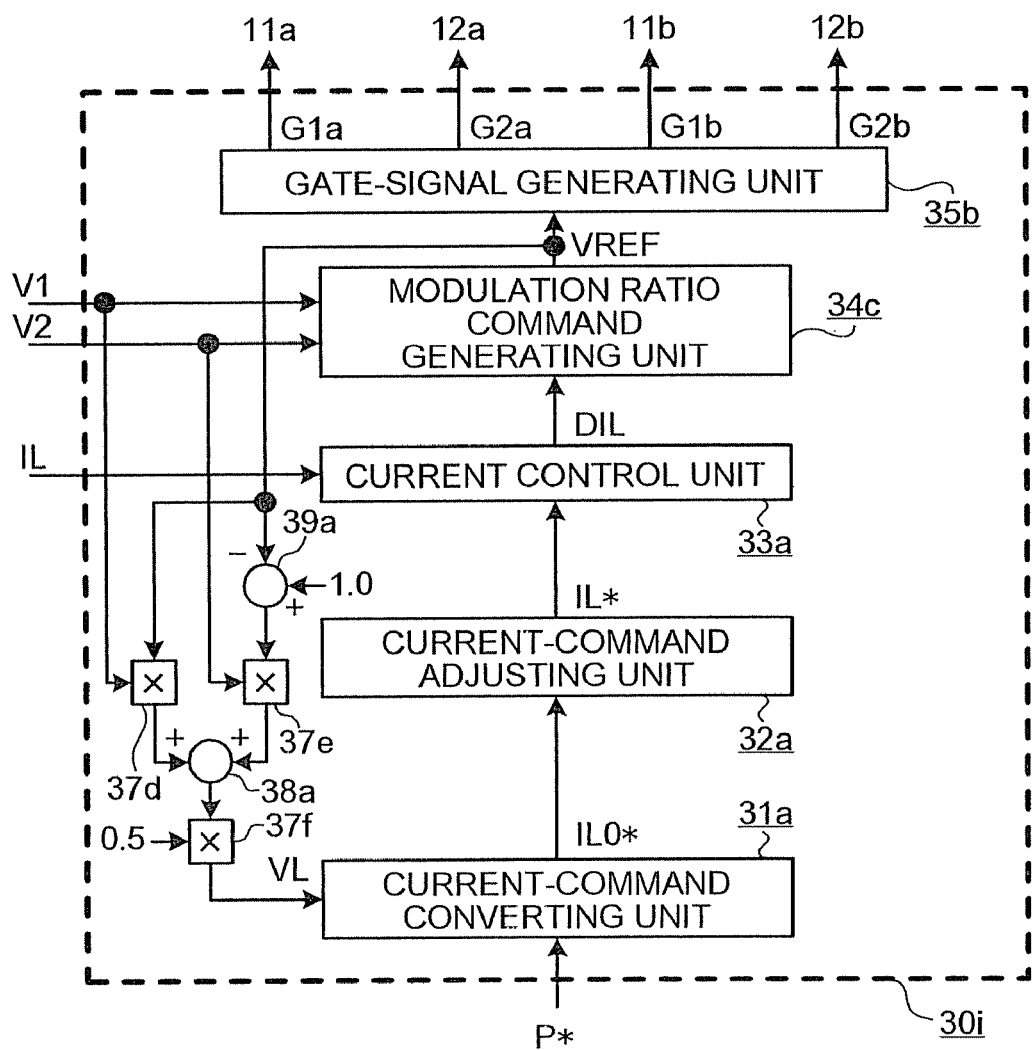
FIG. 51 is a diagram illustrating a configuration example of a control unit 30i according to the ninth embodiment.

FIG. 51 is a diagram illustrating a configuration example of the control unit 30i according to the ninth embodiment of the present invention.

As shown in FIG. 51, a product calculated by a multiplier 37d by multiplying the modulation ratio command VREF by the primary-side capacitor voltage V1 is added in an adder 38a to a product calculated by a multiplier 37e by multiplying a vale that is calculated by subtracting the modulation ratio command VREF from 1.0 by a subtractor 39a by the secondary-side capacitor voltage V2, which is multiplied by 0.5 in a multiplier 37f to be used as the coupling unit voltage VL.

With the above configuration, the voltage detector 6 that detects the coupling unit voltage VL can be omitted, so that the DC-DC converter as a whole can be configured smaller and more lightweight.

Tenth Embodiment

A configuration of a bidirectional buck boost DC-DC converter according to the tenth embodiment of the present invention is explained in detail below with reference to the drawings. Only parts different from the bidirectional buck boost DC-DC converter in the first embodiment of the present invention are described below.

Figure 52:
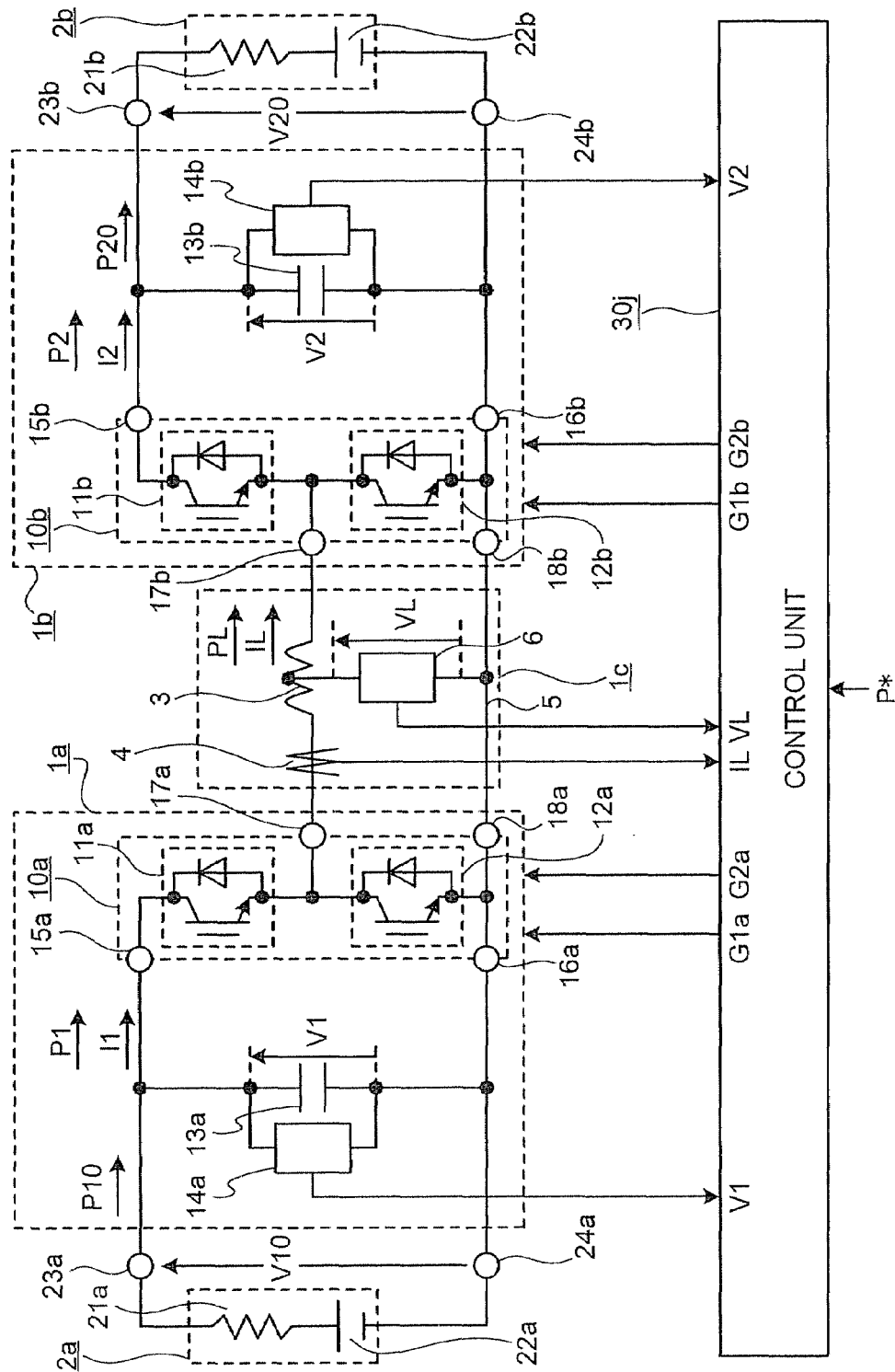
FIG. 52 is a configuration diagram of a bidirectional buck boost DC-DC converter according to a tenth embodiment.

FIG. 52 is a configuration diagram of the bidirectional buck boost DC-DC converter according to the tenth embodiment of the present invention. A control unit 30j has the following characteristics.

Figure 53:
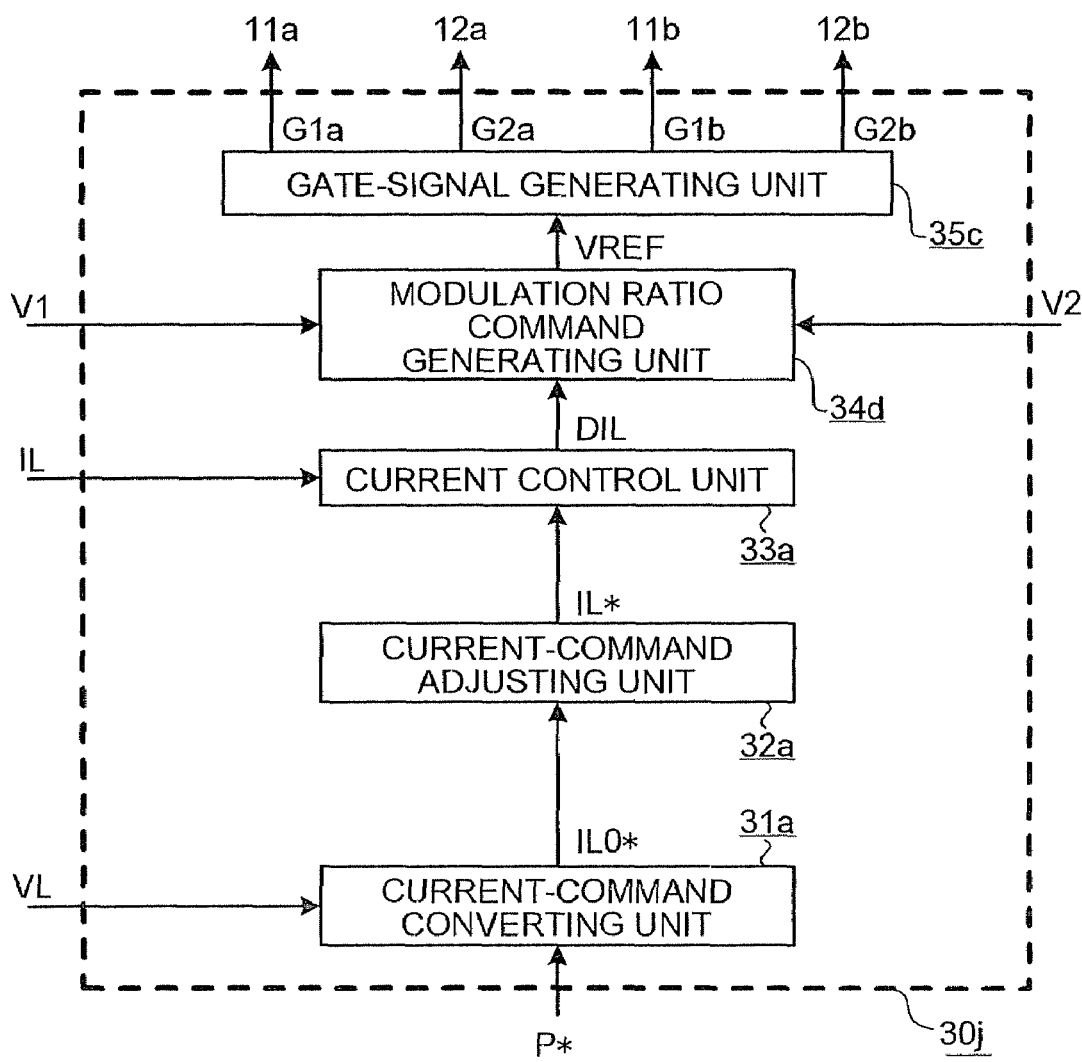
FIG. 53 is a diagram illustrating a configuration example of a control unit 30j according to the tenth embodiment.

FIG. 53 is a diagram illustrating a configuration example of the control unit 30j according to the tenth embodiment of the present invention. The signal output from a modulation ratio command generating unit 34d is changed to the VREF, and the modulation ratio command generating unit 34d and a gate-signal generating unit 35c have the following characteristics.

Figure 54:
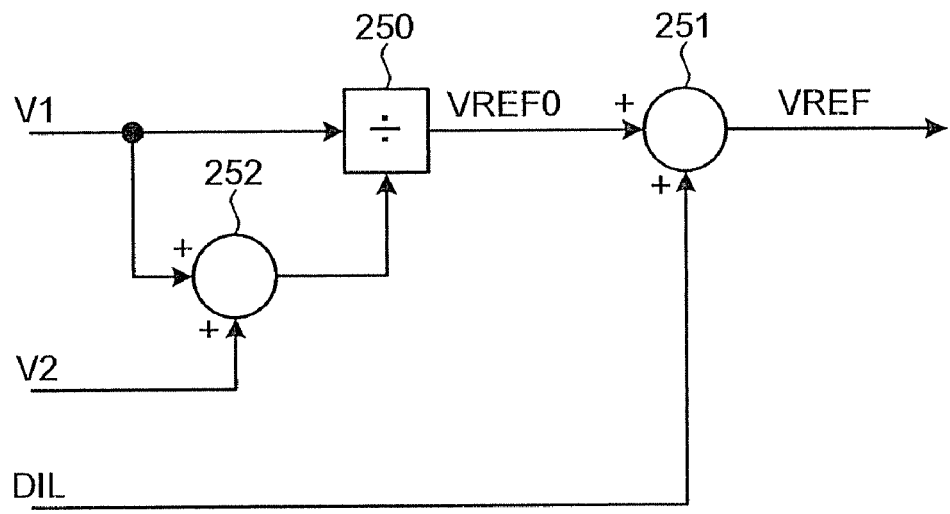
FIG. 54 is a diagram illustrating a configuration example of a modulation ratio command generating unit 34d according to the tenth embodiment.

FIG. 54 is a diagram illustrating a configuration example of the modulation ratio command generating unit 34d according to the tenth embodiment.

The configuration can be such that a low-pass filter or the like is inserted into input and output of a function block of an adder 252 or the like to remove unnecessary frequency components, although not shown.

As shown in FIG. 54, the adder 252 calculates a sum of the primary-side capacitor voltage V1 and the secondary-side capacitor voltage V2. Then, a divider 250 divides the primary-side capacitor voltage V1 by the sum of the primary-side capacitor voltage V1 and the secondary-side capacitor voltage V2 to obtain a ratio V1/(V1+V2) between the primary-side capacitor voltage V1 and the sum of the primary-side capacitor voltage V1 and the secondary-side capacitor voltage V2. The ratio V1/(V1+V2) is set as a base modulation ratio command VREF0 that is common to the primary-side and secondary-side converting units 1a and 1b.

The current difference DIL is added to the base modulation ratio command VREF0 in an adder 251, which is set as the modulation ratio command VREF that is common to the primary-side and secondary-side converting units 1a and 1b.

Figure 55:
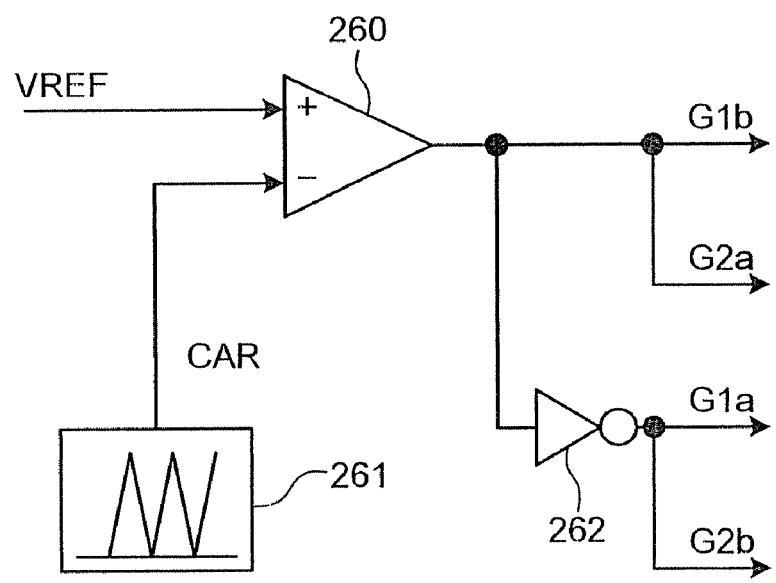
FIG. 55 is a diagram illustrating a configuration example of a gate-signal generating unit 35c according to the tenth embodiment.

FIG. 55 is a diagram illustrating a configuration example of the gate-signal generating unit 35c according to the tenth embodiment of the present invention.

The configuration can be such that a low-pass filter or the like is inserted into an input of a comparator 260 to remove unnecessary frequency components, although not shown.

First, a carrier signal generating unit 261 generates the carrier signal CAR that takes a value of zero to one. It is appropriate that the carrier signal CAR is, for example, a triangle wave or a sawtooth wave.

Then, the comparator 260 and an inverting circuit 262 determine on/off of the gate signals G1a to G2b of each of the switching elements 11a to 12b by the following logic in accordance with a magnitude relation between the modulation ratio command VREF and the carrier signal CAR.

If VREF>CAR, the gate signal G1a to the switching element 11a of the primary-side converting unit 1a is turned off and the gate signal G2a to the switching element 12a of the primary-side converting unit 1a is turned on. At the same time, the gate signal G2b to the switching element 12b of the secondary-side converting unit 1b is turned off, and the gate signal G1b to the switching element 11b of the secondary-side converting unit 1b is turned on.

If VREF<CAR, the gate signal G1a to the switching element 11a is turned on and the gate signal G2a to the switching element 12a is turned off. At the same time, the gate signal G2b to the switching element 12b is turned on, and the gate signal G1b to the switching element 11b is turned off.

With the above configuration, when the primary-side capacitor voltage V1 is equal to the secondary-side capacitor voltage V2, the modulation ratio command VREF is 0.5, and the on/off duty ratio of each of the switching elements 11a and 12a, and the switching elements 11b and 12b is 50%.

On the other hand, when the primary-side capacitor voltage V1 is different from the secondary-side capacitor voltage V2, the on/off duty ratio of each of the switching elements 11a and 12a, and the switching elements 11b and 12b varies around 50% depending upon the degree of the difference.

With such an operation, even when the difference between the primary-side capacitor voltage V1 and the secondary-side capacitor voltage V2 becomes small, the switching elements 11a to 12b can be prevented from operating with a pulse width narrower than its limits. Thus, the switching elements 11a to 12b can properly output a pulse width in accordance with the gate signals input thereto, so that it is prevented that control performance is deteriorated such as causing a minute difference between the coupling reactor current IL and the coupling-reactor current command IL*.

Eleventh Embodiment

A configuration of a bidirectional buck boost DC-DC converter according to the eleventh embodiment of the present invention is explained in detail below with reference to the drawings. The configuration in the eleventh embodiment is based on that in the tenth embodiment. Only parts different from the bidirectional buck boost DC-DC converter in the tenth embodiment of the present invention are described below.

Figure 56:
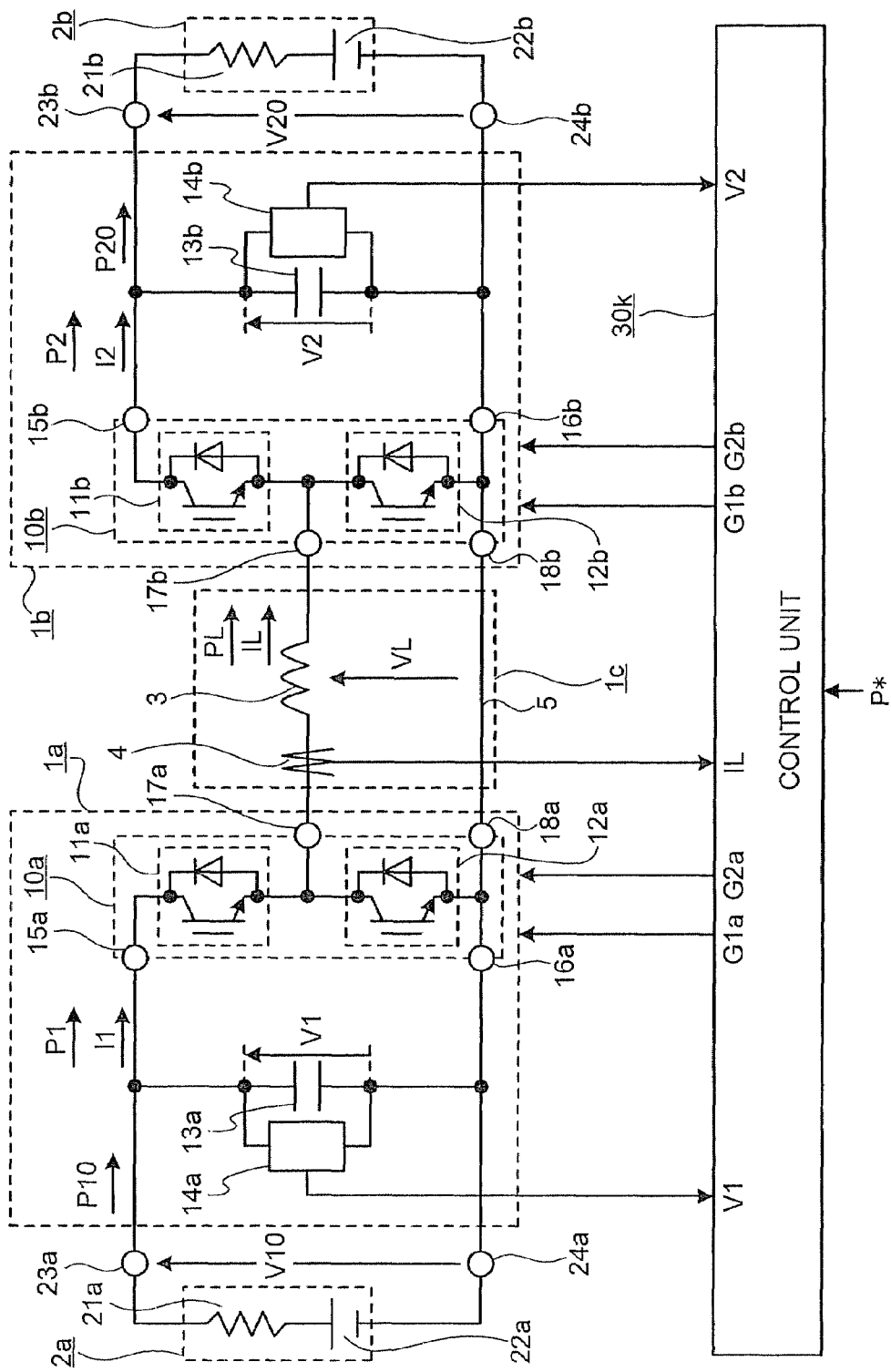
FIG. 56 is a configuration diagram of a bidirectional buck boost DC-DC converter according to an eleventh embodiment.

FIG. 56 is a configuration diagram of the bidirectional buck boost DC-DC converter according to the eleventh embodiment of the present invention. In the bidirectional buck boost DC-DC converter in the eleventh embodiment, the voltage detector 6 that detects the coupling unit voltage VL is omitted, and a control unit 30k has the following characteristics.

Figure 57:
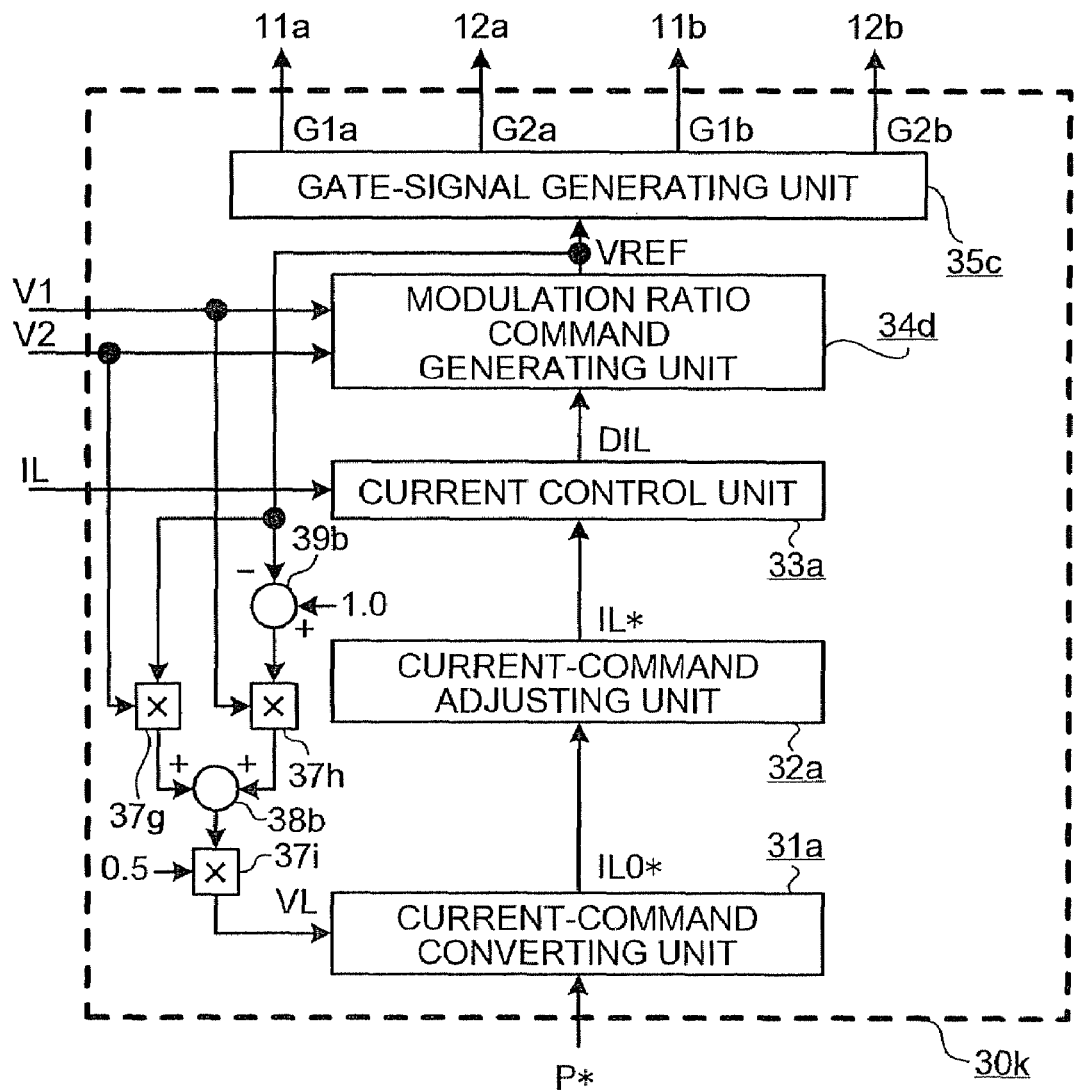
FIG. 57 is a diagram illustrating a configuration example of a control unit 30k according to the eleventh embodiment.

FIG. 57 is a diagram illustrating a configuration example of the control unit 30k according to the eleventh embodiment of the present invention.

As shown in FIG. 57, a product calculated by a multiplier 37g by multiplying the modulation ratio command VREF by the secondary-side capacitor voltage V2 is added in an adder 38b to a product calculated by a multiplier 37h by multiplying a vale that is calculated by subtracting the modulation ratio command VREF from 1.0 by a subtractor 39b by the primary-side capacitor voltage V1, which is multiplied by 0.5 by a multiplier 37i to be used as the coupling unit voltage VL.

With the above configuration, the voltage detector 6 that detects the coupling unit voltage VL can be omitted, so that the DC-DC converter as a whole can be configured smaller and more lightweight.

Twelfth Embodiment

A configuration of a bidirectional buck boost DC-DC converter according to the twelfth embodiment of the present invention is explained in detail below with reference to the drawings. Only parts different from the bidirectional buck boost DC-DC converter in the first embodiment of the present invention are described below.

Figure 58:
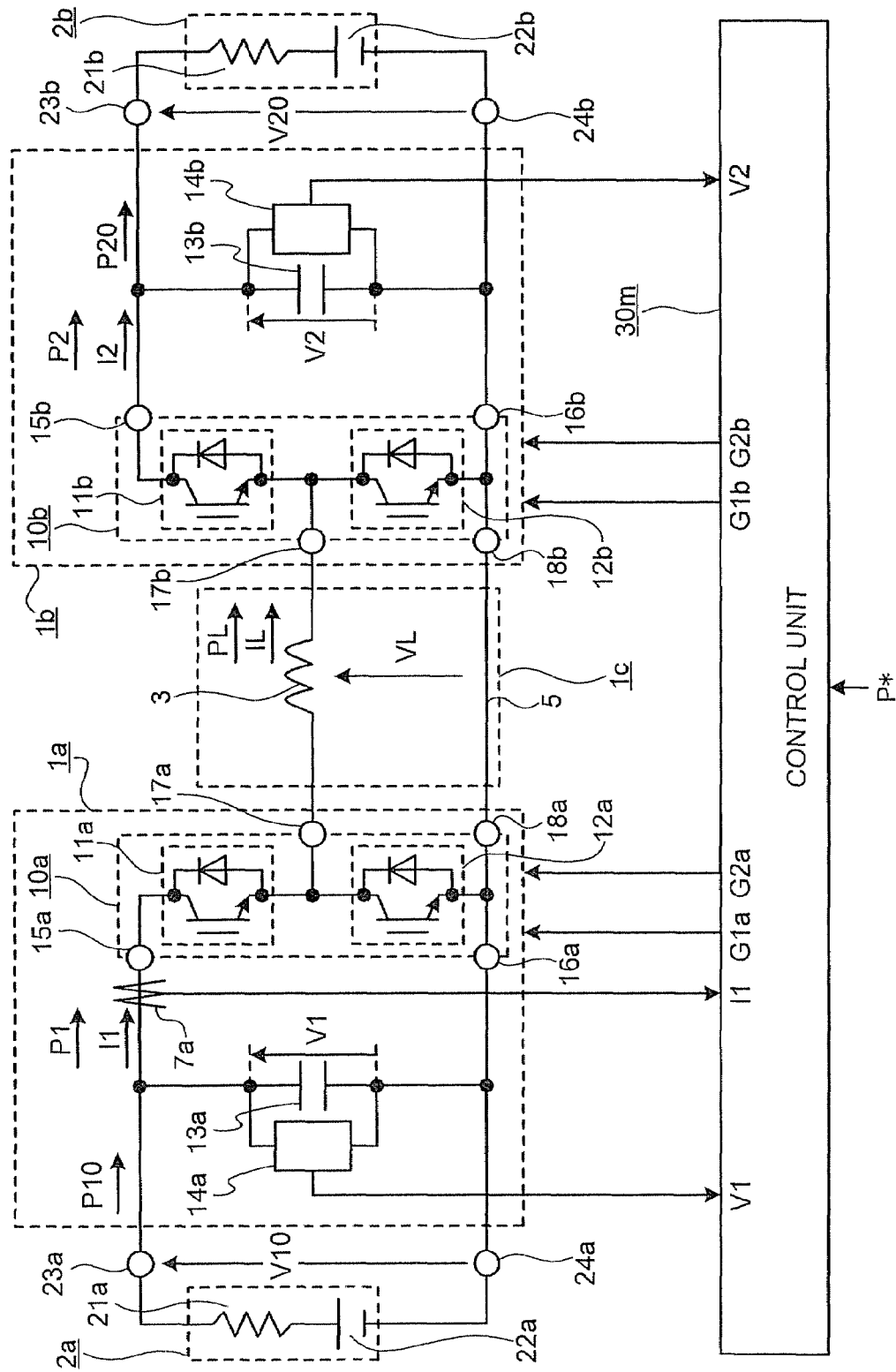
FIG. 58 is a configuration diagram of a bidirectional buck boost DC-DC converter according to a twelfth embodiment.

FIG. 58 is a configuration diagram of the bidirectional buck boost DC-DC converter according to the twelfth embodiment of the present invention. In the bidirectional buck boost DC-DC converter in the twelfth embodiment, the current detector 4 that detects the coupling reactor current IL and the voltage detector 6 that detects the coupling unit voltage VL are omitted, the current detector 7a that detects the primary-side switching circuit current I1 is added in the primary-side converting unit 1a, and a control unit 30m has the following characteristics.

Figure 59:
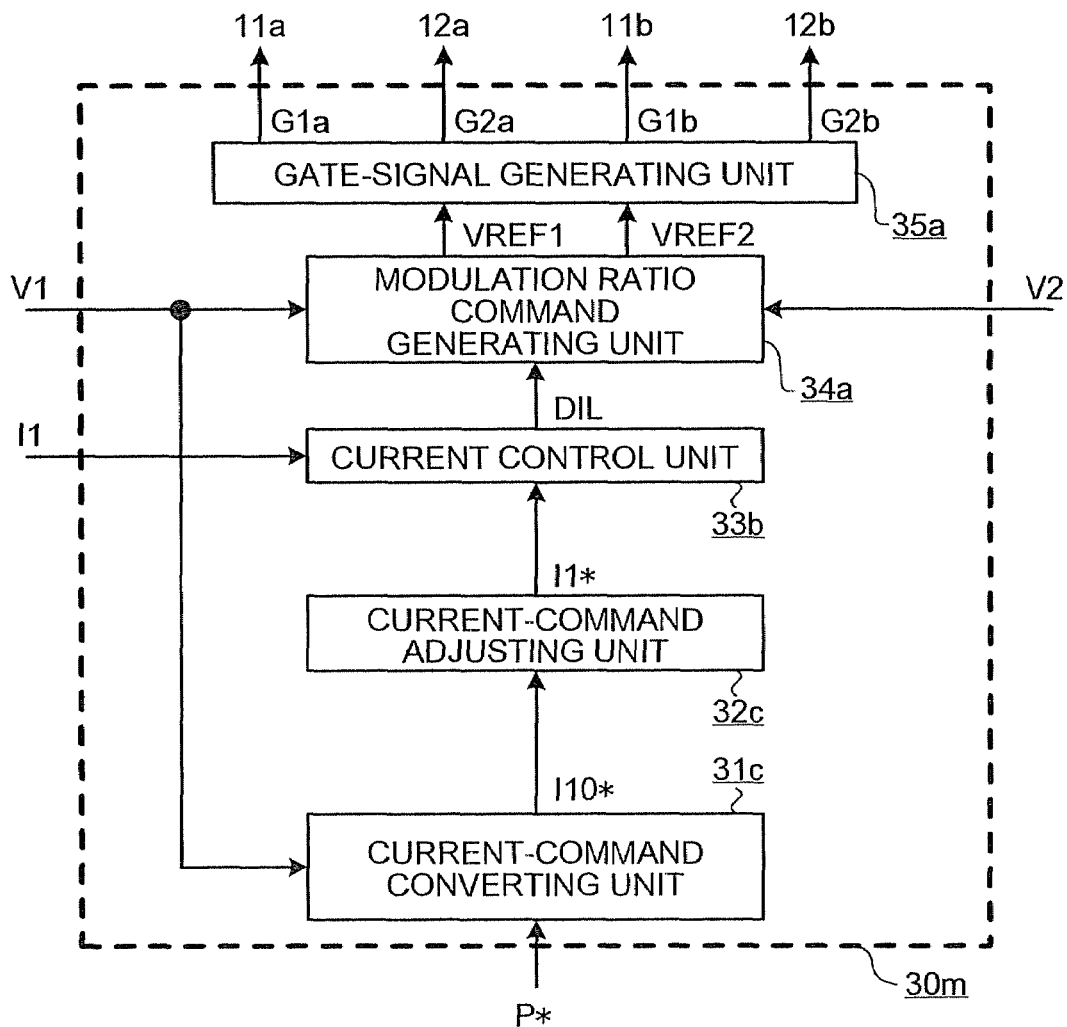
FIG. 59 is a diagram illustrating a configuration example of a control unit 30m according to the twelfth embodiment.

FIG. 59 is a diagram illustrating a configuration example of the control unit 30m according to the twelfth embodiment of the present invention. Different from the first embodiment, the control unit 30m is configured such that the primary-side capacitor voltage V1 is input to a current-command converting unit 31c, a signal output from the current-command converting unit 31c is a primary-side switching-circuit base current command I10*, an output from a current-command adjusting unit 32c is a primary-side switching-circuit current command I1*, and the primary-side switching circuit current I1 is input to a current control unit 33b, and the configurations of the current-command converting unit 31c, the current-command adjusting unit 32c, and the current control unit 33b have the following characteristics.

Figure 60:
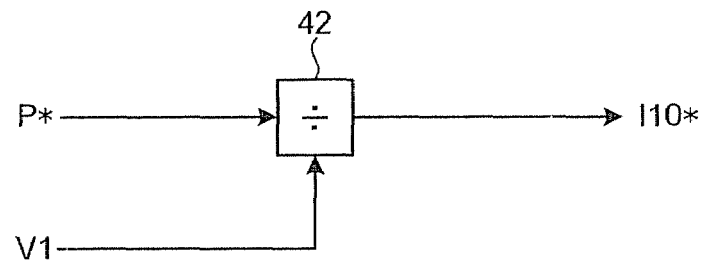
FIG. 60 is a diagram illustrating a configuration example of a current-command converting unit 31c according to the twelfth embodiment.

FIG. 60 is a diagram illustrating a configuration example of the current-command converting unit 31c according to the twelfth embodiment of the present invention.

The configuration can be such that a low-pass filter or the like is inserted into input and output of a divider 42 to remove unnecessary frequency components, although not shown.

As shown in FIG. 60, the divider 42 divides the command value P* by the primary-side capacitor voltage V1 to generate the primary-side switching-circuit base current command I10*.

Different from the first embodiment, the primary-side capacitor voltage V1 is input instead of the coupling unit voltage VL, and the primary-side switching-circuit base current command I10* is output instead of the coupling-reactor base current command IL0*.

Figure 61:
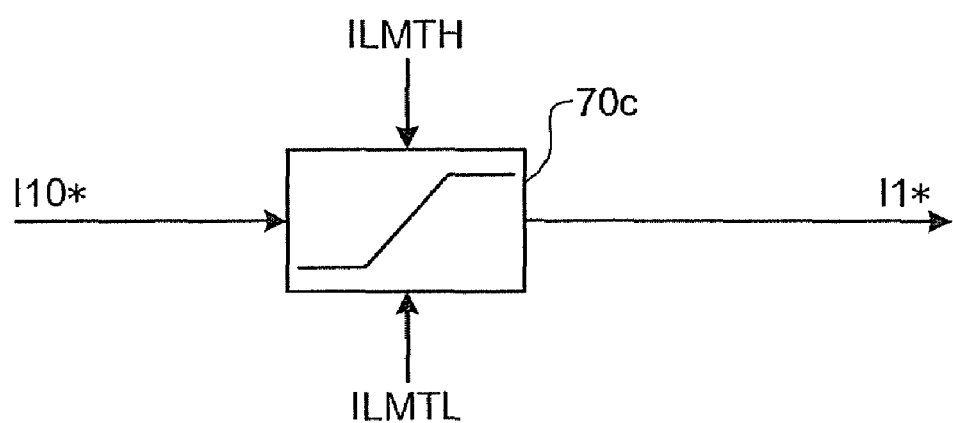
FIG. 61 is a diagram illustrating a configuration example of a current-command adjusting unit 32c according to the twelfth embodiment.

FIG. 61 is a diagram illustrating a configuration example of the current-command adjusting unit 32c according to the twelfth embodiment of the present invention. The configuration can be such that a low-pass filter or the like is inserted into input and output of a limiter 70c to remove unnecessary frequency components, although not shown.

As shown in FIG. 61, the current-command adjusting unit 32c causes the limiter 70c to limit the upper and lower limits of the primary-side switching-circuit base current command I10* by the current-command upper-limit limiting value ILMTH and the current-command lower-limit limiting value ILMTL, and outputs the value as the primary-side switching-circuit current command I1*.

The effect brought about by the limiter 70c is the same as that of the limiter 70a in the first embodiment, so that the explanation thereof is omitted.

Different from the configuration in the first embodiment, the primary-side switching-circuit base current command I10* is input instead of the coupling-reactor base current command IL0*, and the primary-side switching-circuit current command I1* is output instead of the coupling-reactor current command IL*.

Figure 62:
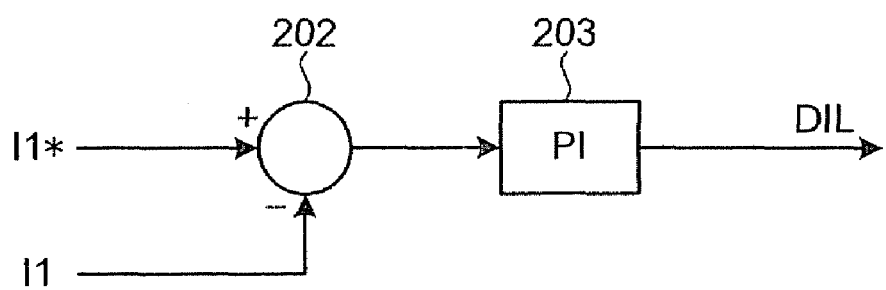
FIG. 62 is a diagram illustrating a configuration example of a current control unit 33b according to the twelfth embodiment.

FIG. 62 is a diagram illustrating a configuration example of the current control unit 33b according to the twelfth embodiment of the present invention. The configuration can be such that a low-pass filter or the like is inserted into input and output of a function block of a subtractor 202 or the like to remove unnecessary frequency components, although not shown.

As shown in FIG. 62, a deviation between the primary-side switching-circuit current command I1* and the primary-side switching circuit current I1 is generated in the subtractor 202, which is input to a proportional-integral controller 203. The output from the proportional-integral controller 203 is used as the current difference DIL.

Different from the configuration in the first embodiment, the primary-side switching-circuit current command I1* is input instead of the coupling-reactor current command IL*, and the primary-side switching circuit current I1 is input instead of the coupling reactor current IL.

The control method described in the twelfth embodiment is focused on the primary-side switching circuit power P1, which is controlled to be consistent with the power command P*. In other words, the power command P* is converted into the primary-side switching-circuit current command I1* corresponding thereto, which is controlled to be consistent with the actual primary-side switching circuit current I1.

Furthermore, when the minor loss in the primary-side converting unit 1a, the coupling unit 1c, and the secondary-side converting unit 1b and the minor fluctuation in energy stored in the primary-side capacitor 13a and the secondary-side capacitor 13b are ignored, the input/output power P10 of the primary-side power supply 2a, the primary-side switching circuit power P1, and the input/output power P20 of the secondary-side power supply 2b become equal on instantaneous value basis. Therefore, the power flow between the primary-side power supply 2a and the secondary-side power supply 2b can be controlled by controlling the primary-side switching circuit power P1.

The loss in the primary-side converting unit 1a, the coupling unit 1c, and the secondary-side converting unit 1b is ignored as minor loss in the above; however, if control accuracy is required to the degree that the loss cannot be ignored, the control accuracy of the power flow can be further improved by setting the power command P* or the primary-side switching-circuit current command I1* to a value that includes the loss (normally, a few percent of the whole power that is input to or output from the DC-DC converter), although not shown.

The fluctuation in energy stored in the primary-side capacitor 13a and the secondary-side capacitor 13b is ignored as minor loss in the above; however, if control accuracy is required to the degree that the fluctuation in energy cannot be ignored, the transitional control accuracy of the power flow can be improved by adjusting the power command P* or the primary-side switching-circuit current command I1* depending upon the amount of the fluctuation in energy stored in the primary-side capacitor 13a and the secondary-side capacitor 13b, although not shown.

In FIG. 59, the control unit 30m is configured such that the power command P* is input from outside; however, the control unit 30m can be configured such that a signal corresponding to the primary-side switching-circuit base current command I10* or the primary-side switching-circuit current command I1* is input from outside instead of the power command P*. In this case, the current-command converting unit 31c and the current-command adjusting unit 32c can be omitted.

With this configuration, a control system based on the primary-side switching circuit current I1 can be constructed, so that the voltage detector and the current detector in the coupling unit 1c can be omitted. Therefore, the degree of design freedom in structure can be increased.

Thirteenth Embodiment

A configuration of a bidirectional buck boost DC-DC converter according to the thirteenth embodiment of the present invention is explained in detail below with reference to the drawings. Only parts different from the bidirectional buck boost DC-DC converter in the first embodiment of the present invention are described below.

Figure 63:
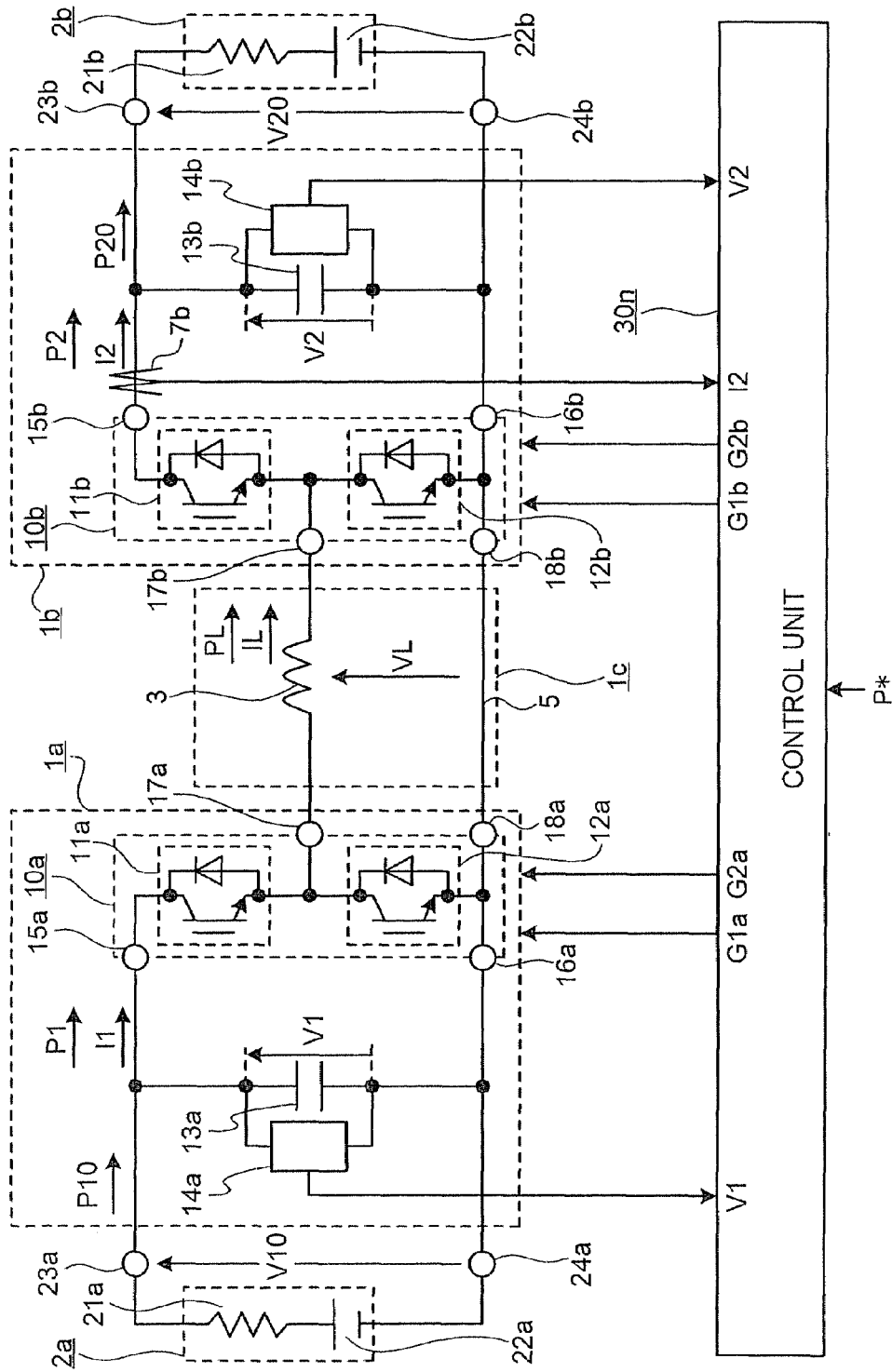
FIG. 63 is a configuration diagram of a bidirectional buck boost DC-DC converter according to a thirteenth embodiment.

FIG. 63 is a configuration diagram of the bidirectional buck boost DC-DC converter according to the thirteenth embodiment of the present invention. In the bidirectional buck boost DC-DC converter in the thirteenth embodiment, the current detector 4 that detects the coupling reactor current IL and the voltage detector 6 that detects the coupling unit voltage VL are omitted, the current detector 7b that detects the secondary-side switching circuit current I2 is added in the secondary-side converting unit 1b, and a control unit 30n has the following characteristics.

Figure 64:
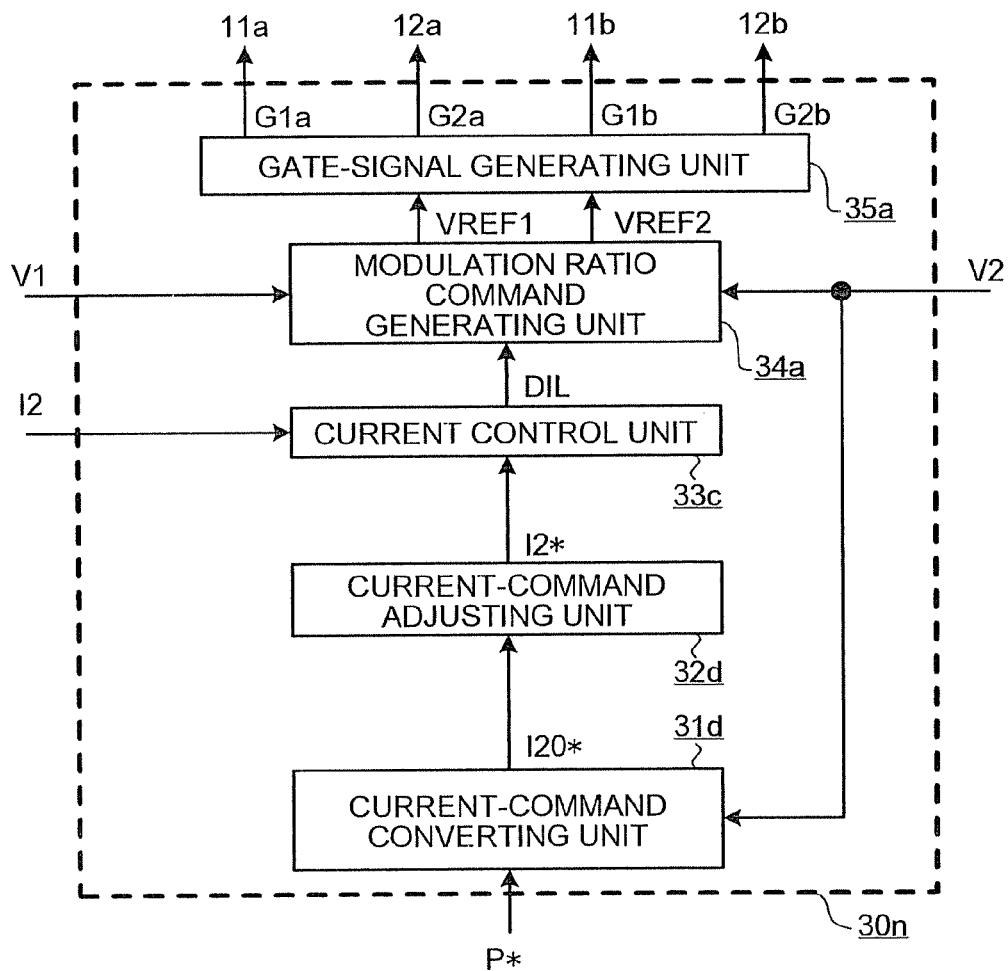
FIG. 64 is a diagram illustrating a configuration example of a control unit 30n according to the thirteenth embodiment.

FIG. 64 is a diagram illustrating a configuration example of the control unit 30n according to the thirteenth embodiment of the present invention. Different from the first embodiment, the control unit 30n is configured such that the secondary-side capacitor voltage V2 is input to a current-command converting unit 31d, a signal output from the current-command converting unit 31d is a secondary-side switching-circuit base current command I20*, an output from a current-command adjusting unit 32d is a secondary-side switching-circuit current command I2*, and the secondary-side switching circuit current I2 is input to a current control unit 33c, and the configurations of the current-command converting unit 31d, the current-command adjusting unit 32d, and the current control unit 33c have the following characteristics.

Figure 65:
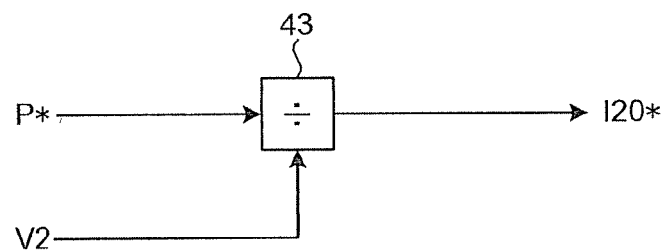
FIG. 65 is a diagram illustrating a configuration example of a current-command converting unit 31d according to the thirteenth embodiment.

FIG. 65 is a diagram illustrating a configuration example of the current-command converting unit 31d according to the thirteenth embodiment of the present invention.

The configuration can be such that a low-pass filter or the like is inserted into input and output of a divider 43 to remove unnecessary frequency components, although not shown.

As shown in FIG. 65, the divider 43 divides the command value P* by the secondary-side capacitor voltage V2 to generate the secondary-side switching-circuit base current command I20*.

Different from the first embodiment, the secondary-side capacitor voltage V2 is input instead of the coupling unit voltage VL, and the secondary-side switching-circuit base current command I20* is input instead of the coupling-reactor base current command IL0*.

Figure 66:
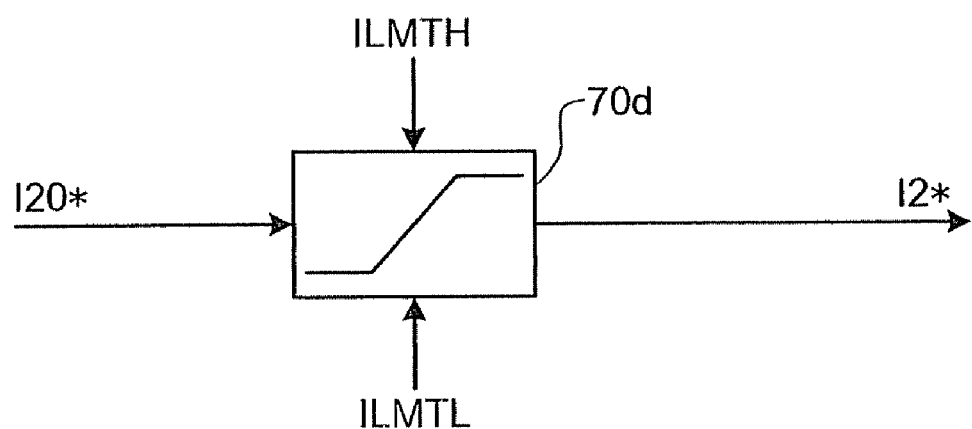
FIG. 66 is a diagram illustrating a configuration example of a current-command adjusting unit 32d according to the thirteenth embodiment.

FIG. 66 is a diagram illustrating a configuration example of the current-command adjusting unit 32d according to the thirteenth embodiment of the present invention. The configuration can be such that a low-pass filter or the like is inserted into input and output of a limiter 70d to remove unnecessary frequency components, although not shown.

As shown in FIG. 66, the current-command adjusting unit 32d causes the limiter 70d to limit the upper and lower limits of the secondary-side switching-circuit base current command I20* by the current-command upper-limit limiting value ILMTH and the current-command lower-limit limiting value ILMTL, and outputs the value as the secondary-side switching-circuit current command I2*.

The effect brought about by the limiter 70d is the same as that of the limiter 70a in the first embodiment, so that the explanation thereof is omitted.

Different from the configuration in the first embodiment, the secondary-side switching-circuit base current command I20* is input instead of the coupling-reactor base current command IL0*, and the secondary-side switching-circuit current command I2* is output instead of the coupling-reactor current command IL*.

Figure 67:
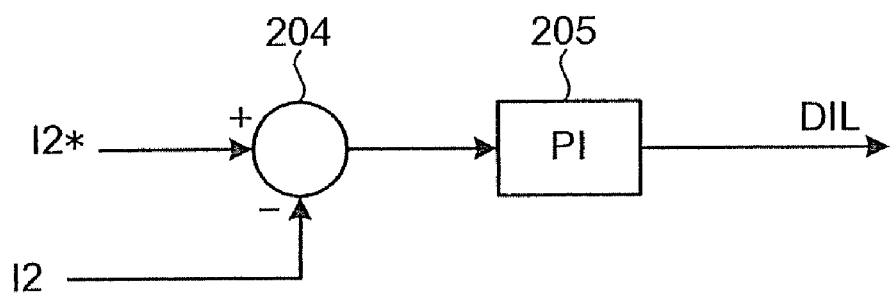
FIG. 67 is a diagram illustrating a configuration example of a current control unit 33c according to the thirteenth embodiment.

FIG. 67 is a diagram illustrating a configuration example of the current control unit 33c according to the thirteenth embodiment of the present invention. The configuration can be such that a low-pass filter or the like is inserted into input and output of a function block of a subtractor 204 or the like to remove unnecessary frequency components, although not shown.

As shown in FIG. 67, a deviation between the secondary-side switching-circuit current command I2* and the secondary-side switching circuit current I2 is generated in the subtractor 204, which is input to a proportional-integral controller 205. The output from the proportional-integral controller 205 is used as the current difference DIL.

Different from the configuration in the first embodiment, the secondary-side switching-circuit current command I2* is input instead of the coupling-reactor current command IL*, and the secondary-side switching circuit current I2 is input instead of the coupling reactor current IL.

The control method described in the thirteenth embodiment is focused on the power passing through the first terminal 15b and the second terminal 16b of the secondary-side switching circuit 10b (hereinafter, referred to as a secondary-side switching circuit power P2), which is controlled to be consistent with the power command P*. In other words, the power command P* is converted into the secondary-side switching-circuit current command I2* corresponding thereto, which is controlled to be consistent with the actual secondary-side switching circuit current I2.

Furthermore, when the minor loss in the primary-side converting unit 1a, the coupling unit 1c, and the secondary-side converting unit 1b and the minor fluctuation in energy stored in the primary-side capacitor 13a and the secondary-side capacitor 13b are ignored, the input/output power P10 of the primary-side power supply 2a, the secondary-side switching circuit power P2, and the input/output power P20 of the secondary-side power supply 2b become equal on instantaneous value basis. Therefore, the power flow between the primary-side power supply 2a and the secondary-side power supply 2b can be controlled by controlling the secondary-side switching circuit power P2.

The loss in the primary-side converting unit 1a, the coupling unit 1c, and the secondary-side converting unit 1b is ignored as minor loss in the above; however, if control accuracy is required to the degree that the loss cannot be ignored, the control accuracy of the power flow can be further improved by setting the power command P* or the secondary-side switching-circuit current command I2* to a value that includes the loss (normally, a few percent of the whole power that is input to or output from the DC-DC converter), although not shown.

The fluctuation in energy stored in the primary-side capacitor 13a and the secondary-side capacitor 13b is ignored as minor loss in the above; however, if control accuracy is required to the degree that the fluctuation in energy cannot be ignored, the transitional control accuracy of the power flow can be improved by adjusting the power command P* or the secondary-side switching-circuit current command I2* depending upon the amount of the fluctuation in energy stored in the primary-side capacitor 13a and the secondary-side capacitor 13b, although not shown.

In FIG. 64, the control unit 30n is configured such that the power command P* is input from outside; however, the control unit 30n can be configured such that a command corresponding to the secondary-side switching-circuit base current command I20* or the secondary-side switching-circuit current command I2* is input from outside instead of the power command P*. In this case, the current-command converting unit 31d and the current-command adjusting unit 32d can be omitted.

With this configuration, a control system based on the secondary-side switching circuit current I2 can be constructed, so that the voltage detector and the current detector in the coupling unit 1c can be omitted. Therefore, the degree of design freedom in structure can be increased.

The first to thirteenth embodiments are examples of embodiments and configurations of the present invention, and are not limited thereto. It goes without saying that the content of the present invention can be performed even by combining some of them, combining with known technologies, or modifying the configuration within the range not impairing physical meaning.

Fourteenth Embodiment

Figure 68:
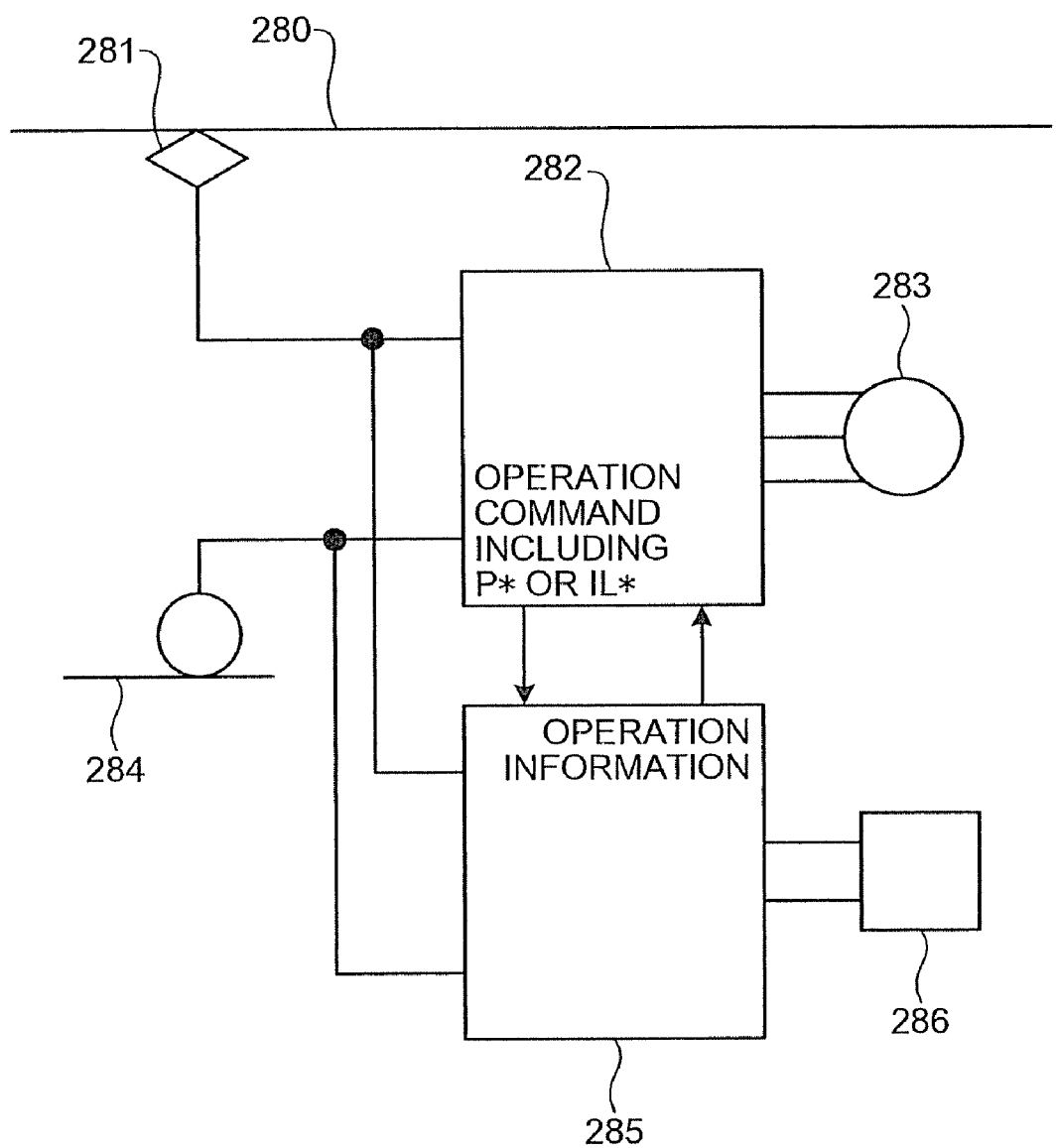
FIG. 68 is a diagram illustrating an application example of a bidirectional buck boost DC-DC converter according to a fourteenth embodiment.

FIG. 68 is a diagram illustrating an application example of a bidirectional buck boost DC-DC converter according to the fourteenth embodiment of the present invention.

As shown in FIG. 68, a railway coach drive control system drives an electric motor 283 by an inverter for drive control 282 with a sum of the power that is input to and output from a wire 280 and a rail 284 through a pantograph 281 and the power from a power storage device 286 that is appropriately adjusted by a bidirectional buck boost DC-DC converter 285 constructed as explained in the first to thirteenth embodiments.

The bidirectional buck boost DC-DC converter 285 is operated to output appropriate amount of power from the power storage device 286 at an appropriate timing such as when the vehicle is in a power running state, and adversely to absorb appropriate amount of power at an appropriate timing such as when braking the vehicle.

With such a configuration, regenerative energy of the vehicle is effectively used.

The bidirectional buck boost DC-DC converter 285 according to the fourteenth embodiment of the present invention is controlled by the units described in the first to thirteenth embodiments to realize flow of power that is consistent with the power command P* input from the inverter for drive control 282. The power command P* can be input from a device (for example, a vehicle information managing device, not shown) other than the inverter for drive control 282. Although the bidirectional buck boost DC-DC converter 285 has a function of transmitting the operation state to the inverter for drive control 282, the bidirectional buck boost DC-DC converter 285 can transmit it to a device (for example, a vehicle information managing device, not shown) other than the inverter for drive control 282.

It goes without saying that the configuration can be such that the primary-side switching-circuit current command I1*, the secondary-side switching-circuit current command I2*, the coupling-reactor current command IL*, or the like is input to the bidirectional buck boost DC-DC converter 285 instead of the power command P*.

With this configuration, power can be controlled bidirectionally while the terminal voltage of the power storage device 286 is set to an appropriate value regardless of the voltage of the wire 280. Therefore, the voltage of the power storage device 286 can be raised higher than that of the wire 280, so that the current of the bidirectional buck boost DC-DC converter 285 or the power storage device 286 can be lowered, enabling to construct an efficient railway coach drive control system that is smaller and more lightweight.

Fifteenth Embodiment

FIG. 69 is a diagram illustrating an application example of a bidirectional buck boost DC-DC converter according to a fifteenth embodiment of the present invention.

As shown in FIG. 69, a railway feeder system that supplies power to a vehicle 288 by a direct-current power source 287 connected to the wire 280 and the rail 284 has a function of outputting the power of the power storage device 286 to the wire 280 side or adversely absorbing the power from the wire 280 side through the bidirectional buck boost DC-DC converter 285 of the first to thirteenth embodiments connected to the wire 280 and the rail 284.

The bidirectional buck boost DC-DC converter 285 is operated so that, for example, when the voltage of the wire 280 drops, appropriate amount of power is output from the power storage device 286, and when the voltage of the wire 280 rises, appropriate amount of power is absorbed in the power storage device 286.

The bidirectional buck boost DC-DC converter 285 can perform control that realizes flow of power consistent with the power command p* from a system control device 289.

With such a configuration, fluctuation in voltage of the wire 280 is effectively suppressed and regenerative energy of the vehicle is effectively utilized.

It goes without saying that the configuration can be such that the primary-side switching-circuit current command I1*, the secondary-side switching-circuit current command I2*, the coupling-reactor current command IL*, or the like can be input to the bidirectional buck boost DC-DC converter 285 instead of the power command P*.

With the bidirectional buck boost DC-DC converter 285 in the fifteenth embodiment, power can be controlled bidirectionally while the terminal voltage of the power storage device 286 is set to an appropriate value regardless of the voltage of the wire. Therefore, the voltage of the power storage device 286 can be raised higher than that of the wire 280, so that the current of the bidirectional buck boost DC-DC converter 285 or the power storage device 286 can be lowered, enabling to construct an efficient railway feeder system that is smaller and more lightweight.

The fourteenth and fifteenth embodiments only describe the application examples of the bidirectional buck boost DC-DC converter and therefore are not limited thereto, and can of course be applied to various fields handling a direct-current power such as an elevator driving device, a hybrid vehicle, an electric vehicle, and a direct-current power source by, for example, combining with known technologies.

The invention claimed is:

1. A bidirectional buck boost DC-DC converter in which a direct-current power is supplied bidirectionally between two direct-current voltage sources of a primary-side power supply and a secondary-side power supply, the bidirectional buck boost DC-DC converter comprising:

a primary-side converting unit that is connected to an input/output terminal of the primary-side power supply and performs a power conversion operation to the primary-side power supply;

a secondary-side converting unit that is connected to an input/output terminal of the secondary-side power supply and performs a power conversion operation to the secondary-side power supply;

a coupling unit that connects the primary-side converting unit and the secondary-side converting unit and mediates supply and reception of a power between the primary-side converting unit and the secondary-side converting unit; and a control unit that detects at least a voltage of the primary-side converting unit on a power supply side and a voltage of the secondary-side converting unit on a power supply side out of the voltage of the primary-side converting unit on a power supply side, the voltage of the secondary-side converting unit on a power supply side, and a voltage at an arbitrary point between a positive-electrode-side connecting terminal and a negative-electrode-side connecting terminal of the coupling unit each connecting the primary-side converting unit and the secondary-side converting unit, that detects a current flowing into/out of the primary-side converting unit, a current flowing into/out of the secondary-side converting unit, and a current flowing into/out of the coupling unit and controls so that a selected one of the currents is consistent with a command value corresponding to the selected one of the currents, and that controls a power conversion operation to the primary-side converting unit and the secondary-side converting unit based on the voltage of the primary-side converting unit on a power supply side that is detected, the voltage of the secondary-side converting unit on a power supply side that is detected, the selected one of the currents, and a signal based on the command value corresponding to the selected one of the currents so that a direction and a magnitude of a power flowing bidirectionally between the primary-side power supply and the secondary-side power supply are controlled to be continuously variable on instantaneous value basis regardless of a magnitude relation between a voltage of the primary-side power supply and a voltage of the secondary-side power supply in a state where the two direct-current voltage sources are each connected.

2. The bidirectional buck boost DC-DC converter according to claim 1, wherein the primary-side converting unit includes a primary-side switching circuit in which two switching elements are connected in series;

a primary-side capacitor that is connected in parallel with the primary-side switching circuit; and a first voltage detector that detects a voltage of the primary-side capacitor and outputs the voltage to the control unit as the voltage of the primary-side converting unit on a power supply side, the secondary-side converting unit includes a secondary-side switching circuit in which two switching elements are connected in series;

a secondary-side capacitor that is connected in parallel with the secondary-side switching circuit; and a second voltage detector that detects a voltage of the secondary-side capacitor and outputs the voltage to the control unit as the voltage of the secondary-side converting unit on a power supply side, and the coupling unit includes a coupling reactor and a connection line.

3. The bidirectional buck boost DC-DC converter according to claim 2, further comprising a first current detector that detects a current flowing in the coupling reactor and outputs the current to the control unit as the current flowing into/out of the coupling unit, wherein the control unit outputs a control signal for performing a power conversion operation to the primary-side converting unit and the secondary-side converting unit so that a value based on a signal detected by the first current detector is consistent with the command value.

4. The bidirectional buck boost DC-DC converter according to claim 3, wherein the control unit includes a current control unit that generates a deviation between a current command value as the command value and a signal input from any one of the first current detector, the second current detector, the third current detector, and the fourth current detector;

a modulation ratio command generating unit that generates a modulation ratio command to the switching elements by using the deviation generated by the current control unit and a signal input from the first voltage detector and the second voltage detector; and a gate-signal generating unit that generates a gate signal to the switching elements based on the modulation ratio command generated by the modulation ratio command generating unit.

5. The bidirectional buck boost DC-DC converter according to claim 4, wherein the control unit includes a current-command adjusting unit that adjusts the current command value based on a signal input from any one of the first current detector, the second current detector, the third current detector, and the fourth current detector, and a signal input from the first voltage detector and the second voltage detector.

6. The bidirectional buck boost DC-DC converter according to claim 5, wherein the current-command adjusting unit limits an upper limit and a lower limit of the current command value to an arbitrary value.

7. The bidirectional buck boost DC-DC converter according to claim 4, wherein the modulation ratio command generating unit generates a first modulation ratio command for controlling the primary-side switching circuit and a second modulation ratio command for controlling the secondary-side switching circuit.

8. The bidirectional buck boost DC-DC converter according to claim 7, wherein the gate-signal generating unit compares each of the first modulation ratio command and the second modulation ratio command, and a predetermined carrier signal, and generates a gate signal for controlling on/off of each of the switching elements of an upper-arm side switching element and a lower-arm side switching element of the primary-side switching circuit and each of the switching elements of an upper-arm side switching element and a lower-arm side switching element of the secondary-side switching circuit.

9. The bidirectional buck boost DC-DC converter according to claim 1, further comprising a second current detector that detects a current flowing in the connection line and outputs the current to the control unit as the current flowing into/out of the coupling unit, wherein the control unit outputs a control signal for performing a power conversion operation to the primary-side converting unit and the secondary-side converting unit so that a value based on a signal detected by the second current detector is consistent with the command value.

10. The bidirectional buck boost DC-DC converter according to claim 9, wherein the control unit includes a current control unit that generates a deviation between a current command value as the command value and a signal input from any one of the first current detector, the second current detector, the third current detector, and the fourth current detector;

a modulation ratio command generating unit that generates a modulation ratio command to the switching elements by using the deviation generated by the current control unit and a signal input from the first voltage detector and the second voltage detector; and a gate-signal generating unit that generates a gate signal to the switching elements based on the modulation ratio command generated by the modulation ratio command generating unit.

11. The bidirectional buck boost DC-DC converter according to claim 10, wherein the control unit includes a current-command adjusting unit that adjusts the current command value based on a signal input from any one of the first current detector, the second current detector, the third current detector, and the fourth current detector, and a signal input from the first voltage detector and the second voltage detector.

12. The bidirectional buck boost DC-DC converter according to claim 11, wherein the current-command adjusting unit limits an upper limit and a lower limit of the current command value to an arbitrary value.

13. The bidirectional buck boost DC-DC converter according to claim 1, further comprising a third current detector that detects a current flowing in a first terminal that is a positive terminal of the primary-side switching circuit or the secondary-side switching circuit, and outputs the current to the control unit as the current flowing into/out of the primary-side converting unit, wherein the control unit outputs a control signal for performing a power conversion operation to the primary-side converting unit and the secondary-side converting unit so that a value based on a signal detected by the third current detector is consistent with the command value.

14. The bidirectional buck boost DC-DC converter according to claim 13, wherein the control unit includes a current control unit that generates a deviation between a current command value as the command value and a signal input from any one of the first current detector, the second current detector, the third current detector, and the fourth current detector;

a modulation ratio command generating unit that generates a modulation ratio command to the switching elements by using the deviation generated by the current control unit and a signal input from the first voltage detector and the second voltage detector; and a gate-signal generating unit that generates a gate signal to the switching elements based on the modulation ratio command generated by the modulation ratio command generating unit.

15. The bidirectional buck boost DC-DC converter according to claim 14, wherein the control unit includes a current-command adjusting unit that adjusts the current command value based on a signal input from any one of the first current detector, the second current detector, the third current detector, and the fourth current detector, and a signal input from the first voltage detector and the second voltage detector.

16. The bidirectional buck boost DC-DC converter according to claim 15, wherein the current-command adjusting unit limits an upper limit and a lower limit of the current command value to an arbitrary value.

17. The bidirectional buck boost DC-DC converter according to claim 1, further comprising a fourth current detector that detects a current flowing in a second terminal that is a negative terminal of the primary-side switching circuit on the primary-side power supply side or a negative terminal of the secondary-side switching circuit on the secondary-side power supply side, and outputs the current to the control unit as the current flowing into/out of the coupling unit, wherein
the control unit outputs a control signal for performing a power conversion operation to the primary-side converting unit and the secondary-side converting unit so that a value based on a signal detected by the fourth current detector is consistent with the command value.

18. The bidirectional buck boost DC-DC converter according to claim 17, wherein the control unit includes
a current control unit that generates a deviation between a current command value as the command value and a signal input from any one of the first current detector, the second current detector, the third current detector, and the fourth current detector;
a modulation ratio command generating unit that generates a modulation ratio command to the switching elements by using the deviation generated by the current control unit and a signal input from the first voltage detector and the second voltage detector; and
a gate-signal generating unit that generates a gate signal to the switching elements based on the modulation ratio command generated by the modulation ratio command generating unit.

19. The bidirectional buck boost DC-DC converter according to claim 18, wherein the control unit includes a current-command adjusting unit that adjusts the current command value based on a signal input from any one of the first current detector, the second current detector, the third current detector, and the fourth current detector, and a signal input from the first voltage detector and the second voltage detector.

20. The bidirectional buck boost DC-DC converter according to claim 19, wherein the current-command adjusting unit limits an upper limit and a lower limit of the current command value to an arbitrary value.

21. A railway vehicle drive control system comprising:
an inverter for drive control that feeds a power supplied from a wire to an electric motor as a drive power;
a power storage device that stores a power supplied from the wire; and
a bidirectional buck boost DC-DC converter that is provided between the wire and the power storage device and controls a power of the wire and the power storage device bidirectionally, wherein
the bidirectional buck boost DC-DC converter includes
a primary-side converting unit that is connected to an input/output terminal of the primary-side power supply and performs a power conversion operation to the primary-side power supply;
a secondary-side converting unit that is connected to an input/output terminal of the secondary-side power supply and performs a power conversion operation to the secondary-side power supply;
a coupling unit that connects the primary-side converting unit and the secondary-side converting unit and mediates supply and reception of a power between the primary-side converting unit and the secondary-side converting unit; and
a control unit that detects at least a voltage of the primary-side converting unit on a power supply side and a voltage of the secondary-side converting unit on a power supply side out of the voltage of the primary-side converting unit on a power supply side, the voltage of the secondary-side converting unit on a power supply side, and a voltage at an arbitrary point between a positive-electrode-side connecting terminal and a negative-electrode-side connecting terminal of the coupling unit each connecting the primary-side converting unit and the secondary-side converting unit, that detects a current flowing into/out of the primary-side converting unit, a current flowing into/out of the secondary-side converting unit, and a current flowing into/out of the coupling unit and controls so that a selected one of the currents is consistent with a command value corresponding to the selected one of the currents, and that controls a power conversion operation to the primary-side converting unit and the secondary-side converting unit based on the voltage of the primary-side converting unit on a power supply side that is detected, the voltage of the secondary-side converting unit on a power supply side that is detected, the selected one of the currents, and a signal based on the command value corresponding to the selected one of the currents so that a direction and a magnitude of a power flowing bidirectionally between the primary-side power supply and the secondary-side power supply are controlled to be continuously variable on instantaneous value basis regardless of a magnitude relation between a voltage of the primary-side power supply and a voltage of the secondary-side power supply in a state where the two direct-current voltage sources are each connected.

22. The railway vehicle drive control system according to claim 21, wherein a positive terminal of the primary-side converting unit is connected to a pantograph and a positive electrode side of the inverter for drive control,
a negative terminal of the primary-side converting unit is connected to a return line circuit and a negative electrode side of the inverter for drive control,
a positive terminal of the secondary-side converting unit is connected to a positive electrode side of the power storage device, and
a negative terminal of the secondary-side converting unit is connected to a negative electrode side of the power storage device.

23. A railway feeder system that supplies a power to a vehicle by a direct-current power source connected to a wire and a rail comprising:
an inverter for drive control that feeds a power supplied from the wire to an electric motor as a drive power;
a power storage device that stores a power supplied from the wire; and
a bidirectional buck boost DC-DC converter that is provided between the wire and the power storage device and controls a power of the wire and the power storage device bidirectionally, wherein the bidirectional buck boost DC-DC converter includes a primary-side converting unit that is connected to an input/output terminal of the primary-side power supply and performs a power conversion operation to the primary-side power supply;

a secondary-side converting unit that is connected to an input/output terminal of the secondary-side power supply and performs a power conversion operation to the secondary-side power supply;

a coupling unit that connects the primary-side converting unit and the secondary-side converting unit and mediates supply and reception of a power between the primary-side converting unit and the secondary-side converting unit; and a control unit that detects at least a voltage of the primary-side converting unit on a power supply side and a voltage of the secondary-side converting unit on a power supply side out of the voltage of the primary-side converting unit on a power supply side, the voltage of the secondary-side converting unit on a power supply side, and a voltage at an arbitrary point between a positive-electrode-side connecting terminal and a negative-electrode-side connecting terminal of the coupling unit each connecting the primary-side converting unit and the secondary-side converting unit, that detects a current flowing into/out of the primary-side converting unit, a current flowing into/out of the secondary-side converting unit, and a current flowing into/out of the coupling unit and controls so that a selected one of the currents is consistent with a command value corresponding to the selected one of the currents, and that controls a power conversion operation to the primary-side converting unit and the secondary-side converting unit based on the voltage of the primary-side converting unit on a power supply side that is detected, the voltage of the secondary-side converting unit on a power supply side that is detected, the selected one of the currents, and a signal based on the command value corresponding to the selected one of the currents so that a direction and a magnitude of a power flowing bidirectionally between the primary-side power supply and the secondary-side power supply are controlled to be continuously variable on instantaneous value basis regardless of a magnitude relation between a voltage of the primary-side power supply and a voltage of the secondary-side power supply in a state where the two direct-current voltage sources are each connected.

24. The railway feeder system according to claim 23, wherein a positive terminal of the primary-side converting unit is connected to the wire, a negative terminal of the primary-side converting unit is connected to the rail, a positive terminal of the secondary-side converting unit is connected to a positive electrode side of the power storage device, and a negative terminal of the secondary-side converting unit is connected to a negative electrode side of the power storage device.

* * * * *